(12) United States Patent
Kapelevich et al.

(10) Patent No.: US 12,521,511 B2
(45) Date of Patent: Jan. 13, 2026

(54) HEADGEAR WITH DIRECTIONAL ADJUSTMENT MECHANISM

(71) Applicant: Fisher & Paykel Healthcare Limited, Auckland (NZ)

(72) Inventors: Vitaly Kapelevich, Auckland (NZ); Christopher Gareth Sims, Auckland (NZ); David Monroy Felix, Auckland (NZ); Blair Raymund Dadson Murphy, Auckland (NZ); Matthew Robert Geoff Slight, Auckland (NZ); Vidhi Jayeshkumar Shah, Auckland (NZ); Kavyn Manikkam, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 904 days.

(21) Appl. No.: 17/774,380

(22) PCT Filed: Nov. 13, 2020

(86) PCT No.: PCT/NZ2020/050152
§ 371 (c)(1),
(2) Date: May 4, 2022

(87) PCT Pub. No.: WO2021/096372
PCT Pub. Date: May 20, 2021

(65) Prior Publication Data
US 2022/0362502 A1  Nov. 17, 2022

Related U.S. Application Data

(60) Provisional application No. 62/935,539, filed on Nov. 14, 2019.

(51) Int. Cl.
*A61M 16/06* (2006.01)

(52) U.S. Cl.
CPC ............. *A61M 16/0683* (2013.01)

(58) Field of Classification Search
CPC .......... A61M 16/0488; A61M 16/0683; A62B 18/084; B63C 2011/128; F16G 11/101; F16G 11/105; F16G 11/106
See application file for complete search history.

(56) References Cited

U.S. PATENT DOCUMENTS

| 4,796,338 A | 1/1989 | Meyers |
| 2016/0082217 A1 | 3/2016 | McLaren et al. |

(Continued)

FOREIGN PATENT DOCUMENTS

| GB | 2298892 | 9/1996 |
| JP | 2016516527 | 6/2016 |

(Continued)

*Primary Examiner* — Joseph D. Boecker
(74) *Attorney, Agent, or Firm* — VIA LLP

(57) ABSTRACT

This disclosure provides a directional adjustment unit for a headgear for a respiratory mask. The directional adjustment unit provides an increased resistance to extension of one or more straps of the headgear when the headgear is under tensile forces, as compared to a lower resistance to retraction of the one or more headgear straps. The directional adjustment unit comprises a movable frictional engagement member comprising an aperture, wherein the aperture is arranged to receive a filament of a strap of the headgear therethrough, wherein the frictional engagement member in a first configuration provides a disengaged or pre-activated configuration with respect to the filament, and in a second configuration provides an engaged configuration with respect to the filament. Features are provided which improve the operation of such a directional adjustment unit. These features include features to help resist bending of the filament inside the directional adjustment unit, features to vary frictional engagement between the frictional engagement member and (Continued)

the filament, and features to reduce sticking of the frictional engagement member in a given position.

25 Claims, 40 Drawing Sheets

(56) References Cited

U.S. PATENT DOCUMENTS

| | | | |
|---|---|---|---|
| 2016/0144146 A1* | 5/2016 | Huddart | A61M 16/0672 |
| | | | 128/206.21 |
| 2017/0274167 A1 | 9/2017 | Huddart et al. | |
| 2019/0083734 A1* | 3/2019 | Hammer | F16B 2/16 |
| 2019/0151592 A1* | 5/2019 | Bornholdt | A61M 16/0616 |

FOREIGN PATENT DOCUMENTS

| | | |
|---|---|---|
| JP | 2017531464 | 10/2017 |
| JP | 2018528042 A | 9/2018 |
| WO | 2012144531 A1 | 10/2012 |
| WO | WO 2017/158544 | 9/2017 |

* cited by examiner

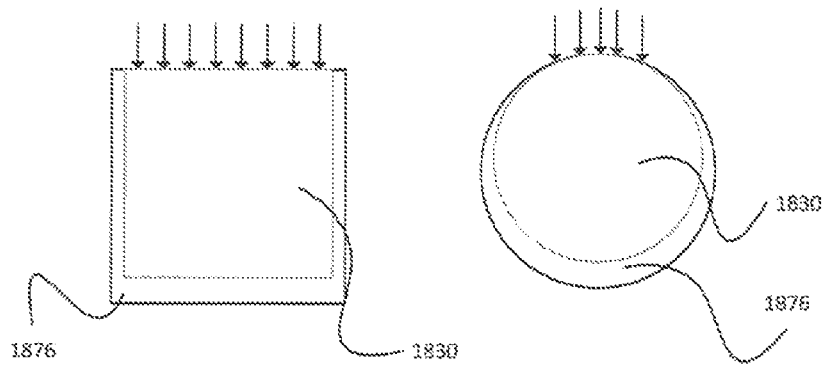
Fig. 3a　　Fig. 3b
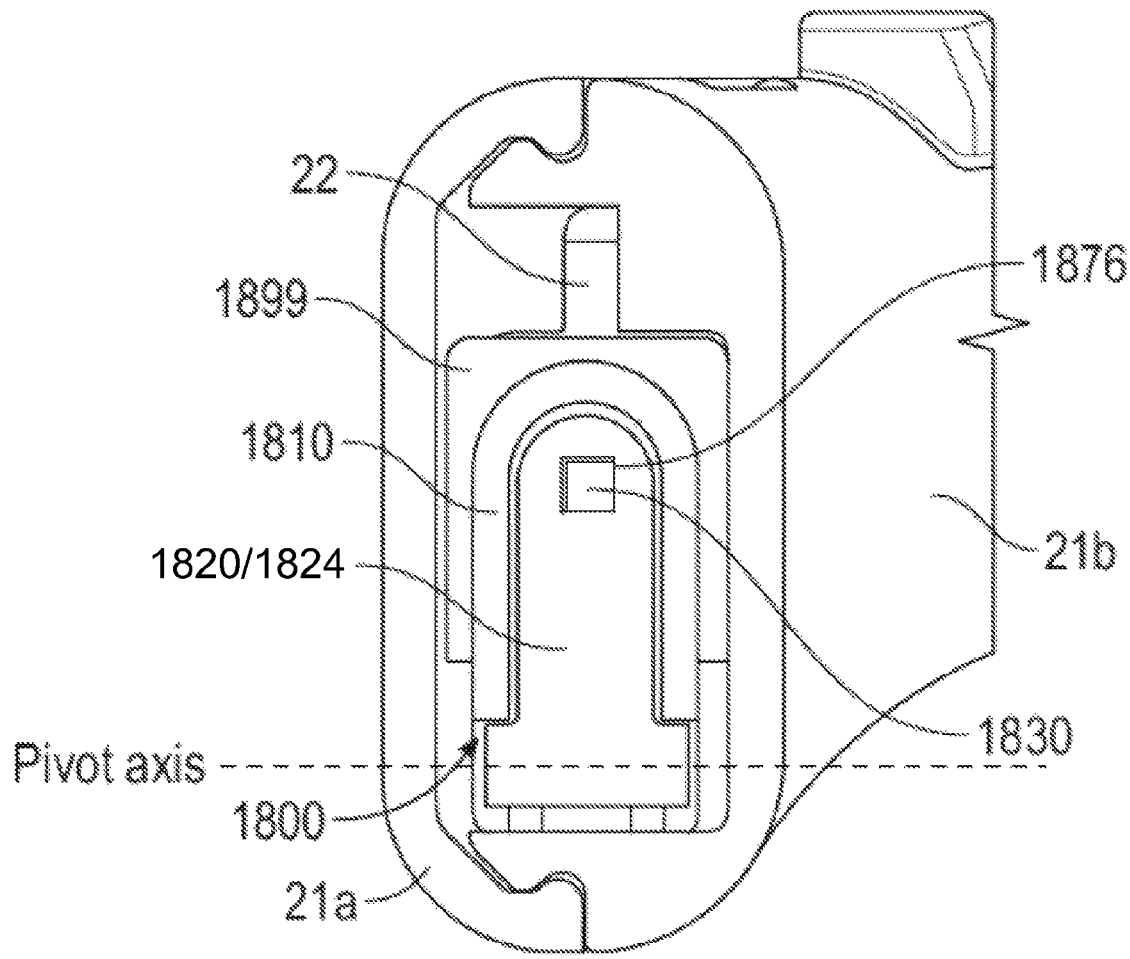
Fig. 4

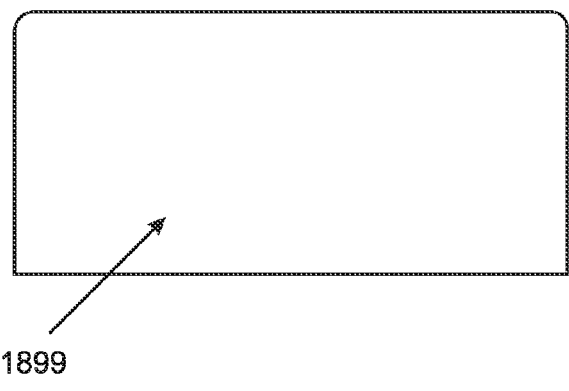
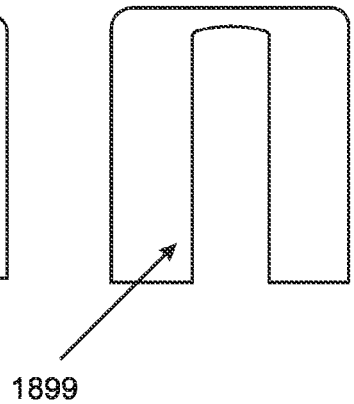
Fig. 5a  Fig. 5b
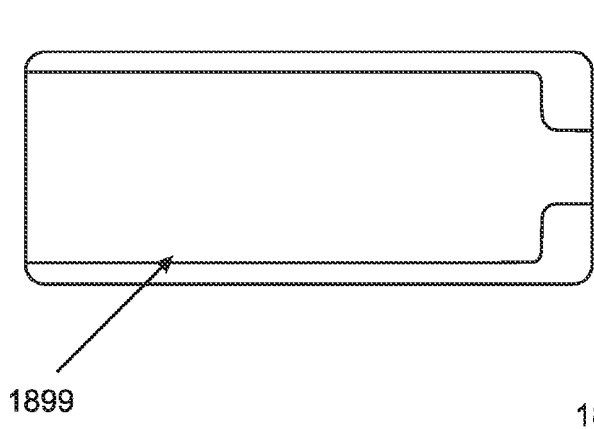
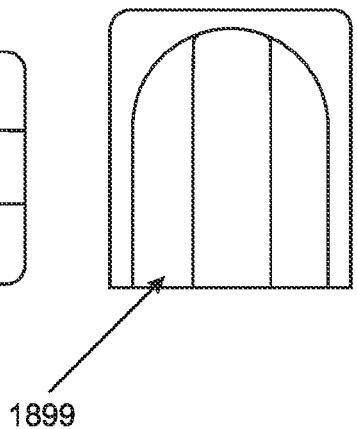
Fig. 5c  Fig. 5d

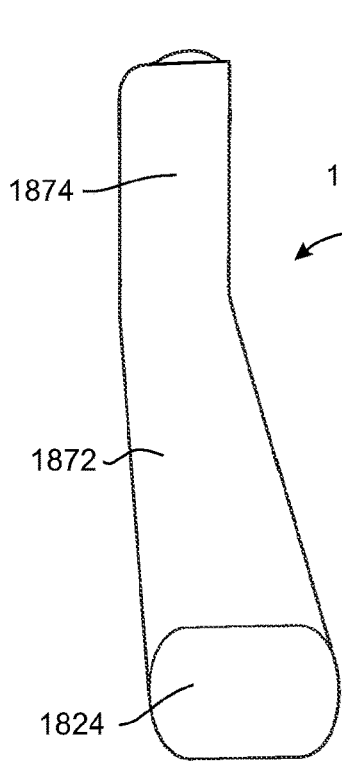
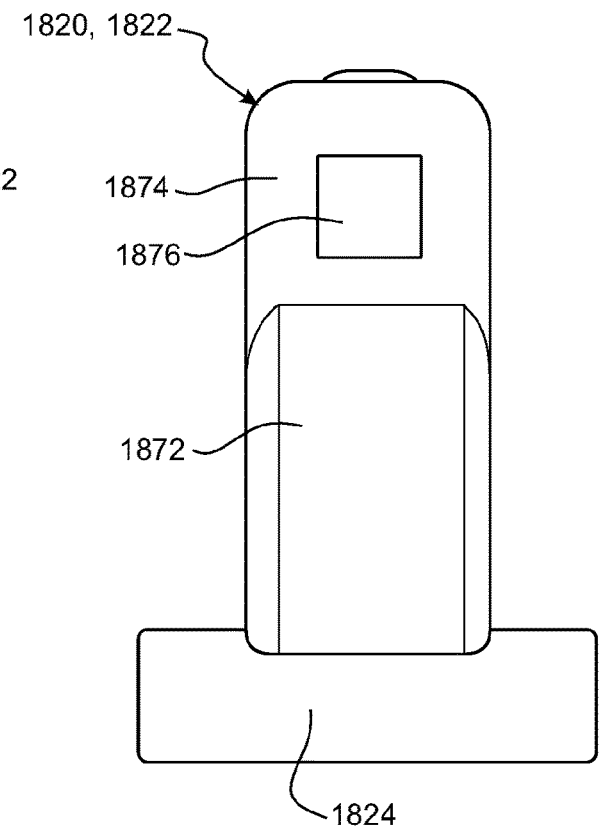
Fig. 16d    Fig. 16e
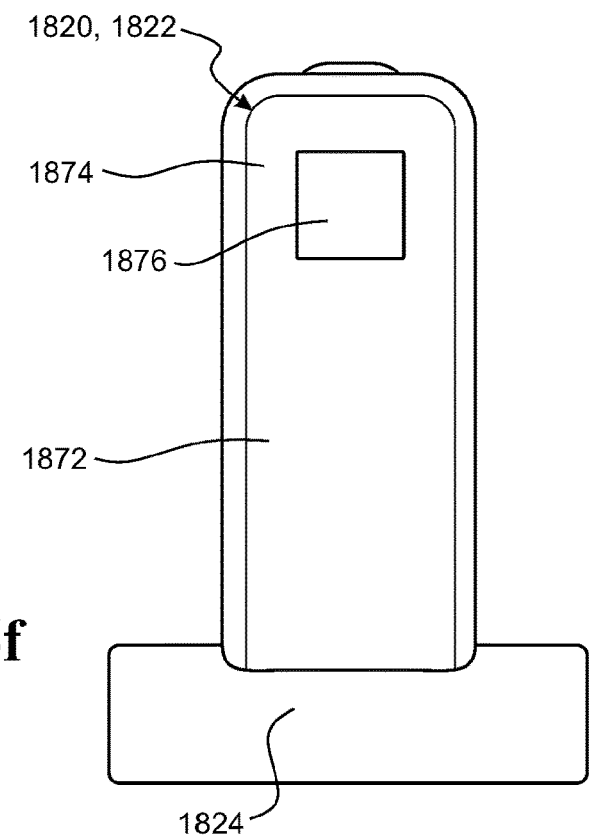
Fig. 16f

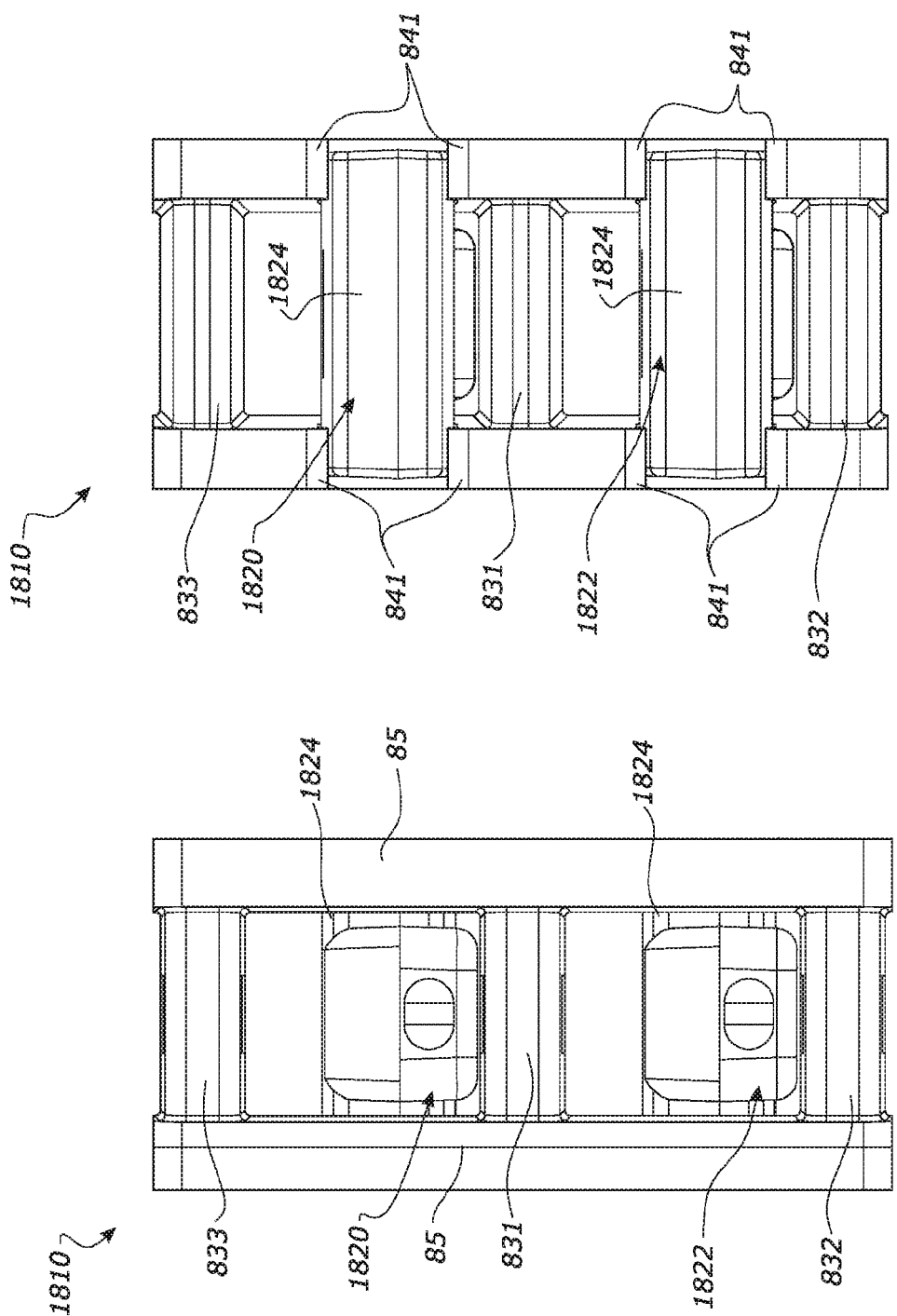

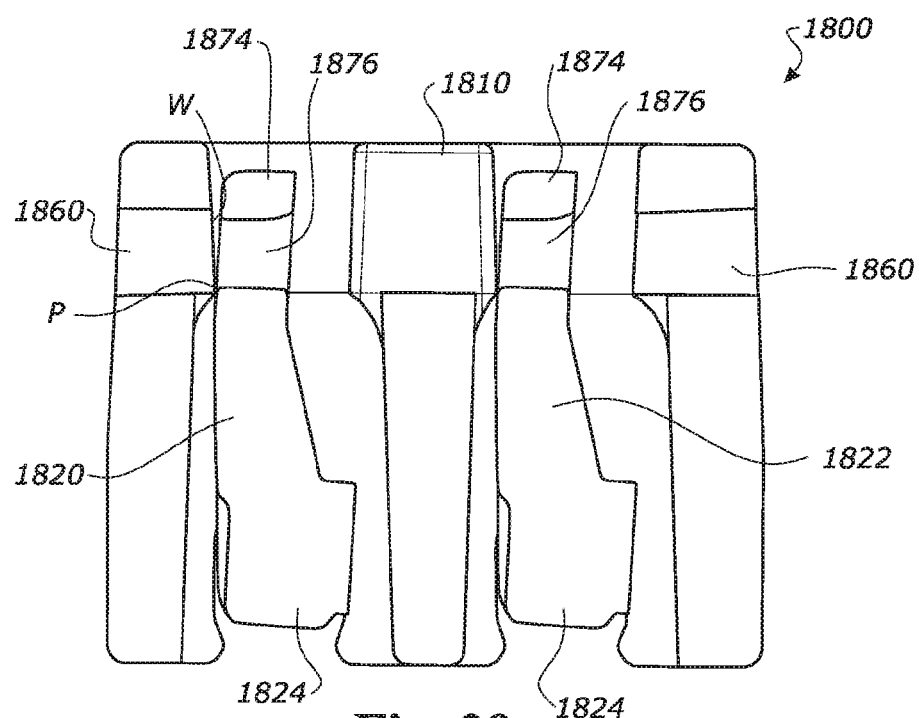
Fig. 29
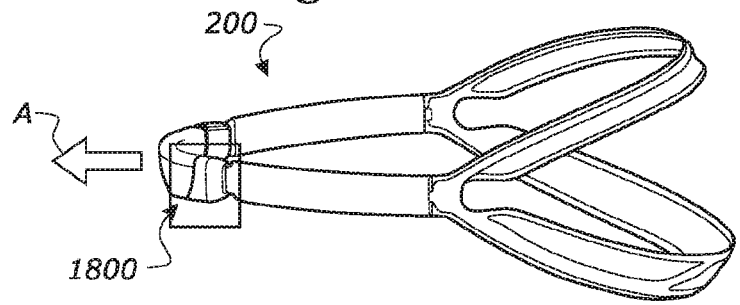
a)
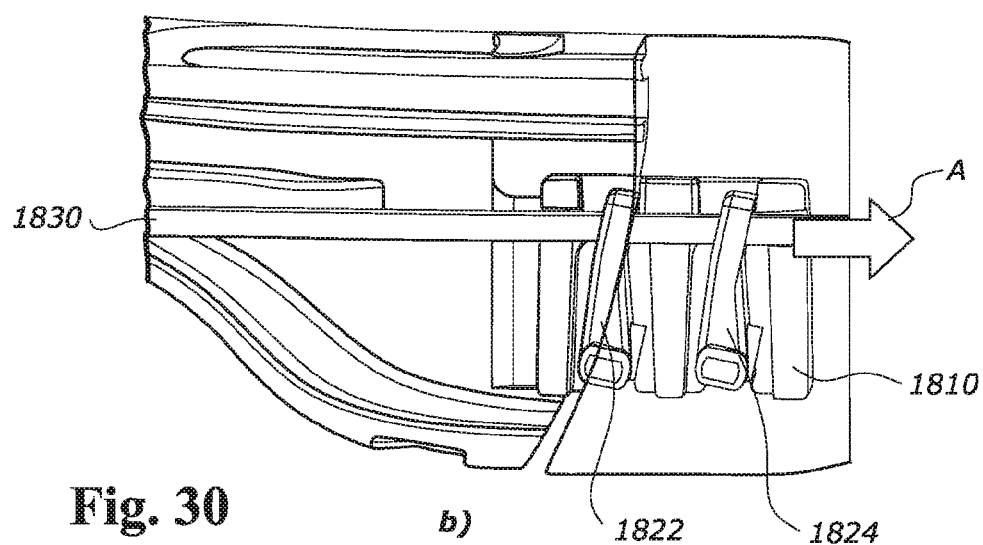
Fig. 30 b)

HEADGEAR WITH DIRECTIONAL ADJUSTMENT MECHANISM

FIELD OF THE DISCLOSURE

The present disclosure relates to respiratory therapy systems. More particularly, the present disclosure relates to various components of a respiratory mask system.

This disclosure relates to the disclosure of the following earlier patent applications, the entire contents of which are hereby incorporated by reference: WO2014/175752 filed 24 Apr. 2014, WO2016/043603 filed 16 Sep. 2015, WO2017/158544 filed 16 Mar. 2017, WO2017/160166 filed 15 Mar. 2016, and U.S. 62/644,002 filed 16 Mar. 2018. This application also hereby incorporates by reference the entire contents of provisional applications U.S. 62/755,766 filed 5 Nov. 2018, U.S. 62/755,777 filed 5 Nov. 2018, and U.S. 62/842,982 filed 3 May 2019, and PCT/NZ2019/050147 filed 5 Nov. 2019, the entire contents of each of which are hereby incorporated by reference. This application is a National Phase Application of PCT International Application No. PCT/NZ2020/050152, which claims priority from provisional application U.S. 62/935,539 filed 14 Nov. 2019, the entire contents of which are also hereby incorporated by reference.

DESCRIPTION OF THE RELATED ART

Masks providing a substantially air-tight seal between a wearer and the mask are used in a variety of fields (for example gas masks, diving masks, respiratory therapy masks). Some of these masks use headgear including one or more straps to secure the mask against the face of the wearer.

Respiratory masks are used to provide respiratory therapy to the airways of a person suffering from any of a number of respiratory illnesses or conditions. Such therapies may include but are not limited to continuous positive airway pressure (CPAP) therapy and non-invasive ventilation (NIV) therapy.

CPAP therapy can be used to treat obstructive sleep apnea (OSA), a condition in which a patient's airway intermittently collapses, during sleep, preventing the patient from breathing for a period of time. The cessation of breathing, or apnea, results in the patient awakening. Repetitive and frequent apneas may result in the patient rarely achieving a full and restorative night's sleep.

CPAP therapy involves the delivery of a supply of continuous positive air pressure to the airway of the patient via a respiratory mask. The continuous positive pressure acts as a splint within the patient's airway, which secures the airway in an open position such that the patient's breathing and sleep are not interrupted.

Respiratory masks typically comprise a patient interface and a headgear, wherein the patient interface is configured to deliver the supply of continuous positive air pressure to the patient's airway via a seal or cushion that forms an airtight seal in or around the patient's nose and/or mouth. Respiratory masks are available in a range of styles including full-face, nasal, direct nasal, pillows and oral masks, which create an airtight seal with one or more of the nares, nose and/or mouth. The seal or cushion is held in place on the patient's face by the headgear.

In order to maintain an airtight seal, the headgear should provide support to the patient interface such that it is held in a stable position relative to the patient's face during use. Such respiratory masks may also be used to deliver NIV and other pressure or flow related therapies.

SUMMARY OF THE DISCLOSURE

Aspects of this disclosure may provide improved components associated with such a headgear, for example any one or more of a yoke assembly, a directional adjustment unit, a filament, one or more straps.

Aspects of this disclosure may provide an improved directional adjustment unit and associated filament design for reducing the shear stress on the filament, in use, thereby reducing the wear on the associated components during use. Such an improved directional adjustment unit may form part of a respiratory mask.

In some configurations, this is achieved by providing a frictional engagement member of the directional adjustment unit with an aperture having a transverse cross sectional shape forming at least one linear or substantially linear portion of the frictional engagement member for engaging a corresponding flat or substantially flat portion of the filament when the at least one frictional engagement member is in an engaged configuration.

In some configurations, the expression "linear" may be interchangeably be referred to as "straight".

The systems, methods and devices described herein have innovative aspects, no single one of which is indispensable or solely responsible for their desirable attributes. Without limiting the scope of the claims, some of the advantageous features will now be summarized.

According to one aspect of this disclosure, there is provided a directional adjustment unit for a headgear for a respiratory mask, comprising,
  a) a movable frictional engagement member comprising an aperture forming a cavity extending through the frictional engagement member, wherein the aperture is arranged to receive a filament of a strap of the headgear therethrough, wherein the frictional engagement member in a first configuration provides a disengaged configuration with respect to the filament, and in a second configuration provides an engaged configuration with respect to the filament;
  b) the directional adjustment unit further comprising a filament guide configured to guide the filament as it passes through the directional adjustment unit, the filament guide being configured to engage the filament to restrain the filament against bending of the filament in the directional adjustment unit.

The filament guide may be provided at a filament inlet and/or outlet of the directional adjustment unit.

The filament guide may be adjacent the aperture of the frictional engagement member.

The directional adjustment unit may comprise a plurality of filament guides.

The frictional engagement member may be located between a pair of the filament guides.

The directional adjustment unit may comprise at least two frictional engagement members.

The filament guide may be provided at a position intermediate the two frictional engagement members.

The or each aperture of the or each frictional engagement member may comprise a cavity which forms an engagement surface that is linear or substantially linear in transverse cross-section, the engagement surface for engaging a flat or substantially flat portion of the filament when the at least one frictional engagement member is in the engaged configuration.

The or each frictional engagement member may be movable around a respective pivot axis and wherein the first configuration comprises a first pivoted configuration, and the second configuration comprises a second pivoted configuration.

The pivot axis may be movable with respect to the directional adjustment unit.

The directional adjustment unit may comprise a base, wherein each pivot axis is movable toward and away from the base of the directional adjustment unit.

Each pivot axis may be movable independently of the other pivot axis.

The filament guide may comprise at least one guide surface against which the filament engages in use.

The guide surface may be positioned to engage at least an upper surface of the filament.

The guide surface may be positioned to engage at least a lower surface of the filament.

The guide surface may be linear or substantially linear in transverse cross-section, for slidably engaging a flat or substantially flat portion of the filament, in use.

The directional adjustment unit may comprise a plurality of filament guides, each filament guide comprising a guide surface configured to guide and engage the filament, the guide surfaces being aligned along a longitudinal axis of the directional adjustment unit when the unit is viewed from the side.

The directional adjustment unit may comprise a plurality of filament guides, each filament guide comprising a guide surface configured to guide and engage the filament, the guide surfaces being aligned along a longitudinal axis of the directional adjustment unit when the unit is viewed from above.

The filament guide may comprise an opening through which the filament passes.

The directional adjustment unit may comprise at least one housing, the or each frictional engagement member being contained in and movable with respect to the at least one housing.

The directional adjustment unit may comprise at least two frictional engagement members, the frictional engagement members being contained in and movable with respect to the housing.

The directional adjustment unit may comprise at least two frictional engagement members and a plurality of housings, each frictional engagement member being contained in and movable with respect to a respective housing.

The or each housing may comprise a base and a top, and opposed ends between the base and top, the aperture of the or each frictional engagement member being movable in a direction generally toward and away from the opposed ends between the disengaged and engaged configurations.

The filament guide may comprise or be provided on an intermediate wall of the housing, between and spaced from the opposed ends of the housing.

The filament guide may comprise or be provided on at least one of the opposed ends of the housing.

The opposed ends of the housing may comprise end walls of the housing.

The guide surface of the filament guide may be substantially linear in transverse cross-section, for slidably engaging a flat or substantially flat portion of the filament, in use.

The filament may be of quadrilateral cross section, and may be of rectangular cross section.

The directional adjustment unit may comprise a plurality of filament guides, each filament guide comprising a guide surface configured to guide and engage the filament, the guide surfaces being aligned along a longitudinal axis of the directional adjustment unit when the unit is viewed from the side.

The directional adjustment unit may comprise a plurality of filament guides, each filament guide comprising a guide surface configured to guide and engage the filament, the guide surfaces being aligned along a longitudinal axis of the directional adjustment unit when the unit is viewed from above.

The or each frictional engagement member may comprise a base member through which the pivot axis extends.

The directional adjustment unit may comprise a mounting slot, the mounting slot comprising a retaining space for movably retaining a follower to movably retain the frictional engagement member on or in the directional adjustment unit.

The or each frictional engagement member may have a base member, the aperture being spaced from the base member.

The base member may comprise the follower.

The directional adjustment unit may comprise at least two mounting slots, each mounting slot having a retaining space for movably retaining a respective part of the base member of a frictional engagement member.

Each retaining space may be sized so as to allow translational movement of the follower within the retaining space along a predetermined path, whilst being retained.

The mounting slot may be elongate when the directional adjustment unit is viewed from the side.

The mounting slot may extend in a substantially vertical direction, when the directional adjustment unit is viewed from the side.

The retaining space may comprise at least one narrower section to resist the base member from moving past said narrowing section.

Each retaining space may be sized so as to allow the follower to pivot around its pivot axis within the retaining space.

The or each frictional engagement member may be mounted in or on the directional adjustment unit for both:
  pivotal movement relative to the directional adjustment unit about a pivot axis; and
  translational movement relative to the directional adjustment unit in a direction orthogonal to the pivot axis, along a predetermined elongate path extending away from the pivot axis, when the unit is viewed along the pivot axis. The pivot axis thus itself moves along the predetermined elongate path. The or each frictional engagement member can simultaneously pivot about the pivot axis.

The predetermined elongate path may comprise an elongate slot in one of the frictional engagement member and a housing of the directional adjustment unit, and a follower on the other of the frictional engagement member and a housing of the directional adjustment unit, the follower being received in the slot.

The guide surface may comprise a planar portion, when viewed in a direction substantially parallel to the pivot axis of the frictional engagement member.

The guide surface may be linear or substantially linear, when viewed in a direction substantially parallel to the pivot axis of the frictional engagement member.

The aperture, may be or may comprise any of:
  a) non-circular;
  b) non-elliptic;
  c) quadrilateral;
  d) at least one straight portion;

e) at least one arcuate portion;
f) at least one portion that is substantially parallel to a pivot axis of the frictional engagement member;
g) triangular.

The aperture may be offset from the pivot axis when the directional adjustment unit is viewed from the side.

The cavity may extend through the at least one frictional engagement member in a direction substantially perpendicular to the pivot axis.

The engagement surface may form part of at least one interior cavity wall surface of the at least one frictional engagement member.

The cavity may have the shape of a rectangular elongated body or prism or cuboid.

The cavity may have the shape of a triangular elongated body or prism or cuboid.

At least a portion of an interior cavity sidewall surface may have a flat or substantially flat profile when the directional adjustment unit is viewed from the side.

The cavity may be substantially straight, when the frictional engagement member is viewed from the side.

The cavity may be substantially arcuate, when the frictional engagement member is viewed from the side.

The at least one frictional engagement member may comprise a base member through which the pivot axis extends, and at least one arm member extending from the base member, the aperture being provided in the arm member.

The arm member may extend away from the base member and the pivot axis.

The arm member may comprise a plurality of arm member portions, at least one arm member portion being inclined relative to another arm member portion.

The arm member may be tapered along at least part of its length.

The arm member may be of rectangular cross section along at least part of its length.

The directional adjustment unit may be configured such that at least in the engaged configuration the frictional engagement member frictionally engages the filament, in use.

The directional adjustment unit may be configured such that when the or each frictional engagement member is in the disengaged configuration with respect to the filament, the filament can move through the directional adjustment unit with a first resistance to that movement between the filament and the frictional engagement members, and wherein when each frictional engagement member is in the engaged configuration with respect to the filament, the filament can move through the directional adjustment unit with a second resistance to that movement between the filament and the frictional engagement members, the second resistance being greater than the first resistance.

The filament guide may comprise an opening through which the filament passes, the opening being smaller than at least one portion of the filament, such that the at least one portion of the filament cannot pass through the opening.

At least part of at least one edge of the aperture of at least one frictional engagement member may be chamfered.

The entire periphery of the edge of the aperture may be chamfered, or only the portion or portions of the edges that directly engages the filament.

The aperture may comprise three or more sides when viewed along the longitudinal axis of the filament.

According to another aspect of this disclosure there is provided a directional adjustment unit for a headgear for a respiratory mask, comprising:

a) a movable frictional engagement member, the frictional engagement member having an aperture forming a cavity extending through the frictional engagement member, wherein the aperture is arranged to receive a filament of a strap of the headgear therethrough such that the filament follows a filament path through the directional adjustment unit, wherein the frictional engagement member in a first configuration provides a disengaged configuration with respect to the filament, and in a second configuration provides an engaged configuration with respect to the filament;
b) the directional adjustment unit further comprising a filament guide configured to guide the filament as it passes through the directional adjustment unit, the filament guide being configured to engage the filament to restrain the filament against bending of the filament in the directional adjustment unit at a location in which it engages the filament;
c) wherein the frictional engagement member is mounted on the directional adjustment unit such that the frictional engagement member can move relative to the directional adjustment unit along a predetermined elongate path which extends in a direction orthogonal to the filament path, when the at least one frictional engagement member moves from the disengaged configuration to the engaged configuration.

According to another aspect of this disclosure there is provided a directional adjustment unit for a headgear for a respiratory mask, comprising a) at least one movable frictional engagement member, the frictional engagement member having an aperture forming a cavity extending through the at least one frictional engagement member, wherein the aperture is arranged to receive a filament of a strap of the headgear therethrough such that the filament follows a filament path through the directional adjustment unit, wherein the frictional engagement member in a first configuration provides a disengaged configuration with respect to the filament, and in a second configuration provides an engaged configuration with respect to the filament; and
b) the directional adjustment unit further comprising a filament guide configured to guide the filament as it passes through the directional adjustment unit, the filament guide being configured to engage the filament to restrain the filament against bending of the filament in the directional adjustment unit at a location in which it engages the filament;
c) wherein the frictional engagement member is movable relative to the directional adjustment unit about at least two degrees of freedom, when the at least one frictional engagement member moves from the disengaged configuration to the engaged configuration.

One of the two degrees of freedom may comprise a pivotal movement of the frictional engagement member such that the frictional engagement member pivots along the filament path.

One of the two degrees of freedom may comprise a translational movement of the frictional engagement member along a predetermined elongate path which extends in a direction orthogonal to the filament path.

According to another aspect of this disclosure there is provided a headgear for a respiratory mask, comprising,
the directional adjustment unit of any of the above statements, and
at least one filament.

The headgear may be configured such that:

the aperture of the frictional engagement member comprises a cavity which forms an engagement surface that is linear or substantially linear in transverse cross-section; and the filament comprises a filament body having at least one flat or substantially flat exterior surface extending along a longitudinal axis thereof which is brought into contact with the engagement surface of the directional adjustment unit, when in the engaged configuration.

The filament may further comprise
a) a body portion having a first shape and/or size,
b) an end portion having a second shape and/or size, and
c) a transitional portion provided longitudinally between the body portion and the end portion, wherein the transitional portion has a shape and/or size which transitions from the shape and/or size of the body portion to the shape and/or size of the end portion.

The headgear may comprise a yoke assembly configured to connect the headgear to the respiratory mask.

The directional adjustment unit may be at least partially arranged in the yoke assembly.

The yoke assembly may comprise a central portion and at least one laterally extending portion extending from the central portion, wherein the at least one laterally extending portion is configured to connect to the at least one strap of the headgear.

The headgear may comprise a frame configured to connect the headgear to the respiratory mask.

The directional adjustment unit may be at least partially arranged in the frame.

According to another aspect of this disclosure there is provided a directional adjustment unit for a headgear for a respiratory mask, comprising,
a movable frictional engagement member comprising an aperture forming a cavity extending through the at least one frictional engagement member, wherein the aperture is arranged to receive a filament of a strap of the headgear therethrough, wherein the frictional engagement member is movable between a first configuration and a second configuration with respect to the filament,
wherein the first configuration provides a pre-activation configuration in which the frictional engagement member engages the filament with a first friction force between the frictional engagement member and the filament;
and wherein the second configuration provides an engaged configuration in which the frictional engagement member engages the filament with a second friction force between the frictional engagement member and the filament;
the second friction force being greater than the first friction force.

According to another aspect of this disclosure there is provided a directional adjustment unit for a headgear for a respiratory mask, comprising,
a movable frictional engagement member comprising an aperture forming a cavity extending through the at least one frictional engagement member, wherein the aperture is arranged to receive a filament of a strap of the headgear therethrough, wherein the frictional engagement member is movable between a first configuration and a second configuration with respect to the filament, wherein the frictional engagement member frictionally engages the filament to resist movement of the filament through the aperture, when in both configurations, the resistance to movement being different for each configuration.

When in the first configuration a central axis through the aperture may be inclined at a first inclination angle relative to the housing.

When in the second configuration, the central axis of the aperture may be inclined at a second inclination angle relative to the longitudinal axis of the filament, the second inclination angle being greater than the first inclination angle.

The directional adjustment unit may comprise a housing, the frictional engagement member being movably mounted in the housing.

The housing may comprise a vertical housing axis substantially perpendicular to the filament, the central axis through the aperture being inclined at an inclination angle relative to the vertical housing axis.

The housing may comprise an entry opening through which the filament extends into the housing, the entry opening comprising a central entry opening axis which is non-parallel with the aperture central axis.

The central entry opening axis may be inclined at an inclination angle with respect to the aperture central axis, when the frictional engagement member is in the first configuration.

The aperture central axis may be inclined with respect to the central entry opening axis, when the frictional engagement member is in the first configuration.

The frictional engagement member may be elongate and comprises a longitudinal axis, the longitudinal axis being non-parallel with a vertical axis of the housing, when in both first and second configurations.

The first inclination angle may be between 0 and 10°, or between 0.5 and 8°, or between 1 and 6°, or is approximately 3°.

The second inclination angle may be less than 25°.

The inclination angle may increase between the first and second configurations.

The maximum inclination angle when in the second configuration may increase by between 1 and 30°, or between 2 and 25°, or is approximately 6°.

The housing may comprise a filament pathway through the entry opening and the aperture in the frictional engagement member, the filament pathway being non-straight, or at least comprising a non-straight portion, when the frictional engagement member is in the first configuration.

The entry opening may have a vertical dimension, and the filament has a vertical dimension, the vertical dimension of the entry opening being between 10 and 50% greater than the vertical dimension of the filament, or between 15 and 40% greater, or approximately 25% greater.

According to another aspect of the invention there is provided a directional adjustment unit for a headgear for a respiratory mask, comprising,
a housing;
a movable frictional engagement member comprising an aperture forming a cavity extending through the at least one frictional engagement member, wherein the aperture is arranged to receive a filament of a strap of the headgear therethrough, the frictional engagement member being movably mounted in the housing;
wherein the frictional engagement member in a second configuration provides an engaged configuration with respect to the filament;
wherein, the housing comprises a housing wall against which the frictional engagement member abuts when in the first configuration; the housing wall limiting movement of the frictional engagement member;

wherein at least one of the frictional engagement member and the housing wall is configured to provide a discrete contact region between the frictional engagement member and the housing wall, the discrete contact region being less than the area of the housing wall.

The discrete contact region may be defined by a surface formation on the housing wall and/or the frictional engagement member.

The surface formation may comprise a protruding portion configured to provide the discrete area of contact between the frictional engagement member and the housing wall.

The protruding portion may comprise an edge of the housing wall.

The housing wall may be inclined such that the edge protrudes into the housing.

The edge may be a lower edge of the housing wall that protrudes into the housing.

The edge may be an upper edge of the housing wall that protrudes into the housing.

The protruding portion comprises any one or more of:
a) an elongate rib
b) a straight formation;
c) an arcuate formation;
d) a triangular formation;
e) a domed formation.

The surface formation may comprise a recessed portion configured to provide a discrete area of non-contact, the discrete contact region between the frictional engagement member and the housing wall being defined by one or more regions adjacent the recessed portion.

The directional adjustment unit may comprise a plurality of discrete contact regions.

The housing may comprise the discrete contact region.

The frictional engagement member may comprise the discrete contact region.

The frictional engagement member when in a first configuration may provide a disengaged configuration with respect to the filament.

The frictional engagement member when in a first configuration may provide a pre-activation configuration in which the frictional engagement member engages the filament with a first friction force between the frictional engagement member and the filament;

and wherein the second configuration provides an engaged configuration in which the frictional engagement member engages the filament with a second friction force between the frictional engagement member and the filament;

the second friction force being greater than the first friction force.

The frictional engagement member frictionally engages the filament to resist movement of the filament through the aperture when in both configurations, the resistance to movement being different for each configuration.

According to another aspect of this disclosure there is provided a headgear for a respiratory mask, comprising,
a) a filament of a strap of the headgear; and
b) a directional adjustment unit comprising at least one movable frictional engagement member having an aperture forming a cavity extending through the frictional engagement member, wherein the aperture is arranged to receive the filament therethrough, wherein the frictional engagement member in a first configuration provides a disengaged configuration with respect to the filament, and in a second configuration provides an engaged configuration with respect to the filament, the frictional engagement member being movable between engaged and disengaged configurations;
c) the directional adjustment unit further comprising a filament guide configured to guide the filament as it passes through the directional adjustment unit, the filament guide being configured to engage the filament to restrain the filament against bending of the filament in the directional adjustment unit at a location in which it engages the filament.

According to another aspect of this disclosure there is provided a headgear for a respiratory mask, comprising,
a) a filament of a strap of the headgear; and
b) a directional adjustment unit comprising:
c) a movable frictional engagement member, the frictional engagement member having an aperture forming a cavity extending through the at least one frictional engagement member, wherein the aperture is arranged to receive a filament of a strap of the headgear therethrough, wherein the frictional engagement member in a first configuration provides a disengaged configuration with respect to the filament, and in a second configuration provides an engaged configuration with respect to the filament,
d) the directional adjustment unit further comprising a filament guide configured to guide the filament as it passes through the directional adjustment unit, the filament guide being configured to engage the filament to restrain the filament against bending of the filament in the directional adjustment unit at a location in which it engages the filament;
e) and, wherein at least one frictional engagement member is mounted on the directional adjustment unit such that the frictional engagement member can move relative to the directional adjustment unit along a predetermined elongate path which extends in a direction orthogonal to the filament path, when the at least one frictional engagement member moves from the disengaged configuration to the engaged configuration.

According to another aspect of this disclosure there is provided a headgear for a respiratory mask, comprising,
a) a filament of a strap of the headgear; and
b) a directional adjustment unit comprising
c) at least one movable frictional engagement member, the frictional engagement member having an aperture forming a cavity extending through the at least one frictional engagement member, wherein the aperture is arranged to receive a filament of a strap of the headgear therethrough, wherein the frictional engagement member in a first configuration provides a disengaged configuration with respect to the filament, and in a second configuration provides an engaged configuration with respect to the filament;
d) the directional adjustment unit further comprising a filament guide configured to guide the filament as it passes through the directional adjustment unit, the filament guide being configured to engage the filament to restrain the filament against bending of the filament in the directional adjustment unit at a location in which it engages the filament;
e) wherein the frictional engagement member is movable about at least two degrees of freedom when the at least one frictional engagement member moves from the disengaged configuration to the engaged configuration.

According to another aspect of this disclosure there is provided a headgear for a respiratory mask, comprising:
a filament of a strap of the headgear; and
a directional adjustment unit comprising:

a movable frictional engagement member comprising an aperture forming a cavity extending through the at least one frictional engagement member, wherein the aperture is arranged to receive a filament of a strap of the headgear therethrough, wherein the frictional engagement member is movable between a first configuration and a second configuration with respect to the filament, wherein the first configuration provides a pre-activation configuration in which the frictional engagement member engages the filament with a first friction force between the frictional engagement member and the filament;

and wherein the second configuration provides an engaged configuration in which the frictional engagement member engages the filament with a second friction force between the frictional engagement member and the filament;

the second friction force being greater than the first friction force.

According to a further aspect of this disclosure there is provided a headgear for a respiratory mask, comprising:

a filament of a strap of the headgear; and a directional adjustment unit comprising:

a movable frictional engagement member comprising an aperture forming a cavity extending through the at least one frictional engagement member, wherein the aperture is arranged to receive a filament of a strap of the headgear therethrough, wherein the frictional engagement member is movable between a first configuration and a second configuration with respect to the filament, wherein the frictional engagement member frictionally engages the filament to resist movement of the filament through the aperture, when in both configurations, the resistance to movement being different for each configuration.

According to another aspect of this disclosure there is provided a headgear for a respiratory mask, comprising:

a filament of a strap of the headgear; and a directional adjustment unit comprising:

a housing;

a movable frictional engagement member comprising an aperture forming a cavity extending through the at least one frictional engagement member, wherein the aperture is arranged to receive a filament of a strap of the headgear therethrough, the frictional engagement member being movably mounted in the housing;

wherein the frictional engagement member in a second configuration provides an engaged configuration with respect to the filament;

wherein, the housing comprises a housing wall against which the frictional engagement member abuts when in a first configuration; the housing wall limiting movement of the frictional engagement member;

wherein at least one of the frictional engagement member and the housing wall is configured to provide a discrete contact region between the frictional engagement member and the housing wall, the discrete contact region being less than the area of the housing wall.

According to another aspect of this disclosure there is provided a respiratory mask, comprising a directional adjustment unit and a headgear, of any one of the above statements.

According to another aspect of this disclosure there is provided a respiratory therapy system, comprising the respiratory mask of the above statement.

According to another aspect of this disclosure there is provided a directional adjustment unit for a headgear for a respiratory mask, comprising a movable frictional engagement member having an aperture forming a cavity extending through the at least one frictional engagement member, wherein the aperture is arranged to receive a filament of a strap of the headgear therethrough, such that the filament follows a filament path through the directional adjustment unit, wherein the frictional engagement member in a first configuration provides a disengaged configuration with respect to the filament, and in a second configuration provides an engaged configuration with respect to the filament, wherein the frictional engagement member is mounted on the directional adjustment unit such that the frictional engagement member can move relative to the directional adjustment unit in a direction orthogonal to the filament path, when the at least one frictional engagement member moves from the disengaged configuration to the engaged configuration.

The frictional engagement member may be mounted on the directional adjustment unit for both:

pivotal movement relative to the directional adjustment unit about a pivot axis, and translational movement relative to the directional adjustment unit in a direction orthogonal to the pivot axis.

The frictional engagement member may move from the disengaged configuration to the engaged configuration such that the frictional engagement member moves from a non-pivoted to a pivoted condition about the pivot axis, and also moves from a non-translationally displaced to a translationally displaced condition in a direction orthogonal to the pivot axis.

The directional adjustment unit may comprise a filament guide configured to guide the filament as it passes through the directional adjustment unit, the filament guide being configured to engage the filament to restrain the filament against bending of the filament in the directional adjustment unit.

The aperture may define a cavity which forms an engagement surface that is linear or substantially linear in transverse cross-section, the engagement surface for engaging a flat or substantially flat portion of the filament when the at least one frictional engagement member is in the engaged configuration.

Further aspects of the disclosure, which should be considered in all its novel aspects, will become apparent from the following description.

BRIEF DESCRIPTION OF THE DRAWINGS

Throughout the drawings, reference numbers can be reused to indicate general correspondence between reference elements. A number of embodiments of the disclosure will now be described by way of example with reference to the drawings in which:

FIGS. 3a to 3b respectively show a cross sectional front view illustrating the associated contact surfaces between a filament and a sidewall of the frictional engagement member aperture;

FIG. 4 is a cross sectional view showing a directional adjustment unit having a rectangular aperture according to an embodiment assembled in a yoke assembly;

FIGS. 5a to 5d respectively show different views of a housing sleeve allowing a housing of a directional adjustment unit according to an embodiment to be mounted securely within the yoke assembly;

FIG. 10b is a cross sectional perspective view of the directional adjustment unit of FIG. 10a;

FIGS. 13a to 13c show a respective cross sectional side view, front view, and a perspective view of a single arm portion frictional engagement member;

FIGS. 14a to 14b show a cross sectional side view and perspective view of a single arm portion frictional engagement member;

FIG. 15b is a cutaway top view of the directional adjustment unit 1800 of FIG. 15a;

FIG. 16d shows a side design view of the double arm portion frictional engagement member of FIGS. 16a to 16c;

FIG. 16e shows a front view of the double arm portion frictional engagement member of FIGS. 16a to 16d;

FIG. 16f shows a rear view of the double arm portion frictional engagement member of FIGS. 16a to 16e;

FIG. 17b shows a side view of the filament of FIG. 17a;

FIG. 26b is a cutaway perspective cross sectional view of the housing of FIG. 26a;

FIG. 26c is a perspective cross sectional view taken of the housing of FIG. 26a;

FIG. 26e is a front view of the housing of FIG. 26a;

FIG. 26f is a rear view of the housing of FIG. 26a;

FIG. 26g is a top view of the housing of FIG. 26a being provided with frictional engagement members; and FIG. 26h is a bottom view of the housing of FIG. 26a being provided with frictional engagement members.

FIG. 29 is a sectional side view of another embodiment of a directional adjustment unit in accordance with this disclosure, with a modified housing and modified frictional engagement members.

FIG. 30a is a perspective view of the headgear of FIG. 28; and FIG. 30b is an enlarged sectional view of the features inside the rectangle of FIG. 30a, and showing the frictional engagement members of the directional adjustment unit activated as per FIG. 28a.

FIG. 33 is a sectional side view of the housing and frictional engagement members of FIG. 29, showing the frictional engagement members in an activated condition, as per FIG. 28a.

FIG. 36 is an enlarged schematic side view of a frictional engagement unit in contact with a contact surface of the housing of the directional adjustment unit of FIG. 9a.

DETAILED DESCRIPTION

Figure 1A:
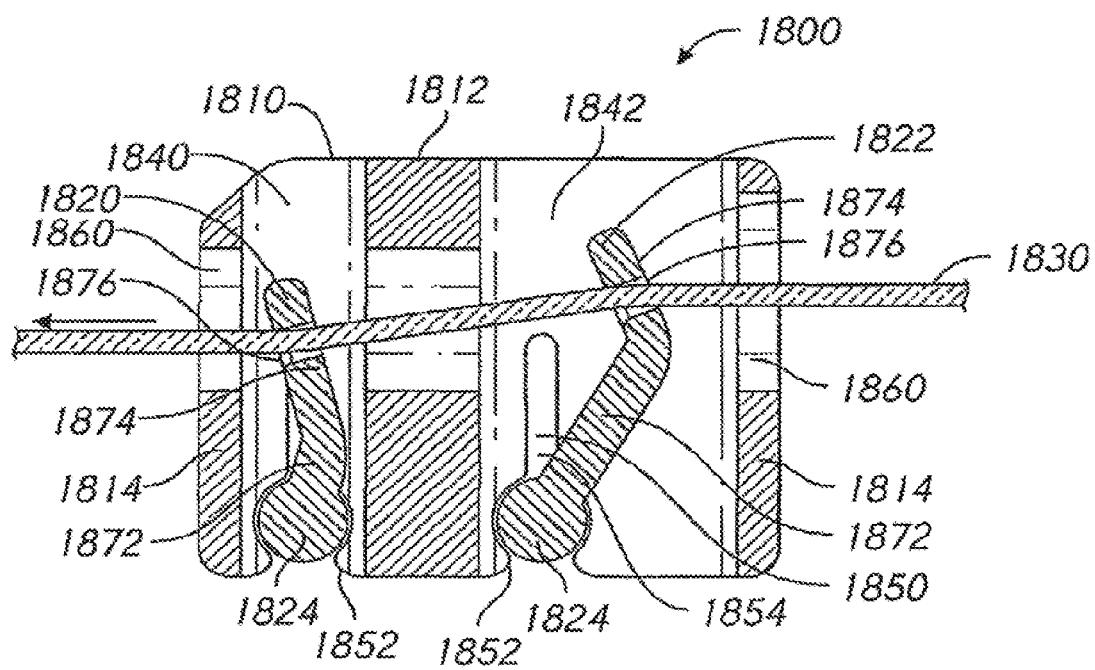
FIG. 1*a* is a cross-sectional view of a directional adjustment unit in an engaged configuration.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "horizontal," "vertical," "front," "back," "left," "right," "rear," and "side" describe the orientation and/or location of portions of the components or elements within a consistent but arbitrary frame of reference which is made clear by reference to the text and the associated drawings describing the components or elements under discussion, which in the context of a patient interface is often in an as-worn orientation with the user's head in an upright orientation. Moreover, terms such as "first," "second," "third," and so on may be used to describe separate components. Such terminology may include the words specifically mentioned above, derivatives thereof, and words of similar import.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to". Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "1 to 3," "2 to 4" and "3 to 5," etc. This same principle applies to ranges reciting only one numerical value (for example, "greater than 1") and should apply regardless of the breadth of the range or the characteristics being described.

The term "alternatively" refers to selection of one of two or more alternatives, and is not intended to limit the selection to only those listed alternatives or to only one of the listed alternatives at a time, unless the context clearly indicates otherwise.

The disclosure may also be said broadly to consist in the parts, elements and features referred to or indicated in the specification of the application, individually or collectively, in any or all combinations of two or more of said parts, elements or features.

The present disclosure relates to different components of a headgear for a respiratory mask. In particular, the associated components may relate to a directional adjustment unit for a headgear for a respiratory mask, a strap containing a filament operatively coupled to the directional adjustment unit, or a combination between the two, optionally in combination with other components associated with a headgear for a respiratory mask.

The directional adjustment unit, which may also be referred to as a directional lock unit or directional resistance unit allows the position of the headgear relative to the housing to be adjusted. The frictional engagement member in some embodiments is a form of washer, for example a lock washer or adjustment washer, comprising an aperture through which the filament extends.

FIGS. 1a-1d show an embodiment of the directional adjustment unit 1800 of our earlier application U.S. 62/644, 002, comprising a housing 1810, a first and a second lock element (for example, frictional engagement member 1820, 1822) and a filament 1830 of a headgear strap. The housing 1810 comprises a first and a second chamber 1840, 1842 wherein the first and second chambers 1840, 1842 are configured to house the first and second frictional engagement members 1820, 1822, respectively. Frictional engagement members 1820 may be made out of a material that provides at least some resistance to wear from friction (for example polypropylene, high density polyethylene, aluminium, steel). In the illustrated arrangement, the first and second chambers 1840, 1842 are separated by an internal wall 1812 of the housing 1810. However, in other arrangements, the first and second chambers 1840, 1842 are not necessarily physically separate spaces, but can, for example, be portions of a chamber. The housing 1810 has two end walls 1814, which along with the internal wall 1812, have an elongate external opening 1860 for accommodating the filament 1830, or in other words allow the filament to pass through. The filament 1830 may be an elongate thread, fibre, string, wire, or filament, for example a nylon, polyethylene, polypropylene fibre, or a metal (for example aluminium, copper, silver) wire. Advantageously, a material may be chosen that provides at least some resistance to friction, abrasion, fraying and splaying. Other shapes or geometries may be used, including a rectangular cross section (for example a ribbon, band or belt) or multiple threads, fibres, strings, wires or filaments (for example a cable or braided or twisted wires). All of these may be referred to as the filament 1830.

The material or materials of the filament may be chosen to be substantially non-elastic, thus allowing the filament 1830 to remain substantially the same length under elongative tensile force. The external housing openings 1860 may be substantially aligned with each other. The external opening 1860 of the end wall 1814 of the housing shown on the right side of the figures may be larger than one or both of the external opening 1860 of the internal wall 1812 and the end wall 1814 shown on the left of the figures. This allows for manipulation or deflection of the path of the filament 1830 through the housing 1810. The first and second chambers 1840, 1842 are each delimited by the internal wall 1812, one of the end walls 1814 and a pair of side walls 1816; wherein the side walls 1816 extend between the end walls 1814 of the housing 1810. The first and second chambers 1840, 1842 are configured to be open at one or both of a top and a bottom of the housing 1810.

Each of the first and second chambers 1840, 1842 has a pair of frictional engagement member retainers 1850 that are aligned on opposing side walls 1816 of the housing 1810. Each pair of frictional engagement member retainers 1850 is configured to pivotally retain one of the first or second frictional engagement members 1820, 1822 within the respective first or second chamber 1840, 1842. The frictional engagement member retainers 1850 comprise a circular bush 1852 and an elongate slot 1854, wherein circular bushes 1852 intersect with the bottom of the housing 1810 such that an entrance is formed. The entrance is configured to allow the first and/or second frictional engagement members 1820, 1822 to be received into the frictional engagement member retainers 1850. The slot 1854 may extend radially from the circular bush 1852 towards the top of the housing 1810.

With reference to FIGS. 1a to 1d, the first and second frictional engagement members 1820, 1822 each comprise a base 1824, forming a cylindrical shaft, and an arm that extends from their respective base 1824. The cylindrical shaft 1824 is substantially the same width W, as the housing 1810 and the arm is narrower to fit within the first and second chambers 1840, 1842. In the illustrated arrangement, the arm comprises a first arm portion 1872, a second arm portion 1874, wherein the first arm portion 1872 extends radially or perpendicularly from the cylindrical base 1824 and the second arm portion 1874 extends at an obtuse angle from the end of the first arm portion 1872. Hence, the first arm portion 1872 and the second arm portion 1874, in general extend in two respectively different directions. Such an obtuse angled double or two arm portion frictional engagement member may be referred to as a double arm portion frictional engagement member throughout the present specification.

In this particular illustrated embodiment, the first arm portion 1872 of the arm of the first frictional engagement member 1820 is shorter than the first arm portion 1872 of the arm of the second frictional engagement member 1822. The angle between the first and second arm portion 1872, 1874 of the arm of the first frictional engagement member 1820 is greater than the corresponding angle of the arm of the second frictional engagement member 1822. The angles may be selected such that the second arm portion 1874 of one or both of the first and second frictional engagement members 1820, 1822 lies substantially flat against the corresponding wall (for example, internal wall 1812 and end wall 1814, respectively) of the housing 1810 in one position of the frictional engagement members 1820, 1822. The second arm portion 1874 of the arm comprises an aperture 1876 configured to receive the filament 1830. The aperture 1876 forms an entrance to an associated elongate cavity through the second arm portion 1874, through which the filament 1830 extends. The first and second chambers 1840, 1842 differ in size according to the size of the frictional engagement member that is to be housed within it, i.e. the first chamber 1840 is smaller than the second chamber 1842 because the first frictional engagement member 1820 is smaller than the second frictional engagement member 1822. Each frictional engagement member 1820, 1822 may be configured to move independently of the other.

Hence, in some configurations, the frictional engagement members of the directional adjustment unit may be different. However, it should be appreciated that in other configurations, such as described in FIG. 9 for example, the frictional engagement members of the directional adjustment unit may be identical.

The cylindrical base 1824 of the first and second frictional engagement members 1820, 1822 have a diameter substantially the same as that of the circular bushes 1852 of the frictional engagement member retainer 1850, and are configured to be received and retained by the circular bush 1852 in a snap-fit configuration or an interference fit configuration. The snap-fit configuration is provided by the entrance of the circular bush 1852 being narrower than the diameter of the cylindrical shaft 1824. The slots 1854 of the frictional engagement member retainers 1850 are configured to allow the entrance to be flexed open to increase the ease with which the first and second frictional engagement members 1820, 1822 can be pushed through the entrances and assembled to the housing 1810. Once assembled within the first and second chambers 1840, 1842 of the housing 1810, the first and second frictional engagement members 1820, 1822 can pivot back and forward around a pivot axis that runs through the cylindrical base 1824.

The filament 1830 may be configured to pass through the external openings 1860 of the housing 1810 and the apertures 1876 of the first and second frictional engagement members 1820, 1822.

The general operation of the directional adjustment unit according to each of the embodiments disclosed herein will now be described, with reference to the particular embodiment shown in FIGS. 1a to 1d.

Figure 1B:
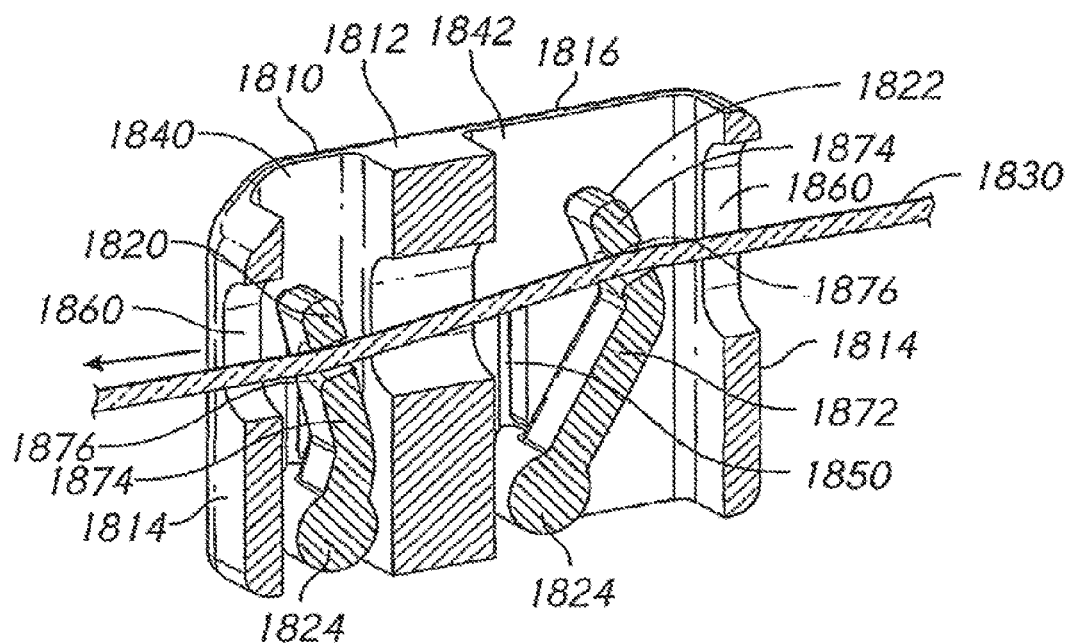
FIG. 1*b* is a perspective cross-sectional of the directional adjustment unit in FIG. 1*a* in the engaged configuration.

Application of a tension force to the filament 1830 causes the first and second frictional engagement members 1820, 1822 to pivot back and/or forward between a locked, also referred to as an engaged, position or configuration and/or open, also referred to as a disengaged, position or configuration. FIGS. 1a and 1b show the directional adjustment unit in an engaged configuration in which a force is applied to the filament 1830 in a direction towards the left side of the figure (as indicated by the arrow). In some embodiments, the force applied to the filament 1830 in this configuration causes the first and second frictional engagement members 1820, 1822 to pivot in an anti-clockwise direction (when viewed from the orientation shown in FIGS. 1a and 1b), such that the path of the filament 1830 through the directional adjustment unit 1800 is non-linear or tortuous and/or an increased frictional force is applied to resist movement of the filament 1830, for example due to an increase of the area in contact between filament 1830 and first and second frictional engagement members 1820, 1822 and/or an increase in contact pressure.

Figure 1C:
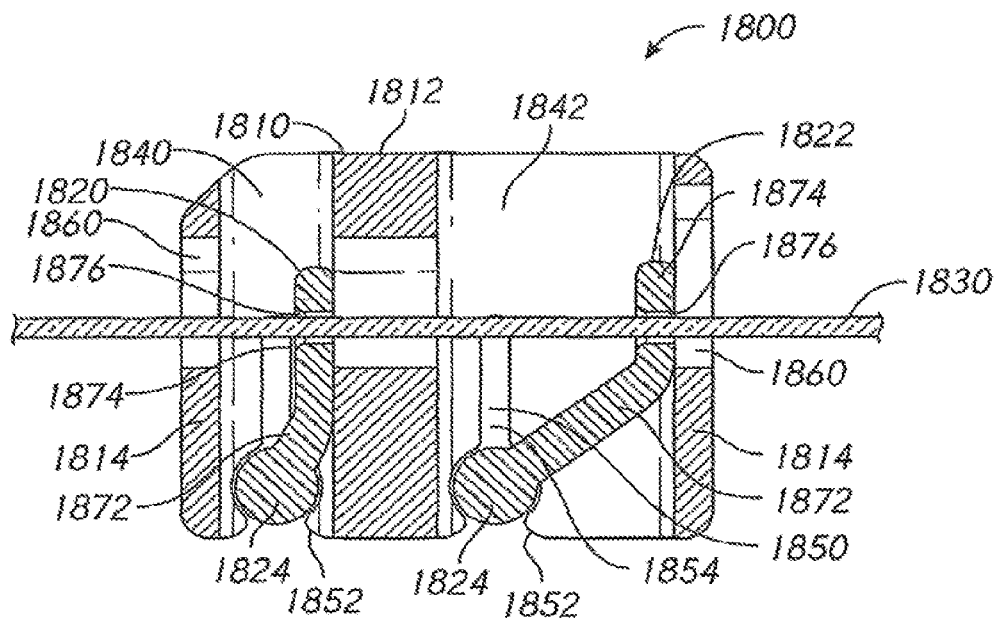
FIG. 1*c* is a cross-sectional view of the directional adjustment unit in FIG. 1*a* in an disengaged configuration.
Figure 1D:
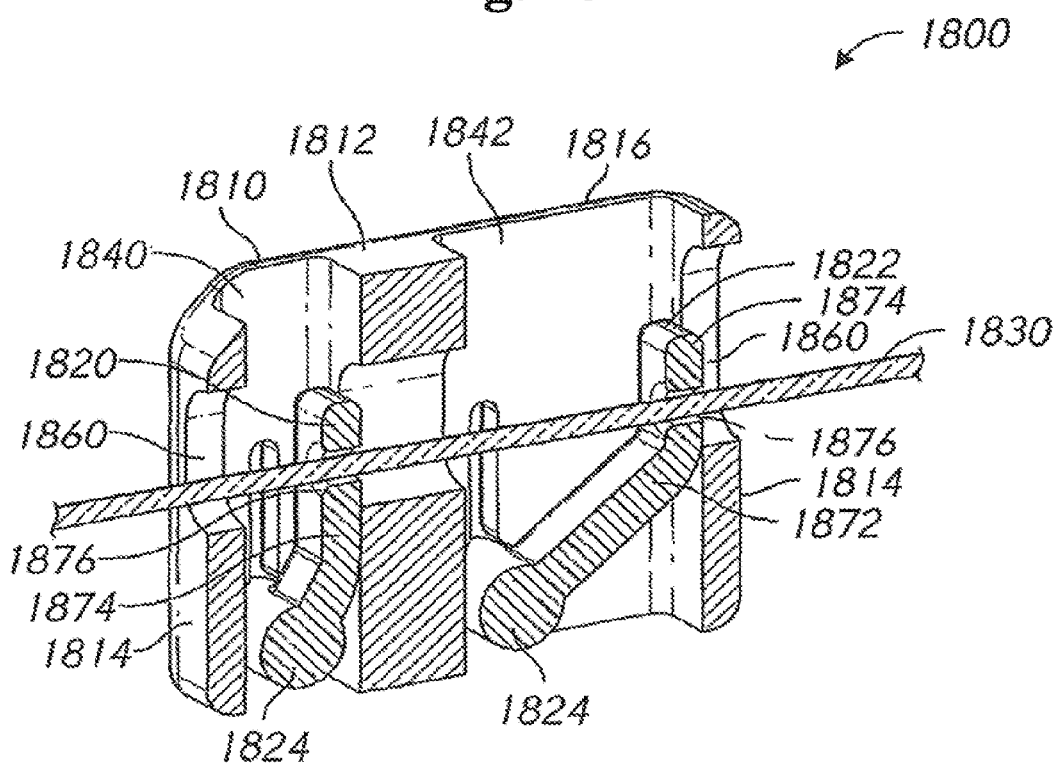
FIG. 1*d* is a perspective cross-sectional of the directional adjustment unit in FIG. 1*a* in the disengaged configuration.

FIGS. 1c and 1d show the directional adjustment unit in an open, i.e. disengaged, or unlocked configuration in which a force is applied to the filament 1830 in a direction towards the right side of the figure (as indicated by the arrow). In this configuration, the first and second frictional engagement members 1820, 1822 may be pivoted in a clockwise direction (when viewed in the orientation shown in FIGS. 1c and 1d) such that the apertures 1876 and external openings 1860 are aligned in a substantially straight line. This provides a smooth, non-tortuous and low-friction path and/or reduced contact pressure for the filament 1830 to be pulled substantially freely through the directional adjustment unit 1800. Based on the different amount of frictional force exerted on filament 1830 by the first and second frictional engagement members 1820, 1822 in the closed position and the open position, the amount of force required to move filament 1830 through the directional adjustment unit 1800 may be varied.

While the illustrated embodiment of directional adjustment unit 1800 utilizes first and second frictional engagement members 1820, 1822, fewer or more frictional engagement members could be used. The number of frictional engagement members, the type, length and thickness of filament 1830, and the geometry of frictional engagement members 1820, are design parameters that can be varied to achieve a pre-determined amount of force necessary to overcome directional adjustment unit 1800 while in the engaged, closed, or locked configuration ("yield force") and a second pre-determined force necessary to open, release or move the directional adjustment member into the disengaged position/configuration ("opening force").

The frictional engagement members 1820 are permitted to move between a disengaged configuration (FIGS. 1*c* and 1*d*) and an engaged configuration (FIGS. 1*a* and 1*b*) in response to an outward movement of an associated yoke assembly 20 or other headgear component, in use. Such movement between the disengaged and engaged configurations of the frictional engagement members 1820 can also occur in response to an increase in the circumferential size of the headgear.

When the frictional engagement members 1820 are permitted to move or pivot, the movement of filament 1830 in the elongation direction may be restricted (for example, inhibited or prevented) by friction between filament 1830 and frictional engagement members 1820, as shown in FIGS. 1*a* to 1*b*. Conversely, if the frictional engagement members 1820 are oriented in the disengaged configuration, as shown in FIGS. 1*c* to 1*d*, the friction between filament 1830 and frictional engagement members 1820 is reduced and movement of filament 1830 in the elongation direction becomes easier relative to the engaged configuration.

Additional particulars of the operation of the directional adjustment units 1800 are described above and in Applicant's earlier patent applications as referenced in the first paragraph of this specification.

In some configurations, the minimum force of the directional adjustment unit 1800 is between about 2 Newtons and 8 Newtons. In some configurations, two or more directional adjustment units with a minimum force between 2 Newtons and 8 Newtons may be combined to yield an overall minimum force between 4 and 16 Newtons, or between 16 and 32 Newtons.

In some configurations, the minimum force of the directional adjustment unit 1800 is between about 4 Newtons and 6 Newtons. In some configurations, two or more directional adjustment units with a minimum force between 4 Newtons and 6 Newtons may be combined to yield an overall minimum force between 8 and 12 Newtons, or between 16 and 32 Newtons.

For the purpose of facilitate understanding of the present disclosure the following definitions are used throughout the present specification:

A plane having a normal vector parallel to the pivot axis may also be referred to as a side plane throughout this specification.

A plane having a normal vector parallel to the pivot axis and intersecting a central line of the frictional engagement member may also be referred to as a central plane throughout this specification.

The central plane may intersect the centre of mass of the frictional engagement member or could be provided laterally offset to the centre of mass of the frictional engagement member.

A central line is a line extending through the frictional engagement member along which the aperture is at least partly symmetrical.

FIGS. 2*a* to 2*d* show different views of a yoke assembly 20 of a headgear for a respiratory mask according to an embodiment of this disclosure.

Figure 2A:
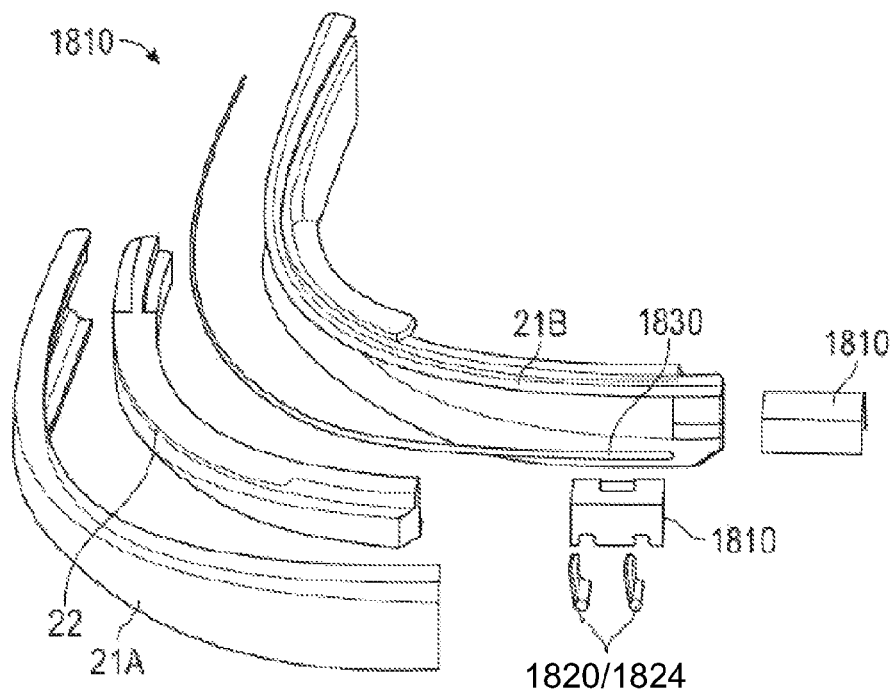
FIG. 2*a* is an exploded view of different components of a yoke assembly (end caps not shown) of a headgear for a respiratory mask comprising a directional adjustment unit and a filament.

FIG. 2*a* is an exploded view of different components of the yoke assembly 20 (end caps not shown) of a headgear for a respiratory mask. The yoke assembly 20 comprises a yoke housing 21 comprising a front member 21*a* and a rear member 21*b*. The front member 21*a* and rear member 21*b* permanently connect together with an interference fit to secure the directional adjustment unit within the yoke housing 21. A filament divider insert 22 is arranged within the yoke housing, or alternatively a filament divider may be integral with the yoke housing such that an insert is not needed.

A purpose of the filament divider insert 22 is to guide the filament in position for a directional adjustment unit of the yoke assembly 20.

The filament divider insert 22 comprises a first guide channel 221 for slidably accommodating a first filament 1830. The first guide channel 221 has a first opening arranged at a first end of the filament divider insert 22. The first opening of the first guide channel 221 is arranged at a first vertical level of the filament divider insert 22. The first guide channel 221 further comprises a second opening arranged at a second end of the filament divider insert 22. The second opening of the first guide channel 221 may be arranged at a second vertical level of the filament divider insert 22. The first vertical level and the second vertical level may relate to the same vertical level. Optionally, the first vertical level may differ from the second vertical level. In some configurations, the first vertical level may be above or below the second vertical level, in use.

The yoke assembly 20 further comprises a directional adjustment unit 1800, such as that shown with reference to FIGS. 1*a* to 1*d*. The directional adjustment unit 1800 comprises a housing 1810 and at least one frictional engagement member 1820, 1822 pivotally arranged to the housing 1810 around a pivot axis. The at least one frictional engagement member 1820, 1822 has an aperture 1876 defining a cavity extending therethrough for accommodating the filament 1830, in use. The at least one frictional engagement member 1820, 1822 provides for a disengaged configuration in a first pivoted configuration with respect to the filament 1830. The at least one frictional engagement member 1820, 1822 further provides for an engaged configuration in a second pivoted configuration with respect to the filament 1830.

Figure 2B:
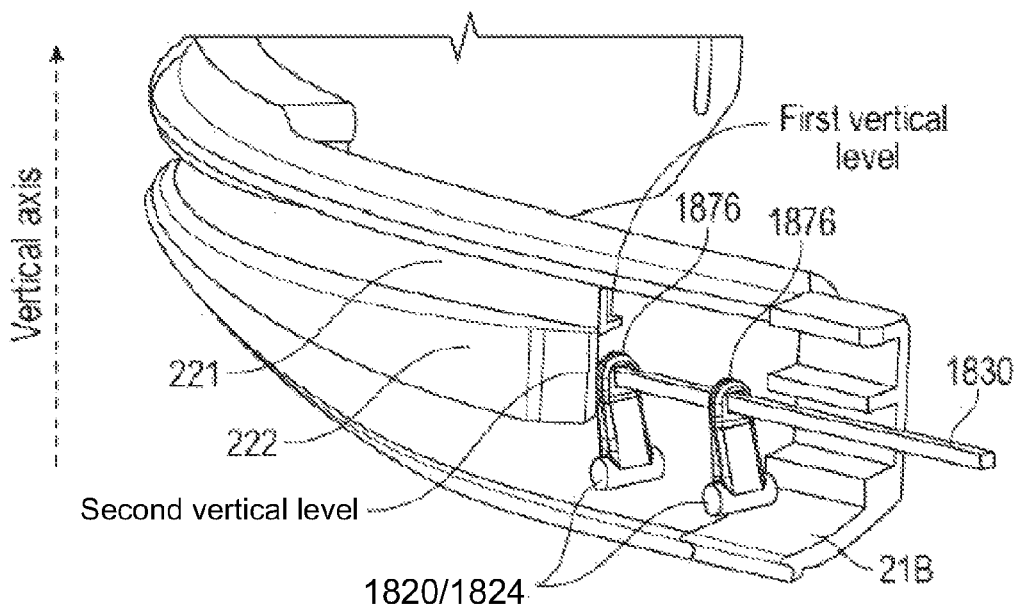
FIGS. 2*b* and 2*c* are cutaway views of a yoke assembly of FIG. 2*a*.
Figure 2C:
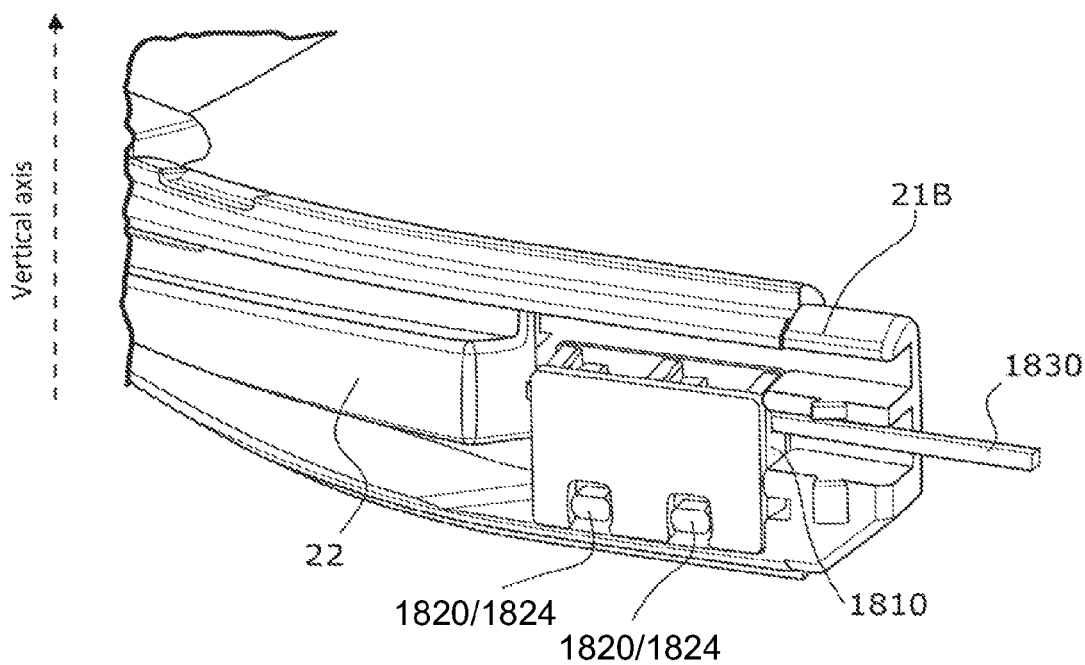
Figure 2D:
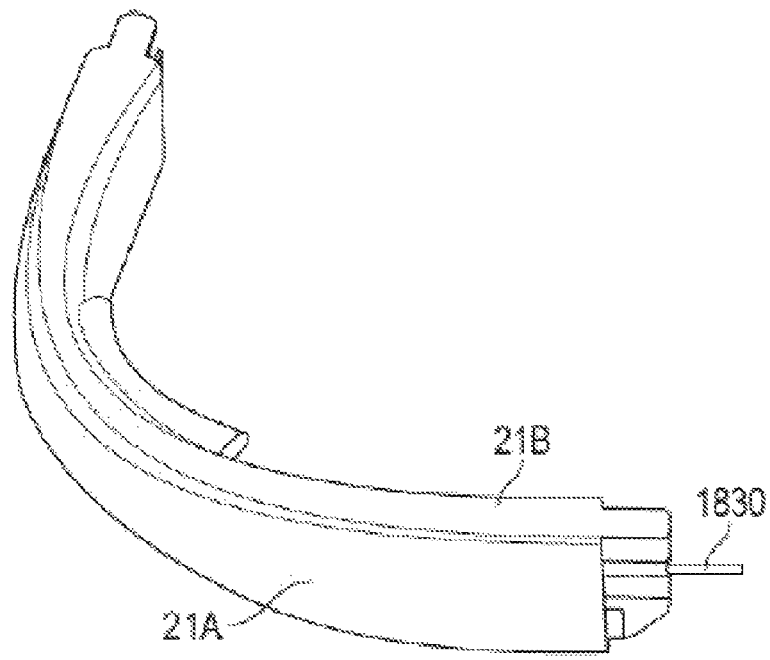
FIG. 2d is a view of the yoke assembly of FIG. 2a in a partly assembled state (with end caps and optional second directional adjustment unit not shown)

FIGS. 2*b* and 2*c* are cutaway views of a yoke assembly 20 of FIG. 2*a*. In FIG. 2*b* the directional adjustment unit housing 1810 has been removed for showing how the apertures of the at least one frictional engagement member 1820, 1822 is operatively associated with the filament 1830 and the filament divider insert 22, whereas FIG. 2*c* shows the housing 1810 to which the frictional engagement members 1820, 1822 are pivotably arranged, in use. It is also to be appreciated that in some embodiments, it is not necessary to have a separate housing component but instead the yoke itself can provide the housing for the at least one frictional engagement member. FIG. 2*d* is a view of the yoke assembly 20 of FIG. 2*a* in a partly assembled state (with end caps and optional second directional adjustment unit not shown).

With reference to FIGS. 2*a* to 2*d*, the aperture 1876 or the cavity formed by said aperture forms in a transverse cross section at least one linear or substantially linear portion of the at least one frictional engagement member 1820, 1822 for engaging a corresponding flat or substantially flat portion or exterior surface of the filament 1830 when the at least one frictional engagement member 1820, 1822 is in the engaged configuration. In some configurations, the corresponding flat or substantially flat portion or exterior surface of the filament has in transverse cross section a linear or substantially linear portion corresponding to the linear or substantially linear portion of the engagement surface.

Here "transverse" cross section means a cross section in which it is possible to observe the entire aperture boundary. The transverse cross section may be parallel to a front view plane.

As will be further elucidated below, the aperture forms a cavity extending through the frictional engagement member. In some configurations the cavity extends along a central axis. Hence, a "transverse cross section" may also mean any cross section that intersects the central axis or the extension of the cavity and/or aperture. In some configurations, the transverse cross section is perpendicular to the central axis. In other configurations, the transverse cross section may be arranged at an angle with reference to the central axis.

It should also be appreciated that the expression "linear" may also be referred to as "straight" throughout this disclosure. It is believed that a filament design and corresponding frictional engagement member aperture having respective mating linear or flat surfaces or regions, reduces the shear forces acting on the filament, in use.

We have discovered that a filament having a round shape, for example circular transverse cross section, may not withstand the load created by the natural operation of the mechanism, which causes damage to the filament in the form of a kink or permanent deformation, when operatively coupled to a frictional engagement member having a corresponding round aperture of somewhat larger size encompassing the round filament, in use. A reason for this may be that high local stress points cause deformation to the filament at the point of contact between the frictional engagement member and the filament. This may cause the round filament to be permanently deformed by reshaping the cross section into an oval shape, thus prohibiting it from returning freely through the mechanism.

The stress ($\sigma$) acting on the filament in use may be defined using the following stress formula:

$$\sigma = F/A,$$

where F relates to the associated force and A relates to the contact surface area. It follows that increasing the contact surface area will reduce the stress for any given force.

A contact surface area between a round or circular filament and a slightly larger round or circular aperture is relatively small, leading to a relatively large local stress at the contact surface area.

The Applicant has realized that an increased contact surface area may be achieved by altering the shape of the filament and aperture (and/or the associated interior cavity sidewall surfaces of the cavity formed through the frictional engagement member by the aperture) so that a respective flat or substantially flat portion of the filament engages with at least one corresponding transverse cross sectional linear or substantially linear portion of an engagement surface of the frictional engagement member.

The engagement surface may comprise the interior wall or surfaces of the aperture or the interior cavity surfaces of the cavity formed by the aperture.

A first transverse cross sectional linear or substantially linear portion of a first transverse cross section of the engagement surface, and at least one second transverse cross sectional linear or substantially linear portion of a second transverse cross section of the engagement surface, may together form at least one flat or essentially flat engagement surface or area.

The transverse cross sectional linear or essentially linear portion of the engagement surface may expand the mutual contact surface area with the filament, whereby the forces are distributed more evenly across the associated contact surfaces.

Such a design may ensure that when the filament engages an interior cavity wall surface of the frictional engagement member, the engagement or contacting surfaces are flat and apply uniform pressure over a significantly larger area. These flat surfaces engaging each other lead to a repeatable and more consistent level of engagement, which in turn leads to a more consistent level of friction being supplied by the directional adjustment unit. Further, by increasing the contact surface the stress applied to the filament is minimized and permanent damage to the filament may be prevented during the expected life time cycle.

FIGS. 3a to 3b respectively show a cross sectional front view illustrating the associated contact surfaces between a filament 1830 and a sidewall of the frictional engagement member aperture 1876. In the example of FIG. 3a both the filament and frictional engagement member aperture 1876 are rectangular in transverse cross section, whereas in FIG. 3b the filament and frictional engagement member aperture are circular in transverse cross section, as per our earlier disclosure. The respective contact points are approximately identified by the arrows. As seen from FIG. 3a, by incorporating the rectangular filament a significantly larger percentage of the total surface area of the filament contacts a surface of the frictional engagement member aperture leading a significantly lower stress in the filament as opposed to the circular filament and aperture in which only a small portion of the overlapping radiuses contact each other. This increased contacting area leads to a significantly lower stress being experienced in the filament with the same force being applied.

The contacting surfaces between the filament and frictional engagement member function with the highest mechanical efficiency when they are perpendicular with each other and are able to be fully engaged when the frictional engagement member pivots.

As described previously, with reference to FIGS. 1a to 1d, each filament is configured to contact at least two surfaces, for example interior cavity wall surfaces, of each frictional engagement member, in the engaged configuration: the upper front edge of the cavity formed by the frictional engagement member aperture 1876 and a lower rear edge of the cavity formed by the frictional engagement member aperture 1876.

In some configurations, for example with reference to FIGS. 16e and 16f, the frictional engagement member aperture 1876, in a front view, i.e. at a face of the at least one frictional engagement member 1820, is non-round, non-circular, non-elliptic, or non-oval.

In some configurations, the at least one transverse cross sectional linear or substantially linear portion of the engagement surface of the frictional engagement member 1820 is linear along a lateral or transverse axis parallel or substantially parallel to the pivot axis, and/or substantially perpendicular to the longitudinal axis of the filament 1830.

In some configurations, the frictional engagement member aperture 1876 may be provided offset to the pivot axis and extend through the at least one frictional engagement member 1820, 1822 along an axis having a component perpendicular to the pivot axis.

In some configurations, as shown with reference to FIGS. 2a to 2d, 3a to 3b, 4, 6a to 6d, 13a to 13c, 14a to 14b, 16a to 16j, the aperture, at a face, for example a front face, of the at least one frictional engagement member 1820, 1822, is rectangular.

In some configurations, the front face of at least one frictional engagement member 1820, 1822 may be formed in a plane parallel to an exterior surface of a first arm portion or second arm portion of the at least one frictional engagement member.

In some configurations, a side margin of the rectangular aperture 1876 may be parallel or substantially parallel to the pivot axis.

In some configurations, the aperture 1876 has a rectangular transverse cross section in a plane parallel to the pivot axis, and a longitudinal axis normal to the pivot axis.

In some configurations, the aperture 1876 has a rectangular transverse cross section in a plane parallel to the front face formed at the surface of a first arm portion or second arm portion of the at least one frictional engagement member.

FIG. 4 is a cross sectional front view showing a directional adjustment unit 1800 having a rectangular aperture 1876, in transverse cross section, according to an embodiment of this disclosure. In this figure, the direction adjustment unit 1800 is assembled in the yoke housing 21 comprising the front member 21a and rear member 21b. The filament divider insert 22 is shown behind the directional adjustment unit 1800. In FIG. 4 an optional housing sleeve 1899 is shown to arrange and position the directional adjustment unit 1800 in the yoke housing 21. It should be appreciated that a housing sleeve 1899 may be suitable in some situations, so as to allow for the possibility of using the same type or shape of directional adjustment unit with differently sized or shaped yoke assembly designs. However, in some configurations the directional adjustment unit housing 1810 is shaped to securely fit into the cavity formed by the yoke housing 21, without the need for an optional housing sleeve 1899.

FIGS. 5a to 5c respectively show different views of a housing sleeve 1899 allowing a housing of a directional adjustment unit according to an embodiment to be mounted securely within the yoke assembly 20.

Figure 6A:
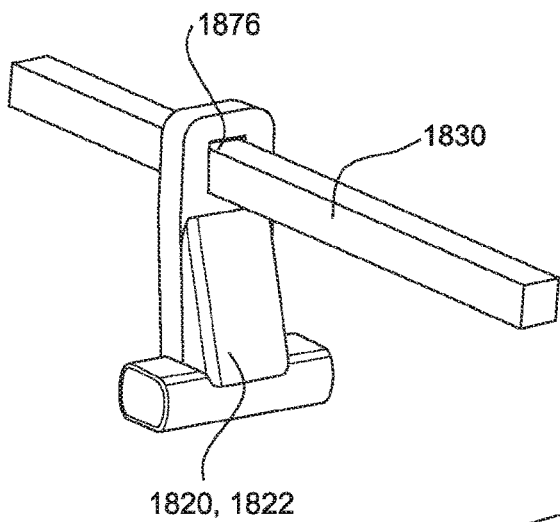
FIG. 6a shows a cutaway perspective view of a filament having a rectangular cross section accommodated through an aperture of a frictional engagement member of the directional adjustment unit, wherein the aperture has a rectangular cross section.

FIG. 6a shows a cutaway perspective view of a filament 1830 having a rectangular cross section accommodated through an aperture 1876 of a frictional engagement member 1820, 1822 of the directional adjustment unit 1800, wherein the aperture 1876 has a rectangular cross section for slidably receiving the rectangular filament 1830.

Figure 6B:
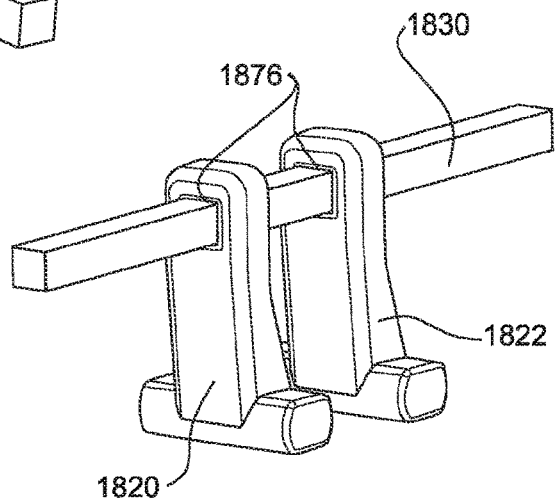
FIG. 6b shows a cutaway perspective view of a filament having a rectangular cross section accommodated through the apertures of two frictional engagement members of the directional adjustment unit, wherein the aperture has a rectangular cross section.

FIG. 6b shows a cutaway perspective view of a filament 1830 having a rectangular cross section accommodated through the apertures 1876 of a pair of frictional engagement members 1820, 1822 of the directional adjustment unit 1800, wherein the aperture 1876 has a rectangular cross section.

Figure 6C:
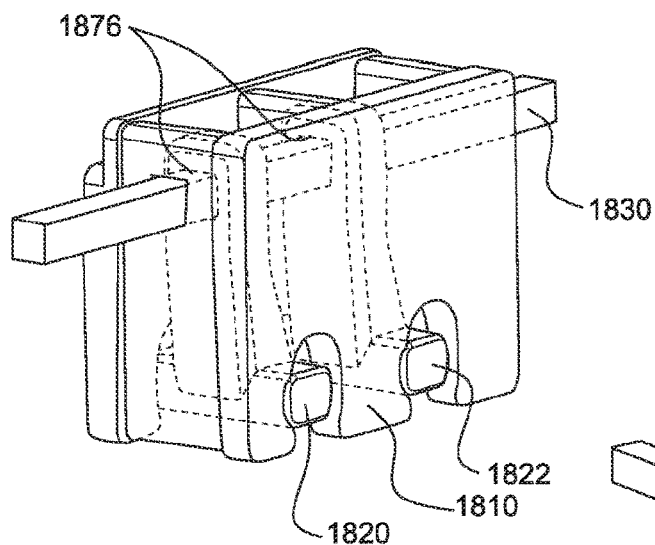
FIG. 6c shows an alternative cutaway perspective view of the arrangement of FIG. 6b, where the associated housing to which the frictional engagement members are pivotally arranged is semi-transparently shown.
Figure 6D:
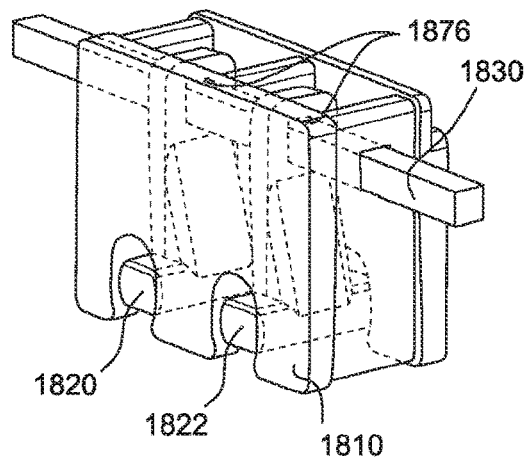
FIG. 6d shows an alternative cutaway perspective view of the arrangement of FIG. 6c.

FIG. 6c shows an alternative cutaway perspective view of the arrangement of FIG. 6b, where the associated directional adjustment unit housing 1810 to which the frictional engagement members 1820, 1822 are slidably and pivotally arranged, via a slot or retaining space 84, is semi-transparently shown. FIG. 6d shows an alternative cutaway perspective view of the arrangement of FIG. 6c. Each slot 84 is elongate in a vertical direction extending away from the pivot axis of the frictional engagement members 1820, 1822 so as to define a predetermined elongate path along which the frictional engagement members 1820, 1822 can move in use, whilst still being able to pivot about the pivot axis. In other words, the pivot axis can itself move along the predetermined elongate path from an initial pivot axis position to another pivot axis position, whilst the frictional engagement member 1820, 1822, pivots about the pivot axis. Each frictional engagement member 1820, 1822 is therefore configured to be able to move translationally away from an initial pivot axis position to a second pivot axis position. The predetermined elongate path extends, in this example, away from the base of the housing 1810, generally towards the top of the housing 1810. Thus each frictional engagement member 1820, 1822 is configured by this mounting arrangement, to be able to move about at least two degrees of freedom—pivotally about the pivot axis, and translationally away from the pivot axis, in this example.

In the examples described herein, the slots 84 are formed on housing 1810, and the frictional engagement members 1820, 1822 comprise followers received in the slots 84. In this example, an outwardly projecting base member of the frictional engagement members 1820, 1822 form each follower. In an alternative embodiment, the slots could be provided on the frictional engagement members 1820, 1822, with the followers being provided on the housing, for example as a protrusion projecting outwardly from a wall of the housing 1810.

FIGS. 7, 8, and 9d and 9e show respective cutaway views of the directional adjustment unit 1800 in the engaged configuration, i.e. when the filament 1830 and the respective frictional engagement members 1820, 1822 are brought in frictional surface contact.

As described previously, with reference to FIGS. 1a to 1d, each filament 1830 may contact at least two surfaces, for example interior cavity wall surfaces, of each frictional engagement member, in the engaged configuration. These interior cavity wall surfaces E, 81, 82 are clearly shown in FIGS. 7, 8 and 9a to 9f.

Figure 7:
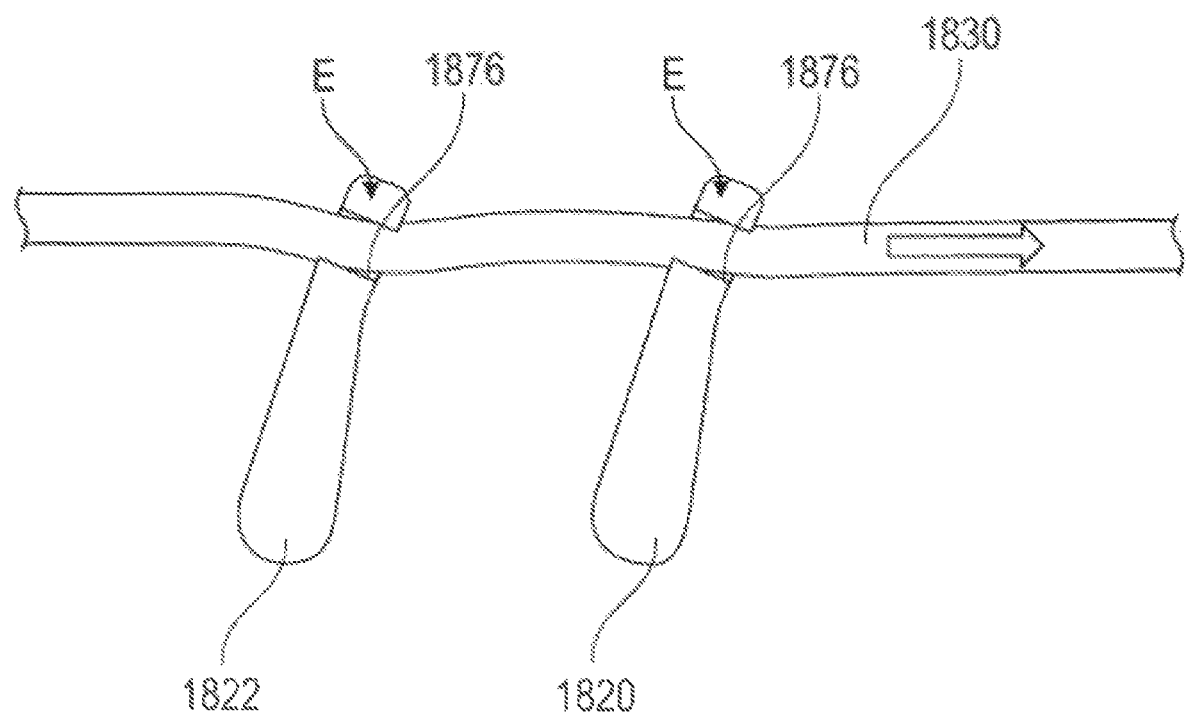
FIG. 7 is a cross sectional cutaway view of the directional adjustment unit according to an embodiment, with two frictional engagement members of the directional adjustment unit and the filament extending through the associated frictional engagement member apertures, in a plane having a normal vector parallel to the pivot axis of each frictional engagement member, wherein sharp edges are formed at an intersection between the face of each frictional engagement member and the aperture.

FIG. 7 is a cross sectional cutaway side view (i.e. in a plane perpendicular to the pivot axis of each frictional engagement member 1820) of the directional adjustment unit 1800 and an associated filament 1830 according to an embodiment of this disclosure. Although not easily perceived from FIG. 7, the aperture has a transverse cross sectional shape forming at least one linear or substantially linear or non-arcuate portion of the at least one frictional engagement member 1820, 1822. Correspondingly, the filament 1830 has a corresponding transverse cross sectional flat or substantially flat portion. Compared to a circular or cylindrical filament and transverse aperture cross section, the contact surface between the filament 1830 and engagement surface of the frictional engagement member 1820, 1822 is increased thereby decreasing the stresses on the filament 1830, in use as explained above. In this particular embodiment the aperture 1876 forms sharp edges at an intersection between the face of each frictional engagement member 1820, 1822 and the aperture 1876. The cross section of the frictional engagement members 1820, 1822 shows the interaction that occurs between the filament 1830 and the frictional engagement member 1820, 1822 as it is pulled through the path of the formed between the frictional engagement members 1820, 1822 and frictional engagement member housing 1810.

Sharp edges (E) formed at the intersection between the face of the frictional engagement members 1820, 1822 and the rectangular aperture 1876 through the frictional engagement member 1820, 1822 may interfere with the filament 1830 and the contacting points exposed to the high stress may in some situations be permanently damaged, for example by high levels of abrasion occurring due to the contact between the sharp edge and the filament surface.

In order to further alleviate the local stresses on the filament 1830, and in an attempt to further reduce or prevent damage or wear to the filament 1830 and/or frictional engagement member 1820, 1822, in use, in some embodiments at least one aperture edge is rounded, chamfered or filleted.

Hence, according to some embodiments, the aperture forms a rounded edge at a face of the at least one frictional engagement member 1820, 1822, which may be a forward face.

Figure 9A:
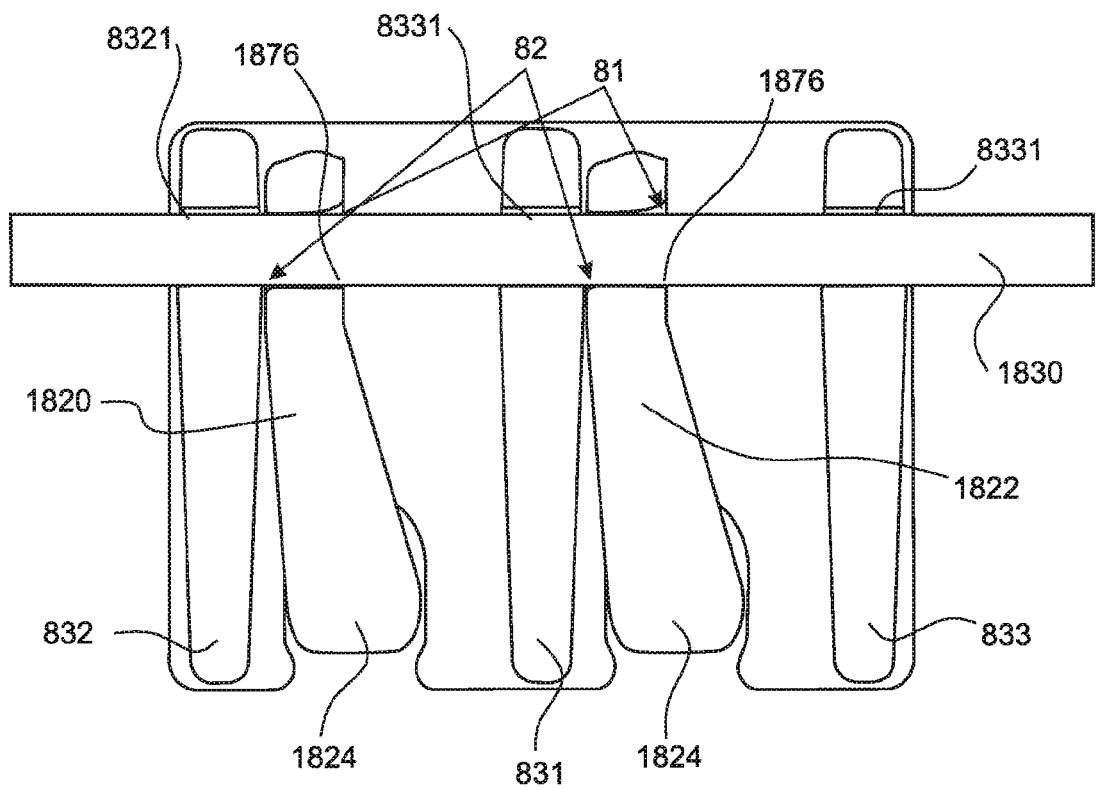
FIG. 9a is a cross sectional cutaway view of the directional adjustment unit in the disengaged configuration according to an embodiment, with two frictional engagement members of the directional adjustment unit and the filament extending through the associated frictional engagement member apertures, in a plane having a normal vector parallel to the pivot axis of each frictional engagement member, wherein rounded edges are provided at an upper intersection between the front face of each frictional engagement member and the aperture and at a lower intersection between the rear face of each frictional engagement member and the aperture.
Figure 9B:
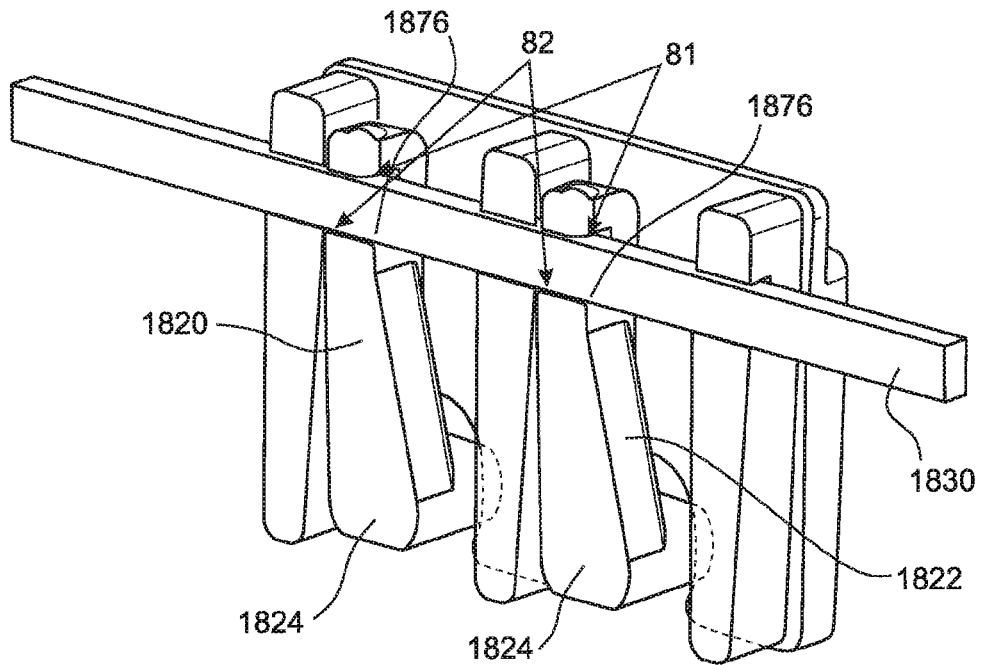
FIG. 9b is a cutaway perspective cross sectional view of the arrangement of FIG. 9a where part of the housing is shown.
Figure 9C:
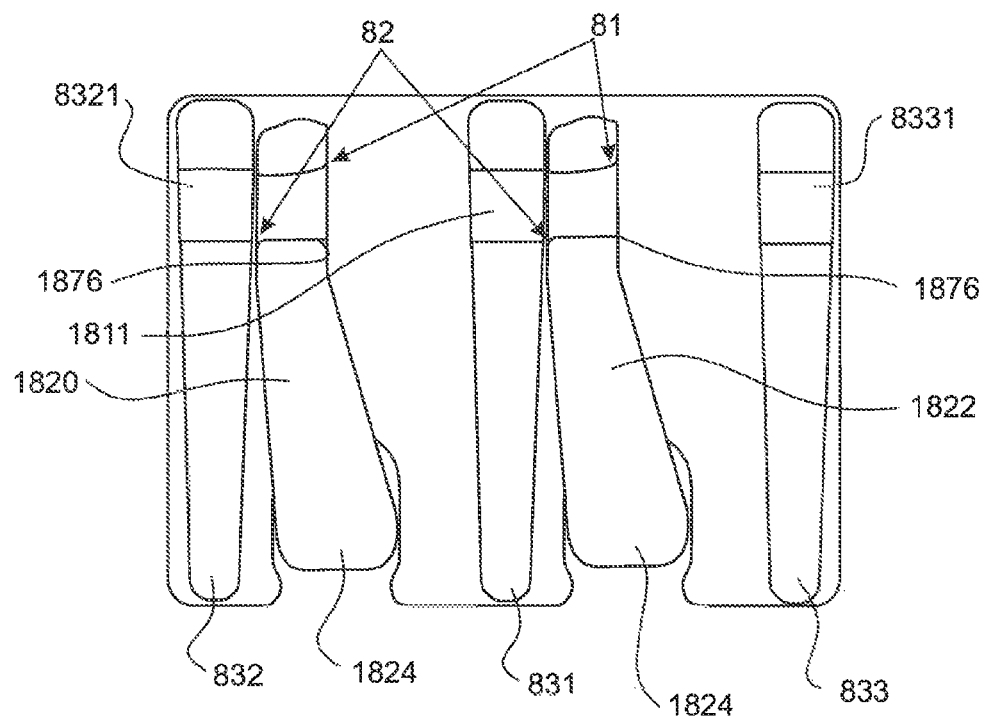
FIG. 9c is a cross sectional cutaway view of the arrangement of FIG. 9a with the filament removed.
Figure 9D:
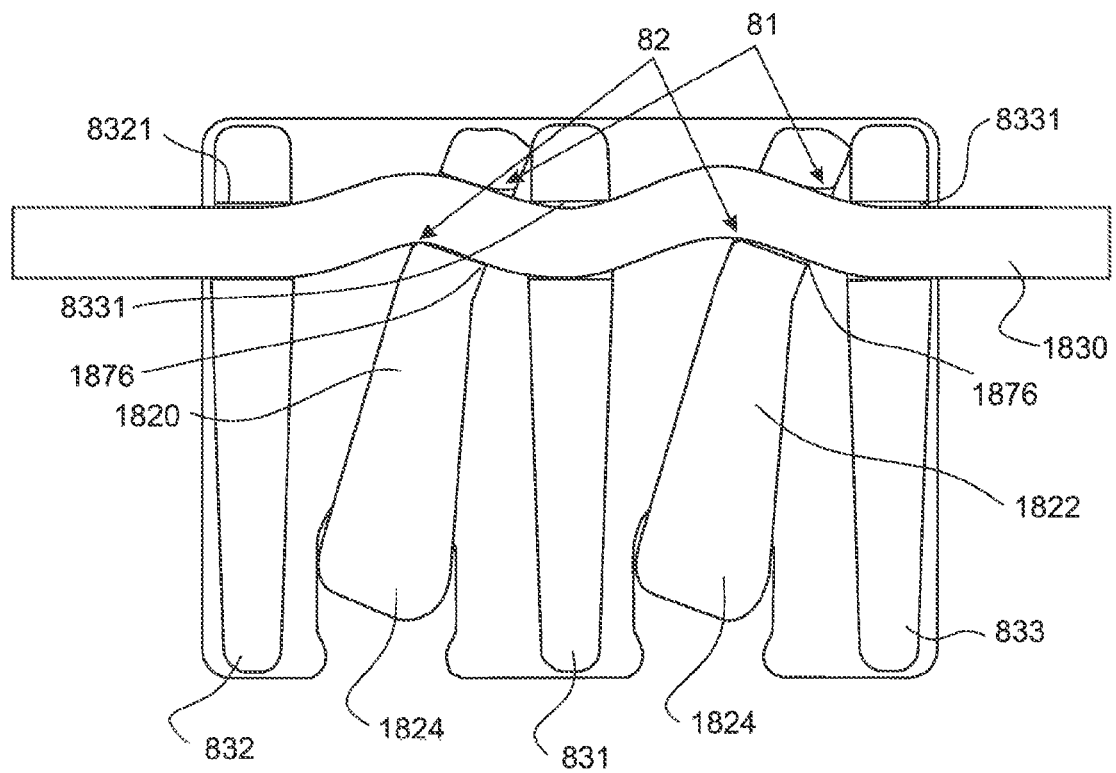
FIG. 9d is a cross sectional cutaway view of the directional adjustment unit in the engaged configuration according to an embodiment, with two frictional engagement members of the directional adjustment unit and the filament extending through the associated frictional engagement member apertures, in a plane having a normal vector parallel to the pivot axis of each frictional engagement member, wherein rounded edges are provided at an upper intersection between the front face of each frictional engagement member and the aperture.

FIGS. 9*a* to 9*f* show a pair of frictional engagement members 1820, 1822 respectively provided with such rounded aperture edges according to an embodiment. FIG. 9*d* shows a corresponding cross sectional side view to that of FIG. 7, wherein the upper front aperture edge 81, formed at an upper intersection between the front face of each frictional engagement member 1820, 1822 and the aperture 1876, is rounded. Here, the expressions "front" and "rear" are to be interpreted with reference to the front/forward direction of the arrow A (see FIG. 7) indicating the filament movement direction when moving from the disengaged configuration to the engaged configuration, where 'front' is towards the right hand side of these figures, and 'rear' is towards the left.

Figure 8:
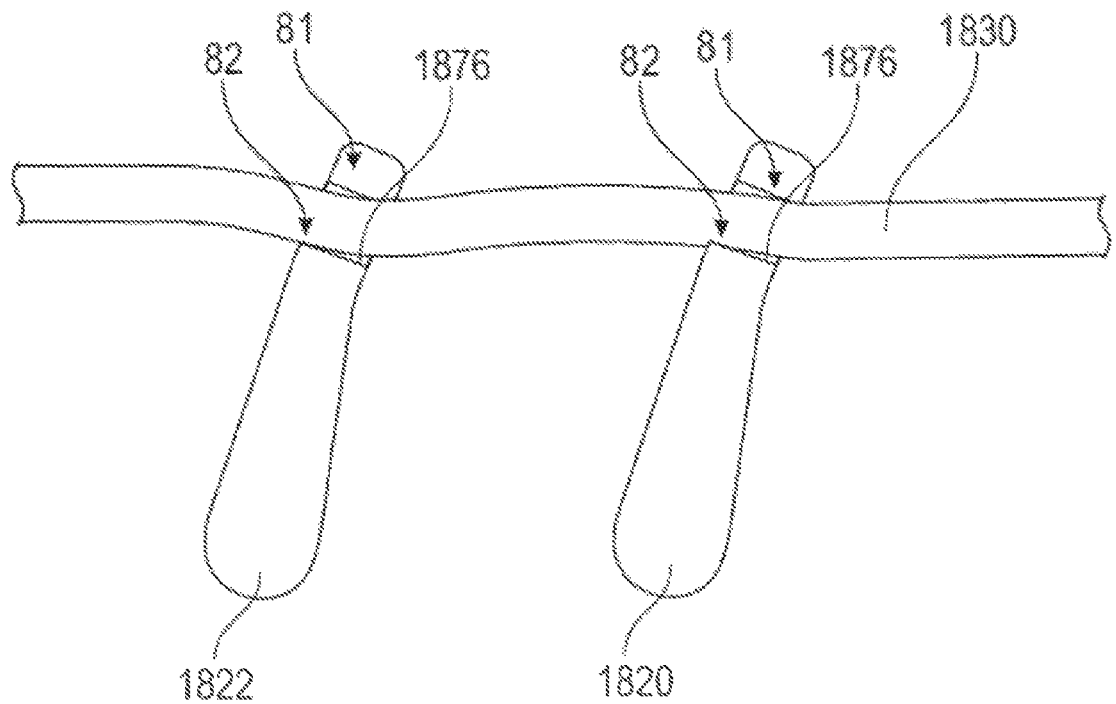
FIG. 8 is a cross sectional cutaway view of the directional adjustment unit in the engaged configuration according to an embodiment, with two frictional engagement members of the directional adjustment unit and the filament extending through the associated frictional engagement member apertures, in a plane having a normal vector parallel to the pivot axis of each frictional engagement member, wherein rounded edges are provided at an upper intersection between the front face of each frictional engagement member and the aperture.

FIG. 8 illustrates the effect that rounding the upper front edge 81 of the frictional engagement member apertures 1820, 1822 has on the interaction with the filament 1830. In this particular embodiment, the lower rear edge 82 of each frictional engagement member aperture 1876 maintains a sharp edge that potentially could negatively interfere with the filament 1830. However, during the development stages of the present invention, this lower rear aperture edge 82 has been shown to have a lower effect on the wear and damage of the filament then that of the upper front edge 81. Hence, only rounding the upper front aperture edges 81 may provide for a more cost effective solution, while still increasing the expected life cycle of the filament 1830. However, it is envisaged that both the upper front edges 81 and lower rear edges 82 could be rounded, that is, the edges on diametrically opposed parts of the cavity formed by aperture 1876.

In the embodiment of FIGS. 9*a* to 9*f* both the front upper aperture edge(s) and the rear lower aperture edge(s) are rounded, and part of the housing 1810 is also shown.

Figure 9E:
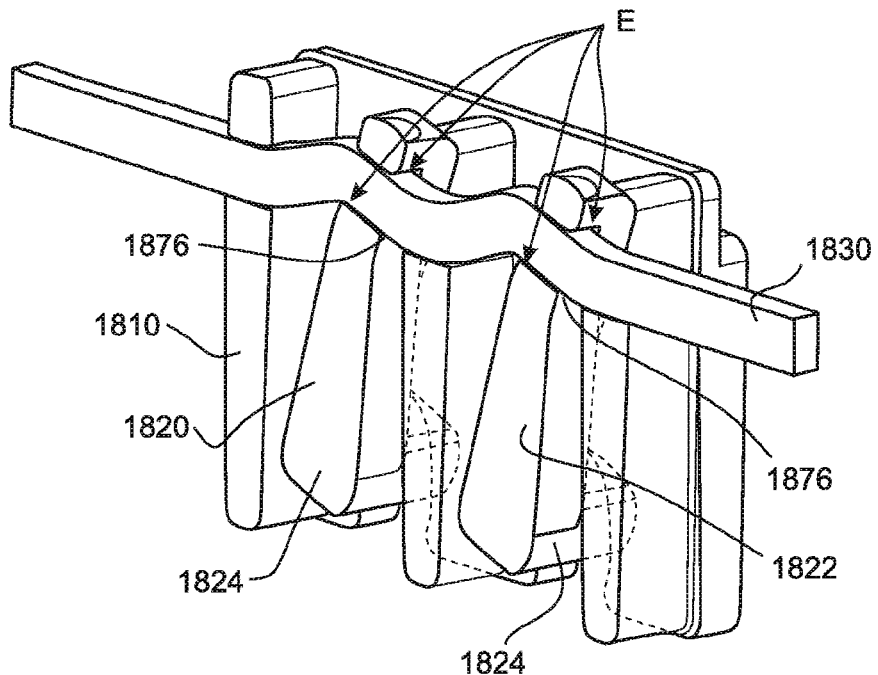
FIG. 9e is a cutaway perspective cross sectional view of the arrangement of FIG. 9d
Figure 9F:
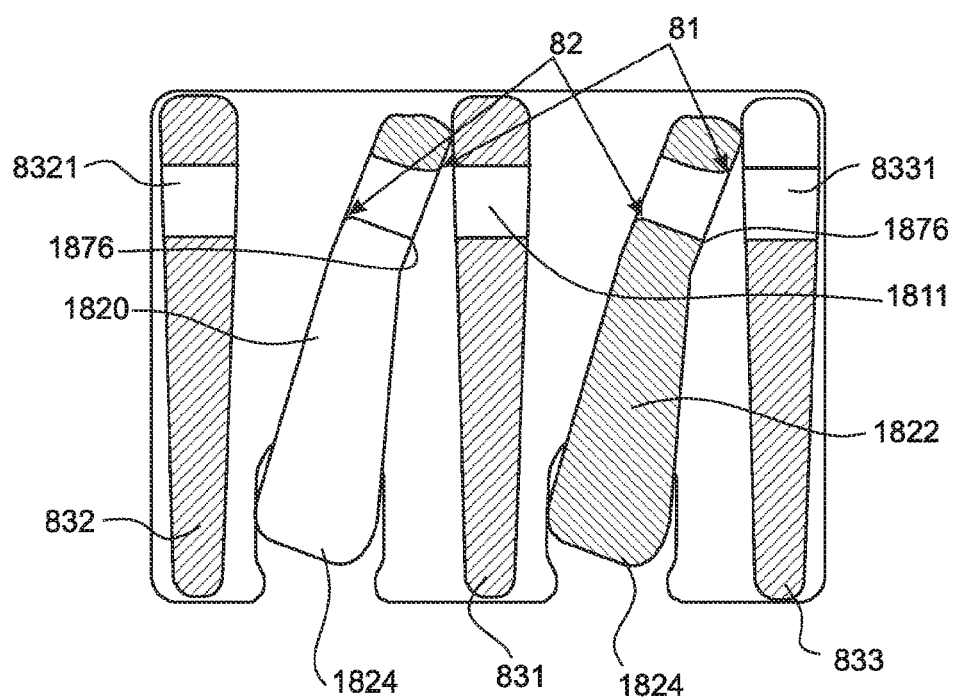
FIG. 9f is a cross sectional cutaway view of the arrangement of FIG. 9d with the filament removed.

FIGS. 9*a* to 9*c* show respective cutaway views of the directional adjustment unit 1800 in the disengaged configuration, whereas FIGS. 9*d* to 9*f* show respective cutaway views of the directional adjustment unit 1800 in the engaged configuration.

FIG. 9*b* is a cutaway perspective cross sectional view of the arrangement of FIG. 9*a*. FIGS. 9*d* and 9*e* show the interaction between the rectangular filament 1830 and the frictional engagement members 1820, 1822, wherein the frictional engagement members 1820, 1822 are in the engaged configuration with the filament 1830 contacting the upper front edges 81 and lower rear edges 82 of each frictional engagement member aperture to create two areas, surfaces, or regions of contact for each frictional engagement member 1820, 1822, resulting in total four areas, surfaces or regions of contact between the filament 1830 and the two frictional engagement members 1820, 1822. The rounded edges 81, 82 may have a consistent radius along their length.

In some configurations, the rounded edge has a curvature with respect to an axis of curvature being parallel to the pivot axis of the frictional engagement member. The rounded edges 81, 82 may have a curved cross sectional profile about the axis of curvature such that a fillet is formed that is non-circular or does not have a constant radius.

The embodiment of FIGS. 9*a* to 9*f* may be said to show an ideal cross sectional profile of the frictional engagement member apertures with rounded upper and lower contacting edges to remove any local points of high stress during the interaction between the frictional engagement member 1820, 1822 and filament 1830.

In another embodiment, the aperture 1876 is triangular at the face of the at least one frictional engagement member 1820, 1822, which means that it is triangular in transverse cross section. The triangular aperture 1876, similarly to the rectangular aperture discussed above, forms an engagement surface of the frictional engagement member that has, in transverse cross section at least one linear or substantially linear portion. More particularly, the triangular aperture 1876 forms in transverse cross section at least three linear or substantially linear or non-arcuate portions, each representing a sidewall of the associated triangle. As such, a triangular aperture 1876 when used together with a triangular (in transverse cross section) filament 1830 provides for the above described increased surface contact area which reduces the stresses on the filament 1830, in use.

Accordingly, the aperture 1876 may have a triangular transverse cross section in a plane parallel to the pivot axis of the frictional engagement member 1820, 1822, and a longitudinal axis normal to the pivot axis.

In some configurations, a side of the triangular aperture is parallel or substantially parallel to the pivot axis of the frictional engagement member 1820, 1822.

Figure 10A:
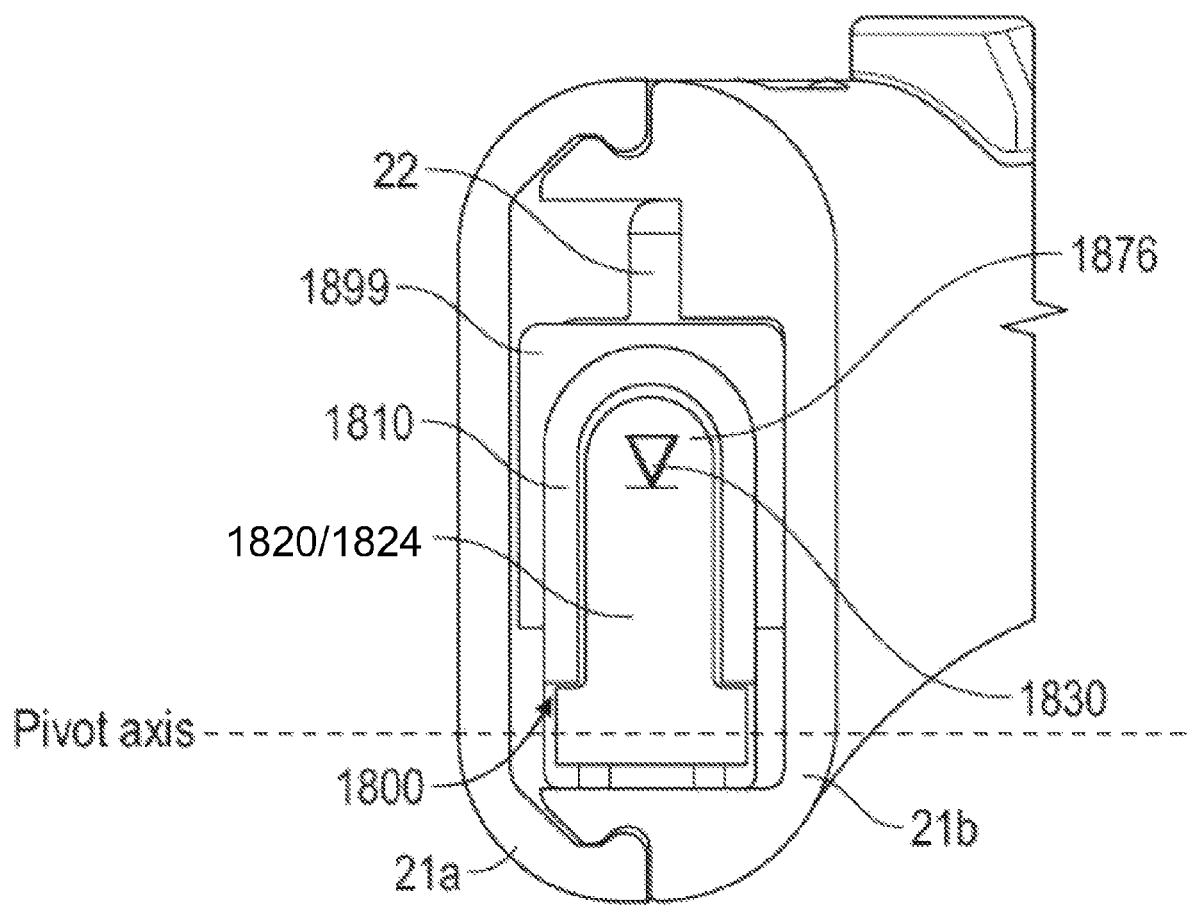
FIG. 10a is a cross sectional view showing a directional adjustment unit having a triangular aperture according to an embodiment assembled in a yoke assembly.
Figure 10B:
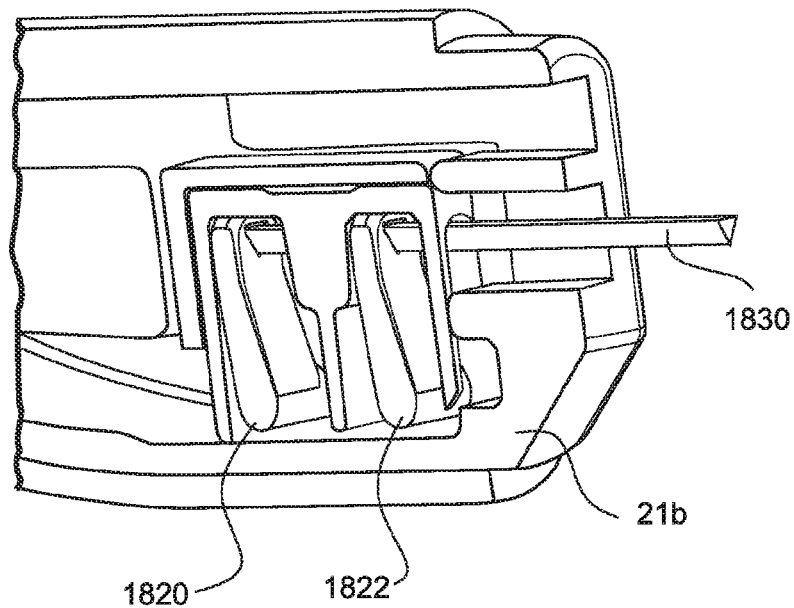
Figure 10C:
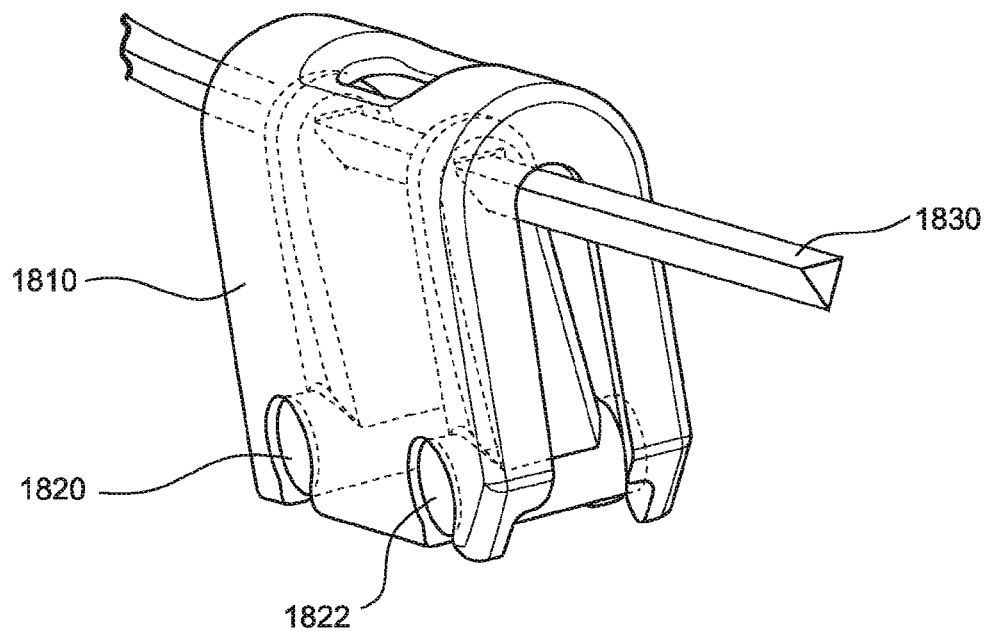
FIG. 10c is a cutaway perspective view of the directional adjustment unit of FIG. 10a where the associated housing to which the frictional engagement members are pivotally arranged is semi-transparently shown.

Such a configuration is shown with reference to FIG. 10*a*. FIG. 10*a* is a transverse cross sectional view, similar to that of FIG. 4, showing a directional adjustment unit having a triangular aperture 1876 according to an embodiment. FIG. 10*b* is a transverse cross sectional exploded perspective view of the directional adjustment unit of FIG. 10*a*. FIG. 10*c* is an alternative cutaway perspective view of the directional adjustment unit of FIG. 9 where the associated housing 1810 to which the frictional engagement members 1820, 1822 are pivotally arranged is semi-transparently shown.

As shown with reference to FIGS. 10*a* to 10*c* the triangular aperture has a vertex arranged closer to the pivot axis of the frictional engagement member 1820, 1822 than the side being parallel or substantially parallel to the pivot axis. In other words, a vertex of the triangular aperture points towards the pivot axis.

In some configurations, the triangular aperture may be arranged at any other angular orientation in relation to a central axis around which the cross sectional aperture shape is symmetrically provided. In other words, the triangular aperture may be orientated in any desired orientation rotated about the longitudinal axis of the filament 1830.

In some configurations, the aperture may have a polygonal transverse cross section having more than four sides, for example 5 to 12 sides. Here, the aperture forms a polygon in transverse cross section. The polygonal transverse cross section may be regular (i.e. all sides of the polygon equal length and all internal angles equal), or irregular (i.e. any polygon that is not regular), or concave (i.e. having at least one internal angle greater than 180 degrees), or convex (i.e. having no internal angles greater than 180 degrees).

In an embodiment, aperture 1876 extends through the at least one frictional engagement member 1820, 1822 perpendicular or substantially perpendicular to the pivot axis of the frictional engagement member 1820, 1822.

In some configurations, the aperture 1876 may extend through the at least one frictional engagement member 1820, 1822 symmetrically around a central aperture axis which is substantially perpendicular to the pivot axis, that is, substantially aligned with the longitudinal axis of the filament 1830, and extending from the front face of the frictional engagement member 1820, 1822. The aperture 1876 therefore defines the entrance to a filament engaging cavity or bore which extends through the frictional engagement member 1820, 1822. The cavity or bore may comprise one or more straight or curved portions. In some configurations, the cavity or bore is substantially straight along its length. In some configurations, the cavity or bore is curved or arcuate or has at least one curved or arcuate portion along its length.

In some configurations, the aperture extending through the at least one frictional engagement member 1820, 1822 forms a cavity or bore defined by at least one interior cavity wall surface of the at least one frictional engagement member 1820, 1822.

In some configurations, as shown in FIGS. 4, 10*a*, 13*b*, 14*c* to 14*e*, 16*e*, at least one interior cavity wall surface has a linear or substantially linear or non-arcuate profile or portion which is maintained along the length, or part of the length, of the cavity or bore between the front face of the frictional engagement member 1820, 1822 and the rear face of the frictional engagement member 1820, 1822.

For any three orthogonal reference axes, the at least one interior cavity wall surface may have a linear or substantially linear portion or profile along one of said reference axes, while being non-linear with reference to the remaining two orthogonal reference axes.

In some configurations, wherein the aperture 1876 has a rectangular transverse cross section, the cavity or bore is cuboidal or a rectangular prism.

In some configurations, wherein the aperture 1876 has a triangular transverse cross section, the cavity or bore has the shape of a triangular elongated body or prism.

The following further describes the frictional engagement member 1820, 1822.

In some configurations, the at least one frictional engagement member 1820, 1822 has a base member 1824 through which the pivot axis extends, and an arm extending away from the base member 1824. At least a first arm portion 1872 extends from the base member 1824 in a direction perpendicular to the pivot axis. The base member 1824 in this example, comprises at least one protruding portion which protrudes outwardly from the frictional engagement member 1820, 1822, and forms a follower received in slot 84 in housing 1810. Each base member 1824 may form a pair of such followers.

In some configurations, the at least one frictional engagement member comprises a second arm portion 1820 extending from an end of the first arm portion 1872 in a direction away from the pivot axis, wherein the second arm portion 1820 is inclined in relation to the first arm portion 1872 such that the arm is bent along its length. Such a frictional engagement member is shown with reference to FIGS. 1*a* to 1*d*, 2*a*, 6*a* to 9*b*, 10*b* to 10*c*, 11, 16*a* to 16*f* and 17.

Figures 11, 12:
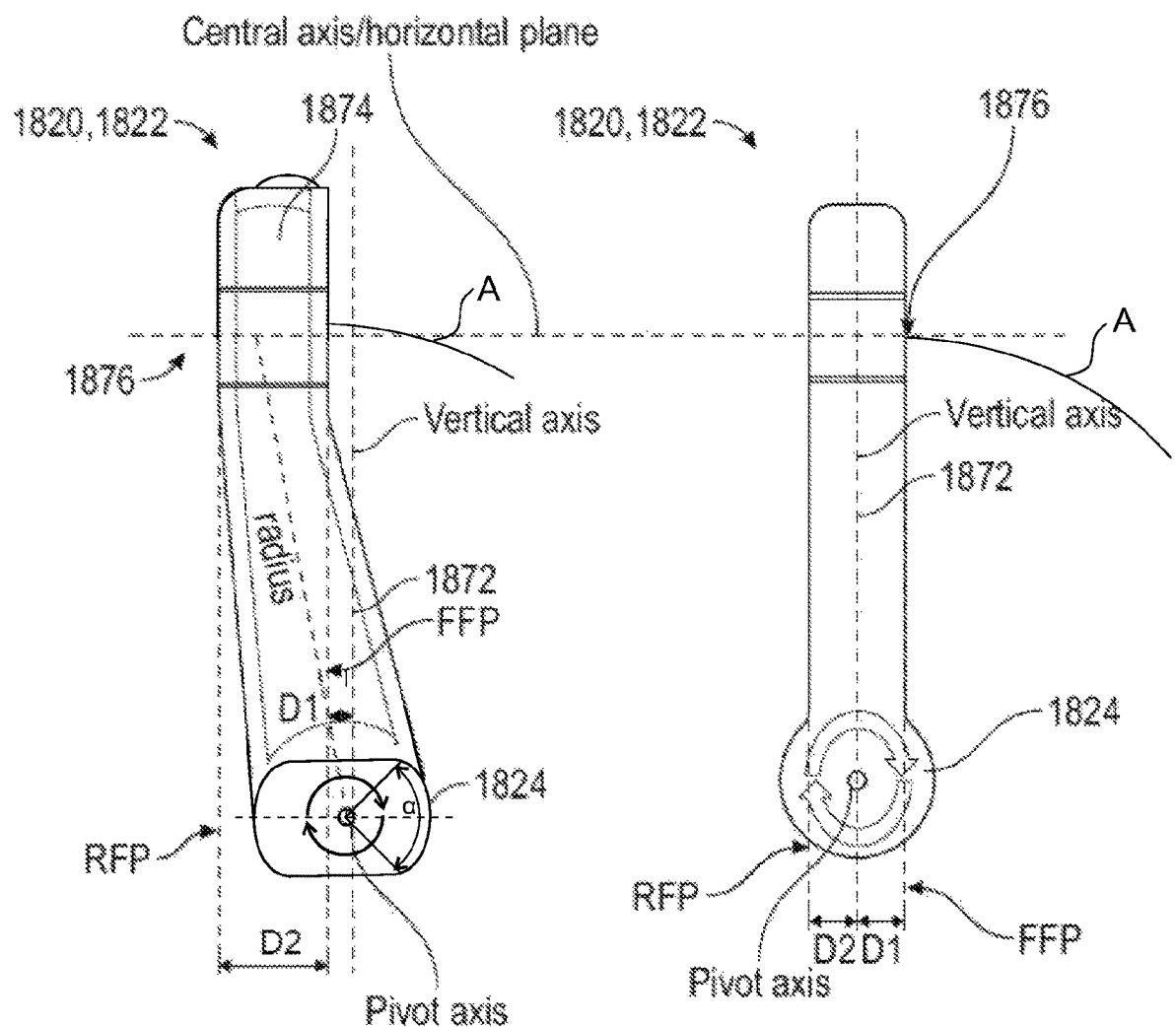
FIG. 11 is a side view of a frictional engagement member of a directional adjustment unit according to an embodiment, where the frictional engagement member comprises two arm portions arranged at an angle in relation to each other.
FIG. 12 is a cross sectional side view of a frictional engagement member of a directional adjustment unit according to an embodiment, where the frictional engagement member comprises a single arm portion.

Turning to FIG. 11 a cross sectional side view of a frictional engagement member of a directional adjustment unit 1800 according to an embodiment is shown. As may be observed from FIG. 11, the first arm portion 1872 extends from the base member 1824 in a direction perpendicular to the pivot axis. The second arm portion 1820, optionally having a substantially rectangular cross section, extends from the first arm portion 1872 at an angle with reference to the first arm portion 1872. The frictional engagement member aperture 1876 is provided in and extends through the second arm portion 1820 along the central axis.

In some embodiments, the laterally cross sectional shape of the base member 1824 may at least in part be circular, or at least arcuate, when viewed along the pivot axis. The base member 1824 in lateral cross section may have a constant diameter or at least a constant diameter portion. The base member 1824 can both pivot about its pivot axis and moved translationally within slot 84 between the disengaged configuration and the engaged configuration, with slot 84 of the housing 1810 having a constant width in this example.

In FIG. 11, the lateral cross sectional shape of the base member 1824 is of partly circular cross section with two flat edges that is two opposed arcuate portions joined by two opposed straight portions. In FIG. 11, the two flat edges are parallel.

The upright frictional engagement member position shown in FIG. 11 shows the frictional engagement member position in the disengaged configuration. In this disengaged configuration the plane FFP comprising the front face is provided at a first perpendicular distance D1 from the pivot axis, and the plane RFP comprising the rear face is provided at a second perpendicular distance D2 from the pivot axis. As may be seen from FIG. 11, the first distance D1 and second perpendicular distance D2 are not equal, meaning that the second arm portion is not symmetrically provided with reference to the pivot axis. In FIG. 11 the front face and rear face of the second arm portion 1820 are parallel with a plane comprising the vertical axis and pivot axis. Considering an embodiment where the frictional engagement member is only allowed to pivot around its pivot axis being fixed in relation to the housing, when the frictional engagement member pivots clockwise from the disengaged configuration towards the engaged configuration (when viewed in the orientation shown in FIG. 11 for example), due to the symmetrically offset second arm portion 1820, a fixed point of the aperture 1876 will follow a parabola or radius of curvature A shown in FIG. 11. In this configuration the fixed point of the frictional engagement member 1820, 1822 initially travels along an upwardly curved path before then travelling along a downwardly curved path. As will be elucidated further in detail below, particularly in view of FIG. 27, in an alternative embodiment where the frictional engagement member is allowed to pivot around its pivot axis but also be allowed to move vertically within the housing by means of a slot 84, the fixed point of the aperture 1876 will follow a different parabola.

In some embodiments the laterally cross sectional shape of the base member 1824 may be circular, as shown in FIGS. 10*b* to 10*c*, 12, FIGS. 13*a* to 14*b*.

FIG. 12 is a cross sectional side view of a frictional engagement member 1820, 1822 where the frictional engagement member comprises a single, straight arm portion 1872. Accordingly, the associated aperture 1876 and cavity or bore is provided through the single arm portion 1872. The frictional engagement member 1820, 1822 of FIG. 12 forms a non-angled or straight frictional engagement member or "flat" frictional engagement member, wherein the single arm portion 1872 extends from the base member 1824 thereof along an axis, for example vertical axis, perpendicular to the pivot axis. In other words, the frictional engagement member of FIG. 12 consists of a single arm portion and a base, wherein the single arm portion 1872, in a plane having a normal vector parallel to the pivot axis, extends from the base symmetrically along an axis perpendicular to the pivot axis. Hence, the single arm portion frictional engagement member does not further comprise a second arm portion 1820.

The upright frictional engagement member position shown in FIG. 12 shows the frictional engagement member position in the disengaged configuration. In this disengaged configuration the plane FFP comprising the front face is provided at a first perpendicular distance D1 from the pivot axis, and the plane RFP comprising the rear face is provided at a second perpendicular distance D2 from the pivot axis. As may be seen from FIG. 12, the first D1 and second D2 perpendicular distances are equal. In FIG. 12 the front face and rear face of the first arm portion 1872 are parallel with a plane comprising the vertical axis and pivot axis. Given the configuration of FIG. 12, when the frictional engagement member pivots clockwise from the disengaged configuration towards the engaged configuration, due to the symmetrically aligned first arm portion 1872, a fixed point of the aperture 1876 will follow a parabola or curvature (A) with a radius defined with reference to the pivot axis shown in FIG. 12. In this configuration the fixed point of the frictional engagement member 1820, 1822 initially travels only along a downwardly curved path.

As may be seen in the embodiments of FIGS. 11 and 12, in the disengaged configuration, the central axis of the aperture 1876 may align with the horizontal plane, and may be parallel with a base and/or top of the housing 1810. As may be observed from FIG. 11, the center of the aperture 1876 is located horizontally rearwardly (i.e. to the left) from the pivot axis. In an embodiment in which the pivot axis is kept fixed in relation to the housing 1810, i.e. for all relative orientations between the frictional engagement member 1820, 1822 and the housing 1810, as the curvature is referenced to the pivot axis, the curvature follows a radius defined between the pivot axis and the center of the aperture 1876. This means that the aperture 1876 follows the curvature initially upwards above the horizontal plane before following the radius of curvature downwards. In other words, in FIG. 11, a segment of the radius of curvature is located above the horizontal plane intersecting the central axis at the face of the frictional engagement member in the disengaged configuration. The associated upward and downward movement while following the curvature causes contact between the frictional engagement member 1820, 1822 and filament 1830 to occur at different points throughout this movement. Accordingly, a frictional engagement member having the configuration of FIG. 11 may experience wear at several points or locations along the interior cavity sidewall surfaces of the aperture. A different frictional engagement member 1820, 1822 can be seen in FIG. 12. Here, the frictional engagement member 1820, 1822 locates the center of the aperture vertically in line with and above the pivot axis which means the aperture will only travel on a downward curvature on its way from the disengaged configuration to the engaged configuration. This may, in some circumstances, lead to more consistent contacting points between the frictional engagement member 1820, 1822 and filament 1830. This may also in turn lead to a more consistent and repeatable friction force to be generated by the frictional engagement member 1820, 1822.

In some configurations, as that shown with reference to FIG. 11, the at least first arm portion 1872 has a tapered cross section in plane perpendicular to the pivot axis. It should be appreciated that a tapered cross section may be provided to a single arm portion 1872 frictional engagement member configuration, for example that shown in FIG. 12, as well. The tapered section may provide the first arm portion 1872 with increased rigidity by providing the additional material in a position closer to the pivot axis where the torque forces applied will be at the highest.

In some configurations, as that shown with reference to FIG. 12, the at least first arm portion 1872 has a rectangular cross section in plane perpendicular to the pivot axis.

In some configurations, in the engaged configuration the at least one transverse cross sectional linear or substantially linear region of the at least one frictional engagement member 1820, 1822 is arranged to be in frictional engagement with a corresponding flat or substantially flat region of the filament 1830, in use. The shape of part of the filament 1830 that engages the frictional engagement member 182, 1822 may be configured to be similar to, or to mirror, the shape of the part of the walls of the aperture 1876 that engages the filament 1830.

Figures 13A, 13B, 13C, 14A, 14B:
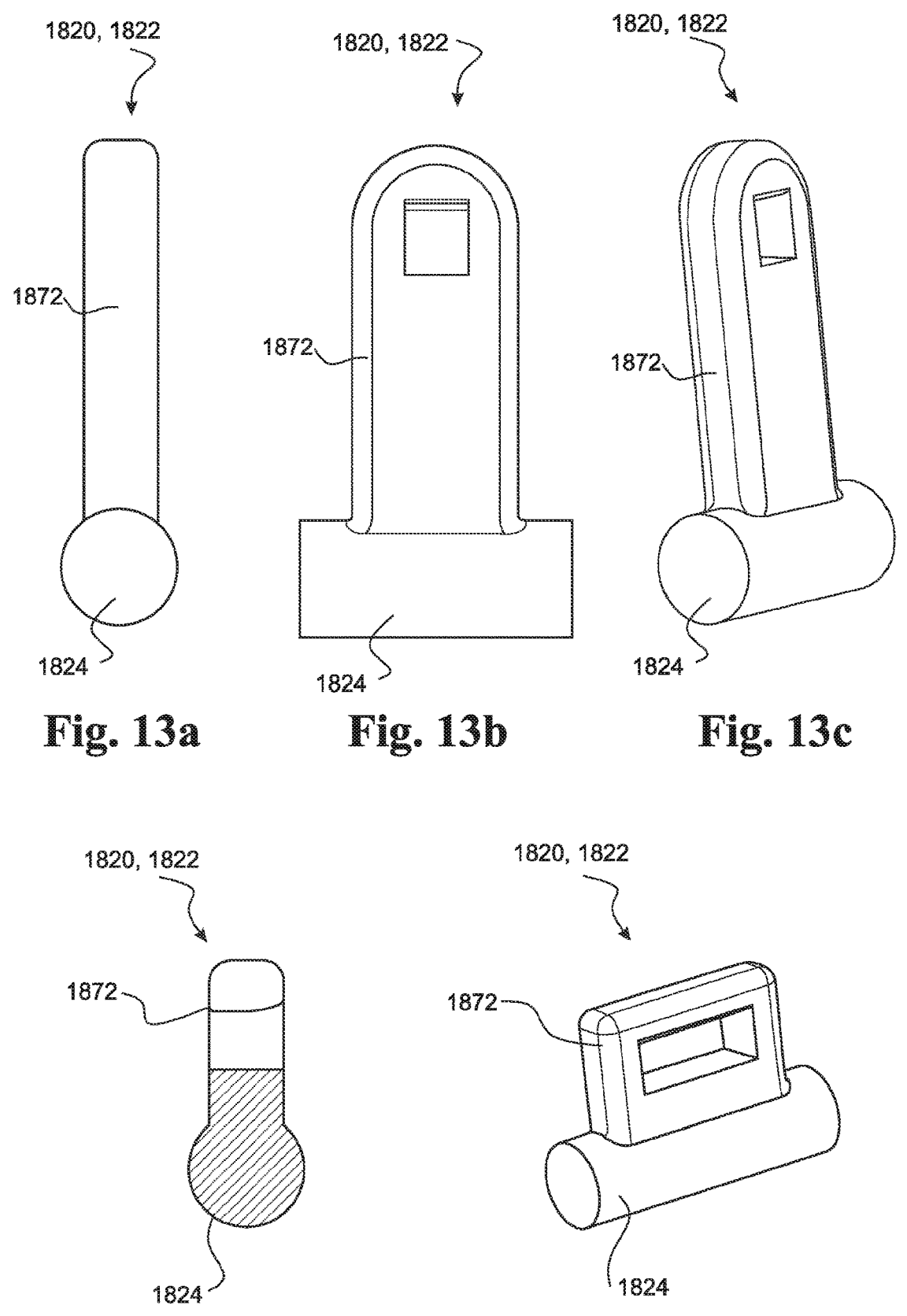

FIGS. 13a to 13c show a respective side view, front view, and a perspective view of a single arm portion frictional engagement member 1820, 1822. Similar to FIG. 12, the frictional engagement member may be symmetrical about a vertical axis when viewed from the side (see FIG. 13a). This may enable the frictional engagement member 1820, 1822 to be inserted into the frictional engagement member housing 1810 in either orientation during assembly, which may simplify the assembly process.

FIGS. 14a to 14b show a side view and perspective view of a frictional engagement member according to another embodiment. As compared to the embodiment shown in FIGS. 13a to 13c, the frictional engagement member of FIGS. 14a and 14b has a shorter first arm portion 1872. Furthermore, the width of the first arm portion 1872 is made larger, than that shown in FIGS. 13b and 13c. This provides for a significantly wider aperture 1876 than that of the frictional engagement member 1820, 1822 of FIGS. 13a to 13c, the aperture 1876 being of rectangular cross section in this example.

As such the frictional engagement member 1820, 1822 of FIGS. 14a to 14b may employ a significantly wider filament 1830 than that of previous embodiments. The wider filament 1830 may offer benefits such as improving kink resistance by spreading the force load over a larger contact area. It may also resist twisting which will lead to a reduced occurrence of the headgear becoming twisted in the packaging/storage.

It should be appreciated that in some configurations the frictional engagement member 1820, 1822 may be flipped or rotated 90 degrees so that the widened side of the filament 1830 runs parallel to the face of the patient, parallel to the sides of the housing 1810. Rotating the frictional engagement member 1820, 1822 may also enable the frictional engagement member to fit into the current yoke housing without significant modifications being needed.

In alternate configurations, the entire directional adjustment unit 1800 with frictional engagement members 1820, 1822 and housing 1810 may be flipped such that only the internals of the yoke that the frictional engagement member sits in needs modification.

Figure 14C:
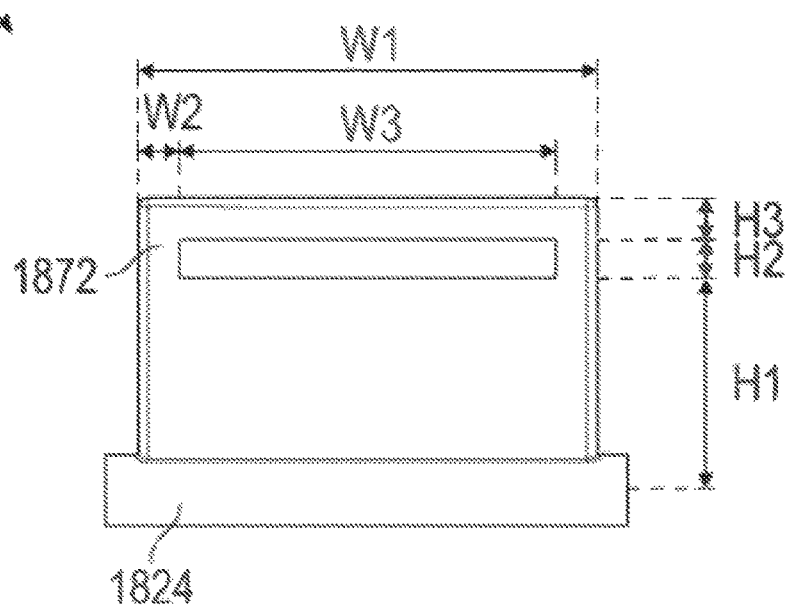
FIG. 14c shows a front view of a single arm portion frictional engagement member identifying a number of adjustable dimensions.

FIG. 14c shows a front view of a single arm portion frictional engagement member 1820, 1822 identifying a number of adjustable dimensions.

Table 1 below identifies suitable ranges for said adjustable dimensions according to some configurations. However, these dimensions should not be considered limiting. Other dimensions could also be used without departing from the scope of the present invention.

TABLE 1

| Dimension | H1 | H2 | H3 | W1 | W2 | W3 |
| --- | --- | --- | --- | --- | --- | --- |
| As Below | 5.00 mm | 1.00 mm | 1.00 mm | 12.00 mm | 1.00 mm | 10.00 mm |
| Minimum | 1.00 mm | 0.80 mm | 0.50 mm | 3.50 mm | 0.50 mm | 2.50 mm |
| Maximum | 20.00 mm | 2.50 mm | 3.00 mm | 24.50 mm | 3.00 mm | 18.50 mm |

Figures 14D, 14E:
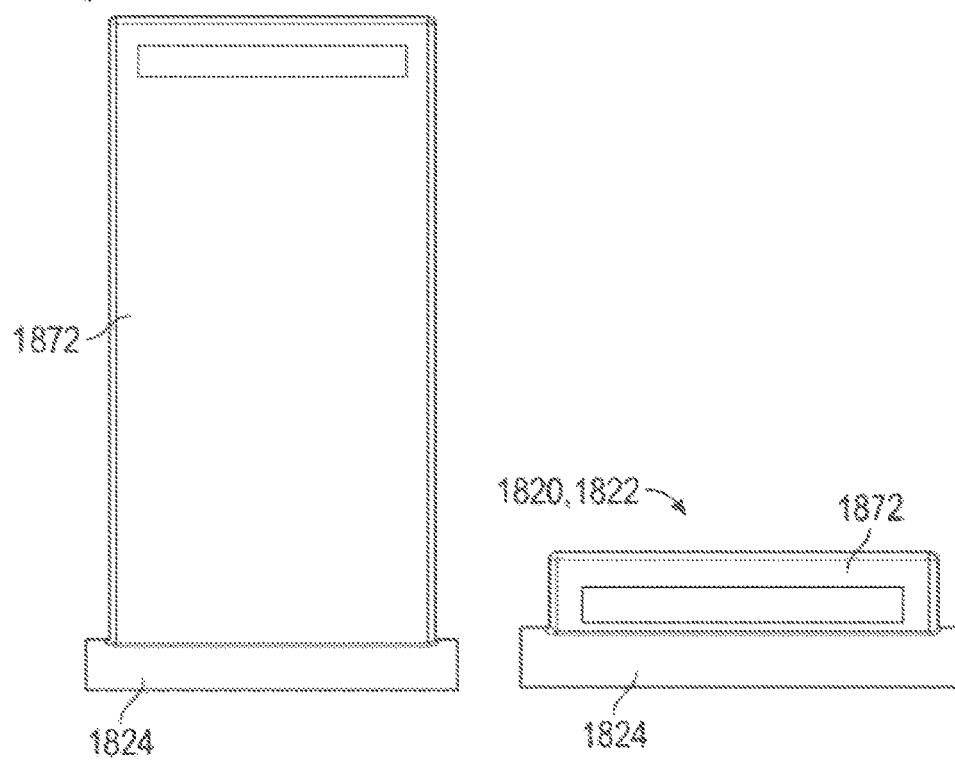
FIG. 14d shows a front view of a single arm portion frictional engagement member having a first set of dimensions of an embodiment.
FIG. 14e shows a front view of a single arm portion having a second set of dimensions of an embodiment.

FIG. 14d shows a front view of a single arm portion frictional engagement member having a first set of dimensions of an embodiment, where H1 is 20 mm. FIG. 14e shows a front view of a single arm portion having a second set of dimensions of an embodiment, where H1 is 1 mm. FIGS. 14d and 14e show two examples at each end of an example group of possible range of frictional engagement members 1820, 1822 within the scope of this disclosure.

Figure 15A:
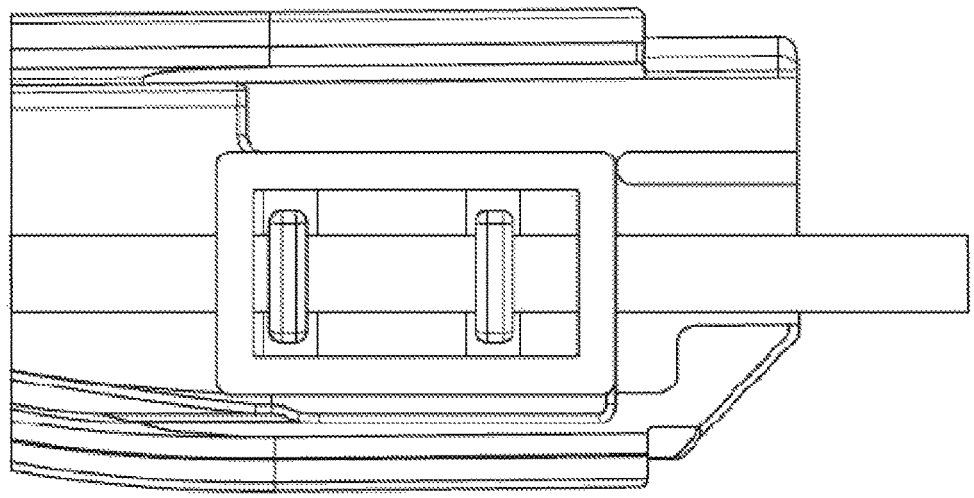
FIG. 15a is a cutaway side view of a directional adjustment unit 1800 having two single arm portion frictional engagement members having respective pivot axis extending parallel to the vertical axis.

FIG. 15a is a cutaway side view of the directional adjustment unit 1800 having two frictional engagement members 1820, 1822 having respective pivot axes.

Figure 15B:
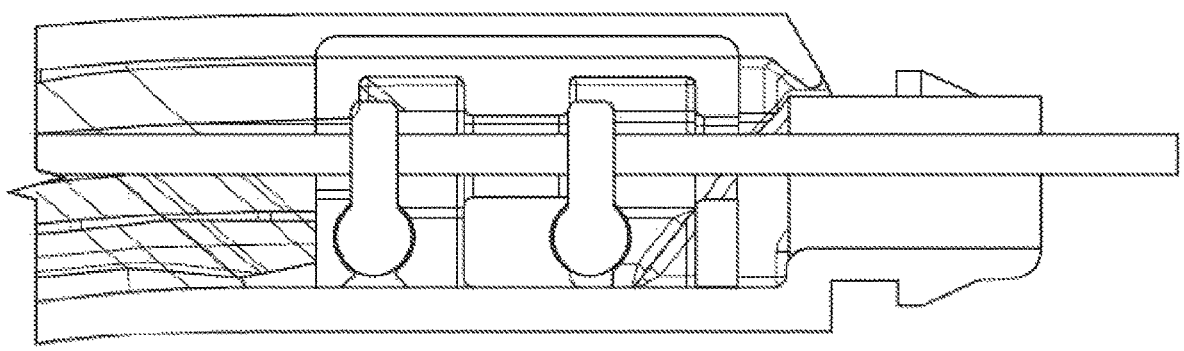

FIG. 15b is a cutaway top view of the directional adjustment unit 1800 of FIG. 15a.

Figures 16A, 16B:
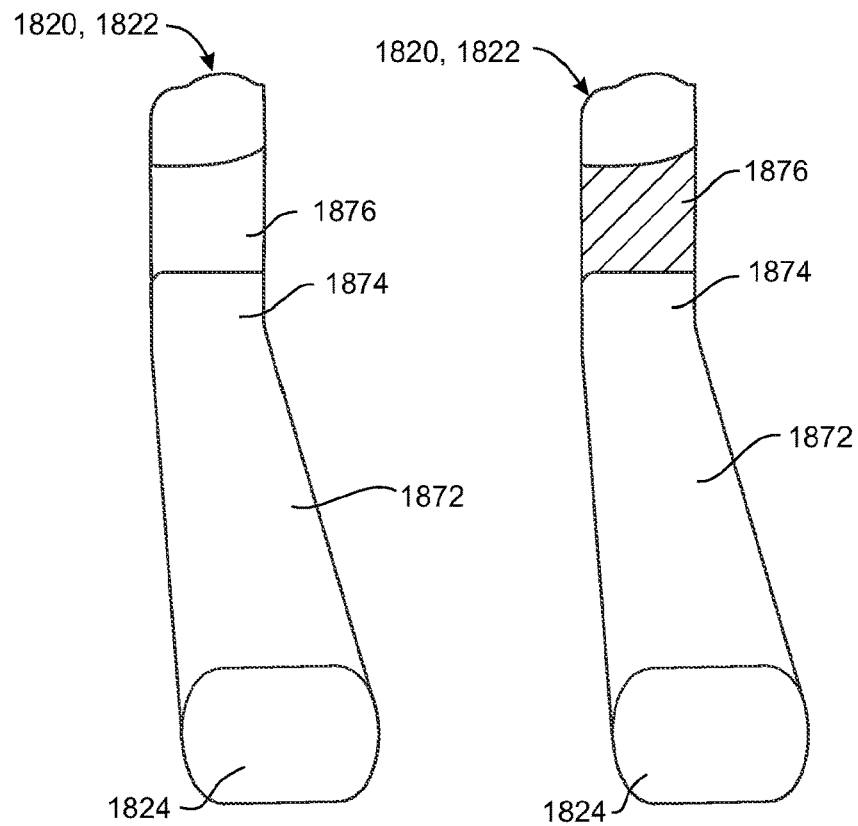
FIG. 16a shows a side view of a double arm portion frictional engagement member of an embodiment, having a rounded edge formed at an upper intersection between the front face, i.e. right face in the Figure, of the frictional engagement member and the aperture.
FIG. 16b shows an alternative side view of the double arm portion frictional engagement member of FIG. 16a, wherein the cross sectional aperture volume is filled for improved visualization.
Figure 16C:
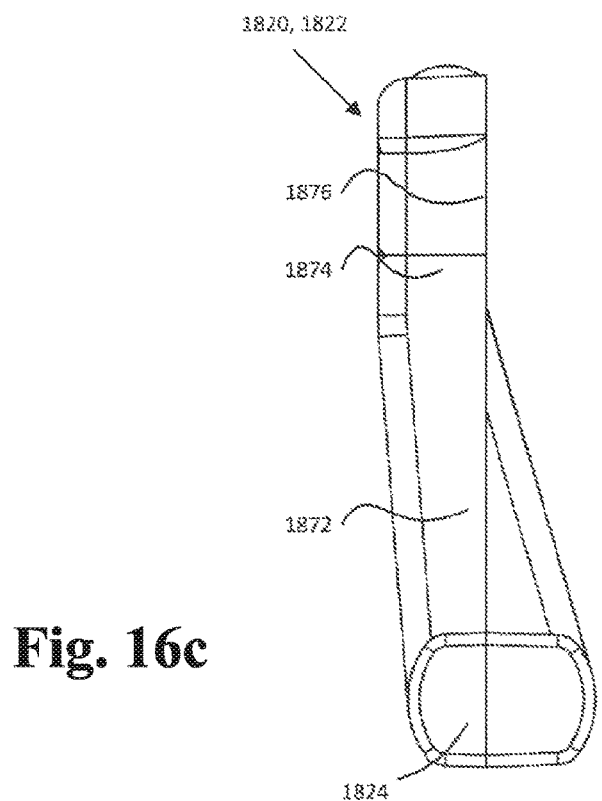
FIG. 16c shows a contour side view of the double arm portion frictional engagement member of FIGS. 16a and 16b.
Figure 16G:
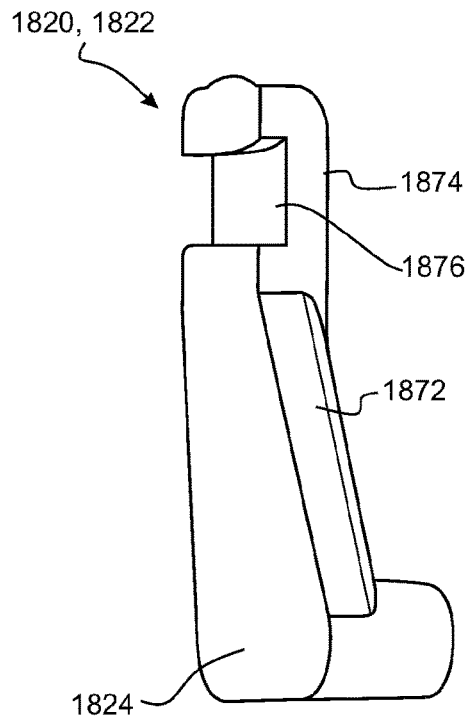
FIG. 16g shows a perspective cross sectional view of the double arm portion frictional engagement member of FIGS. 16a to 16f.
Figure 16H:
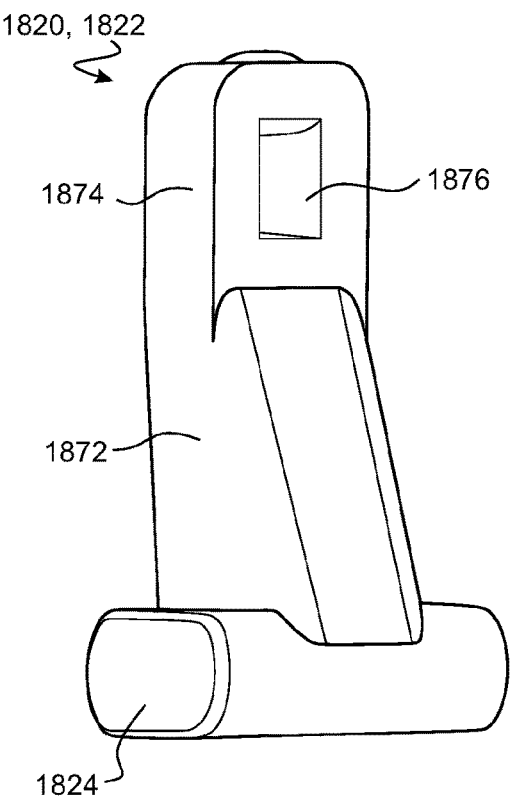
FIG. 16h shows a perspective view of the double arm portion frictional engagement member of FIGS. 16a to 16g.
Figure 16I:
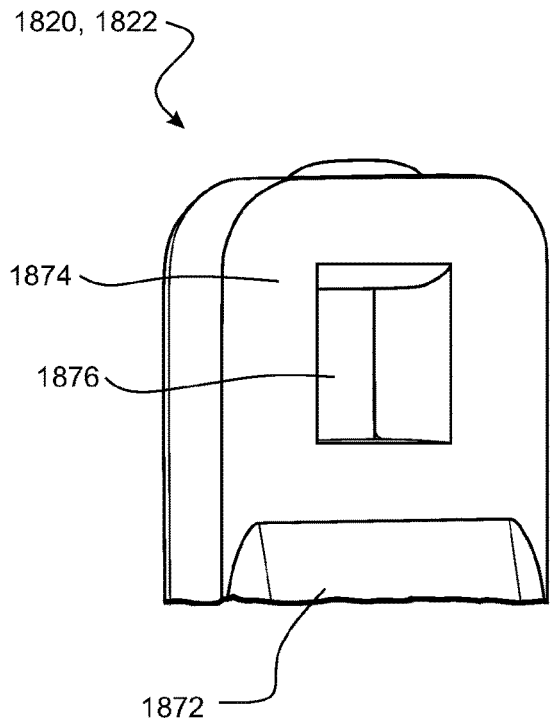
FIG. 16i shows a perspective contour front view of the double arm portion frictional engagement member of FIGS. 16a to 16h.
Figure 16J:
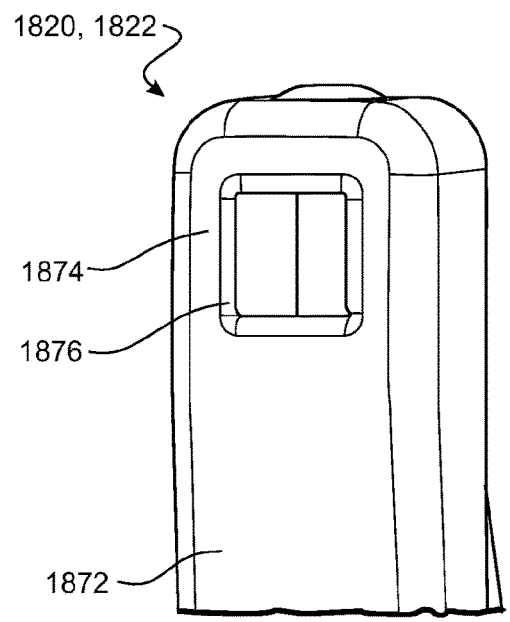
FIG. 16j shows a perspective contour rear view of the double arm portion frictional engagement member of FIGS. 16a to 16i.

FIGS. 16a to 16j shows respective different views of a double/two arm portion frictional engagement members 1820, 1822 according to an embodiment of this disclosure. FIG. 16a shows a side view of the frictional engagement members 1820, 1822, having first and second inclined arm portions 1872, 1874, and having a rounded or chamfered edge formed at an upper intersection between the front face, i.e. right hand face in the Figures, of the frictional engagement member 1820, 1822 and the aperture 1876. FIG. 16b shows an alternative side view of the frictional engagement member 1820, 1822 of FIG. 16a, wherein the aperture volume is filled for clarity. FIG. 16c shows a contour side view of the frictional engagement member of FIGS. 16a and 16b. FIG. 16d shows a side design view of the frictional engagement member of FIGS. 16a to 16c. FIG. 16e shows a front view of the frictional engagement member of FIGS. 16a to 16d. FIG. 16e shows a rear view of the frictional engagement member of FIGS. 16a to 16e. FIG. 16g shows a perspective cross sectional view of the frictional engagement member of FIGS. 16a to 16f. FIG. 16h shows a perspective view of the frictional engagement member of FIGS. 16a to 16g. FIG. 16i shows a perspective contour front view of the frictional engagement member of FIGS. 16a to 16h. FIG. 16j shows a perspective contour rear view of the frictional engagement member of FIGS. 16a to 16i. In FIGS. 16a to 16i the base member has the same shape as that of FIG. 11, i.e. it is at least partially circular in lateral cross section.

In some embodiments the base member 1824, in transverse cross section, may project laterally outwardly from the first arm portion 1872, in the direction of the pivot axis. This allows the outer lateral ends of the base member 1824 to form followers which are received in slots 84 of the housing 1810 while allowing the first arm portion 1872 and/or second arm portion 1820 of the frictional engagement member 1820, 1822 to move within a cavity formed within the housing 1810.

Figure 17A:
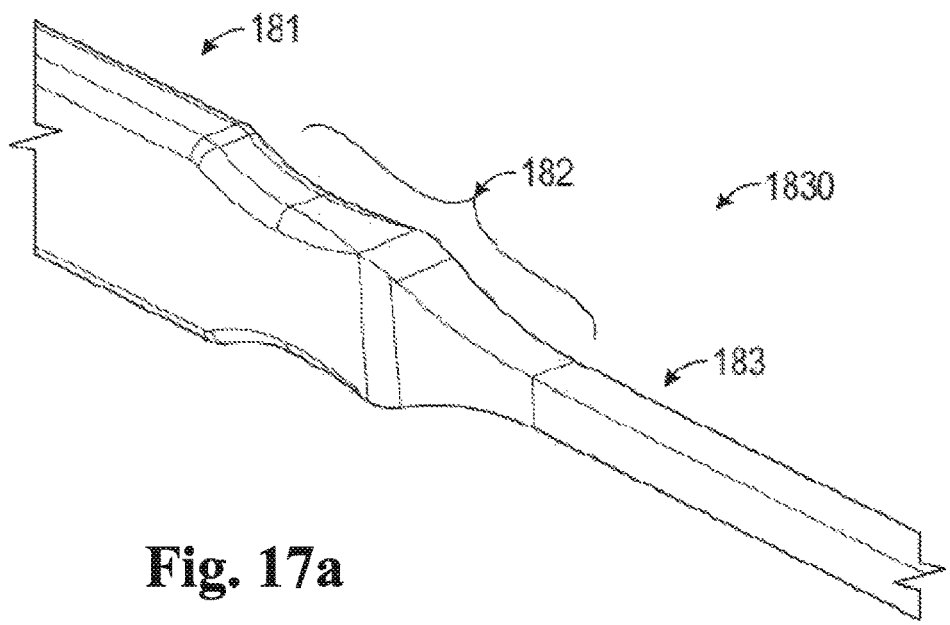
FIG. 17a shows a perspective view of a filament according to an embodiment.
Figure 17B:
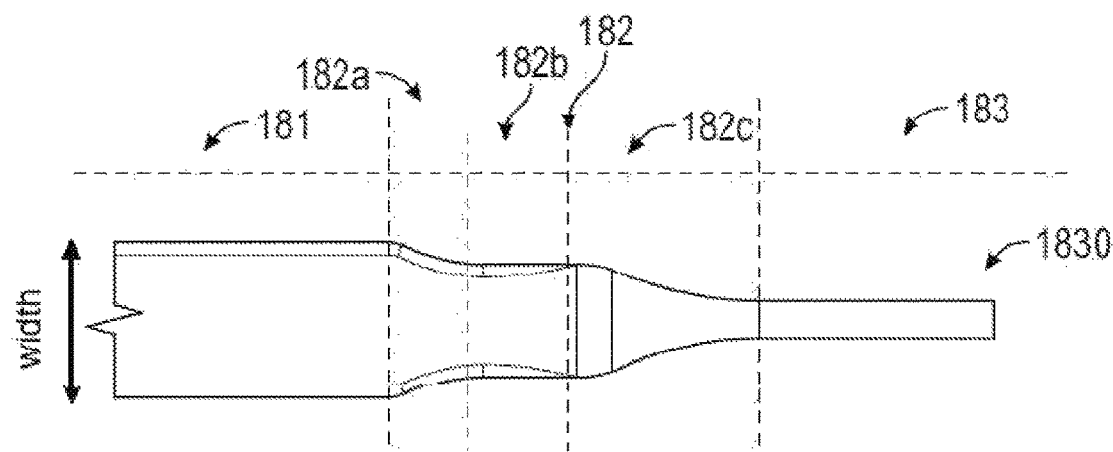
Figure 17C:
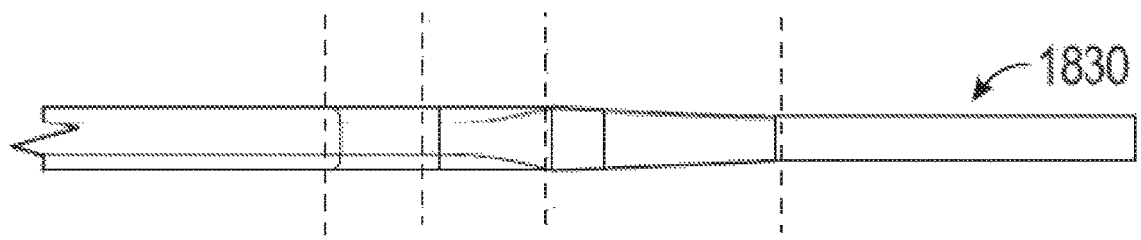
FIG. 17c shows a top view of a filament according to an embodiment.

FIGS. 17a to 17c show respective perspective views, side views, and top views of a filament 1830 for a headgear for a respiratory interface or mask according to an embodiment of this disclosure. The filament 1830 comprises a filament body extending along a longitudinal axis thereof. The filament body comprises a body portion 181 having a first shape and size. The filament body further comprises an end portion 183 having, in this example, the same shape but a smaller size, wherein the filament 1830 in the end portion 183 has at least one flat or substantially flat exterior surface extending along a longitudinal axis thereof. It is this end portion 183 of the filament 1830 that engages with the frictional engagement members(s) 1820, 1822, in use. Moreover, the filament body comprises a transitional portion 182 provided longitudinally between the body portion 181 and the end portion 183. The transitional portion 182 has a shape and/or size which is transitioning from the first geometrical shape and/or size of the body portion 181 to the shape and/or size of the end portion 183 over a longitudinal distance along the longitudinal axis of the filament 1830.

In some configurations, the transitional portion 182, or at least a portion thereof, has a size, i.e. at least one cross sectional dimension, being larger than that of an external opening 1860 of the frictional engagement member housing 1810, in use. In this way the transitional portion 182, or at least body portion 181, will be blocked from fully entering the frictional engagement member housing 1810. As shown with reference to FIG. 17b, the transitional portion 182 may in a cross sectional side view comprise a first narrowing structure 182a, optionally having a curvature, wherein the width reduces from that of the body portion to an intermediate width. The transitional portion 182 may further comprise an intermediate portion 182b wherein the width is substantially constant following the first narrowing structure 182a. Moreover, a second narrowing structure 182c, following the intermediate portion 182b, and optionally having a further curvature, has a width reducing from the that of the intermediate portion 182b to that of the end portion 183 of the filament 1830.

Figure 18A:
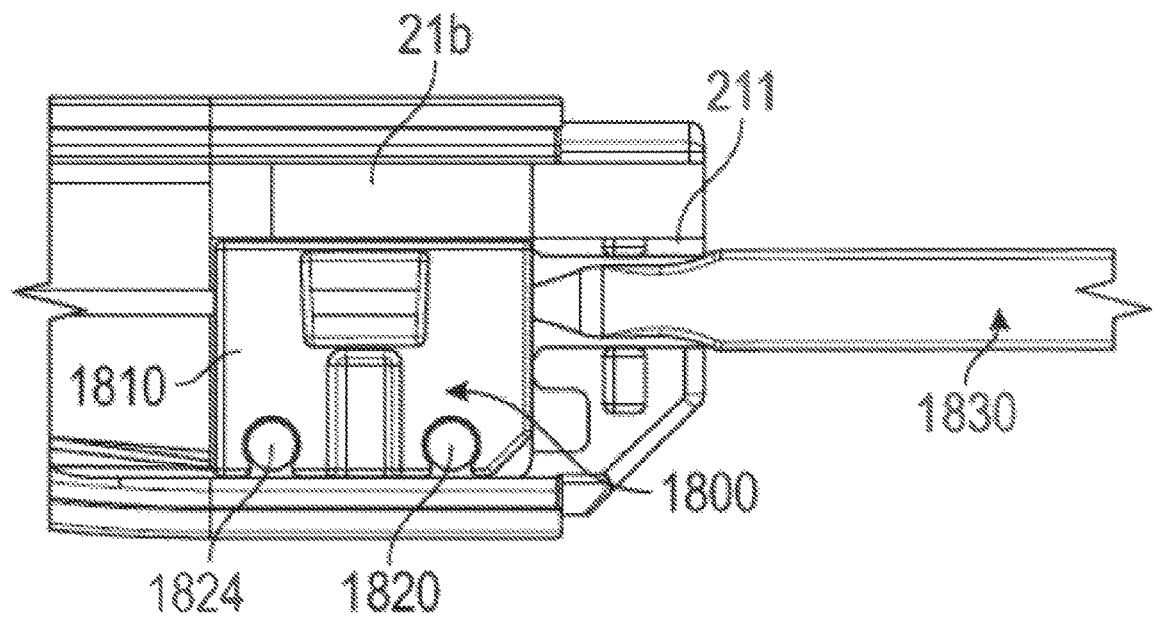
FIG. 18a shows a side cutaway view of a yoke assembly comprising a directional adjustment unit and a filament according to an embodiment.
Figure 18B:
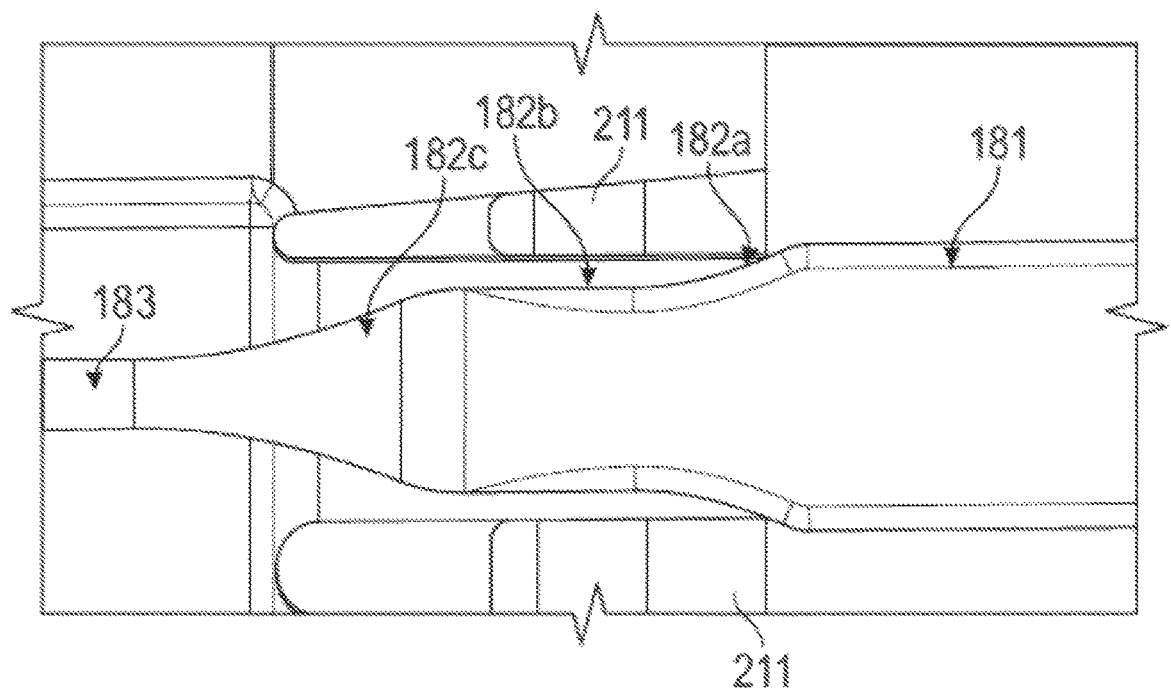
FIG. 18b shows a zoomed in cutaway side view of the arrangement of FIG. 18a highlighting the interaction between the filament and yoke assembly.
Figure 19:
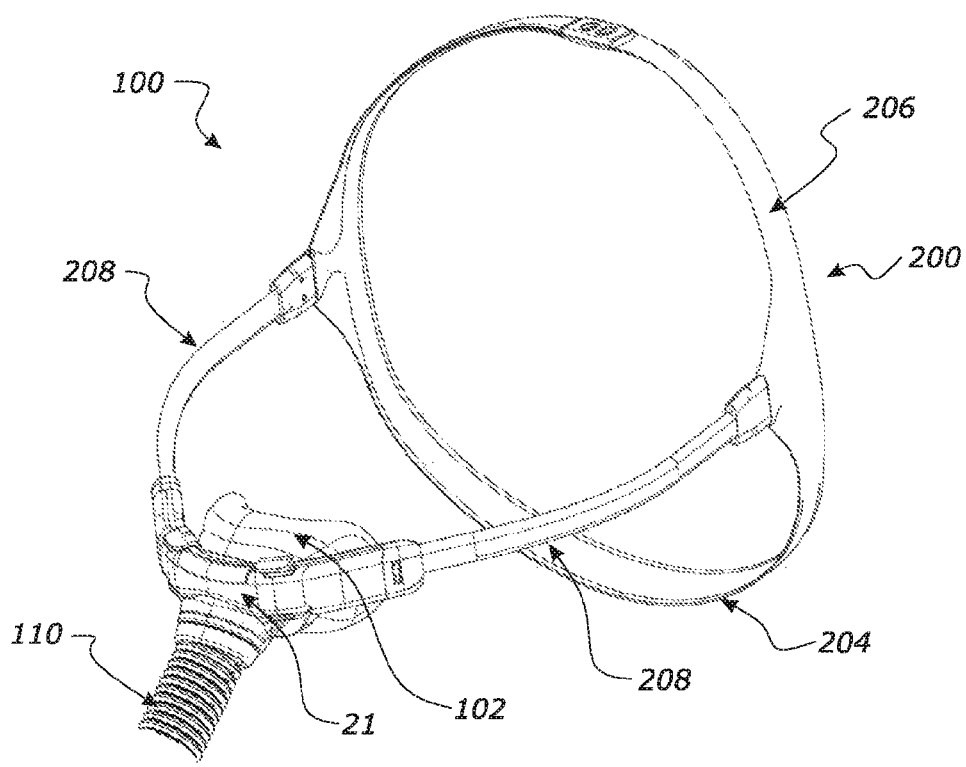
FIG. 19 is a perspective view of a mask assembly, including a headgear, a seal assembly, and a frame assembly according to an embodiment.
Figure 20:
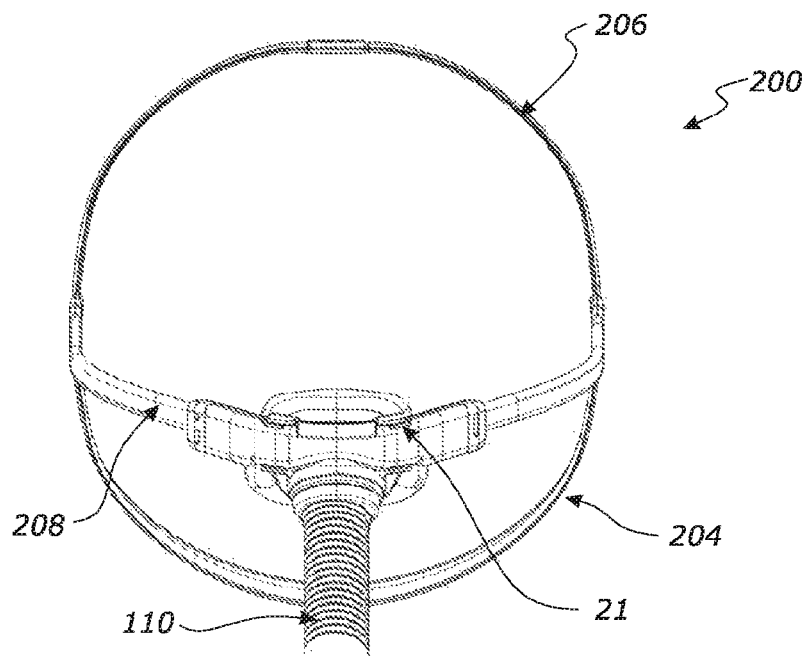
FIGS. 20 to 22 are a front view, side view, and a rear perspective view, respectively, of the mask assembly of FIG. 19.
Figure 21:
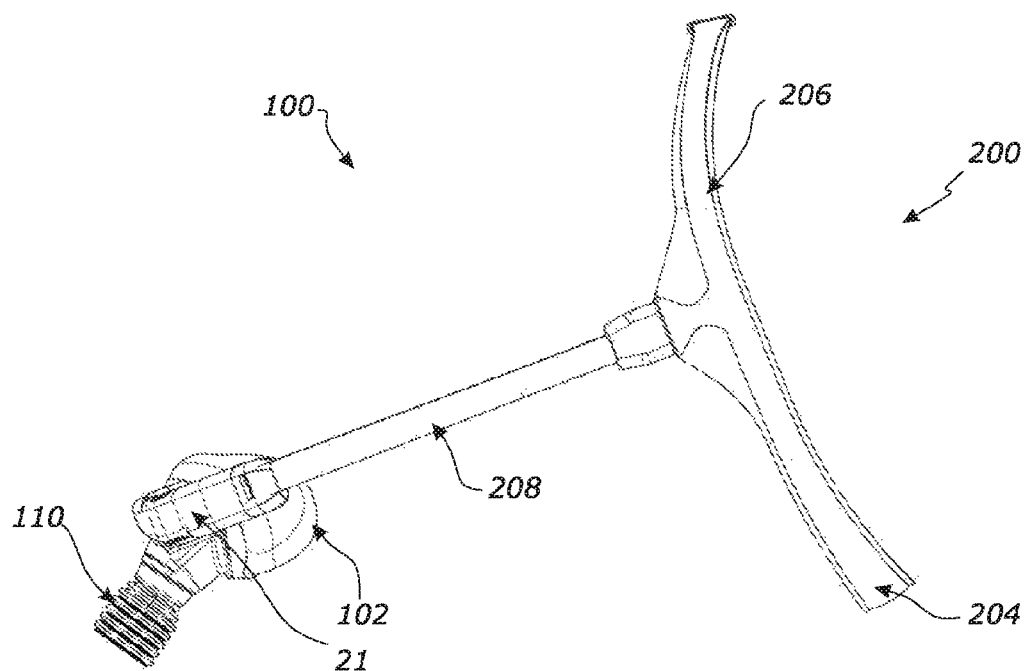
Figure 22:
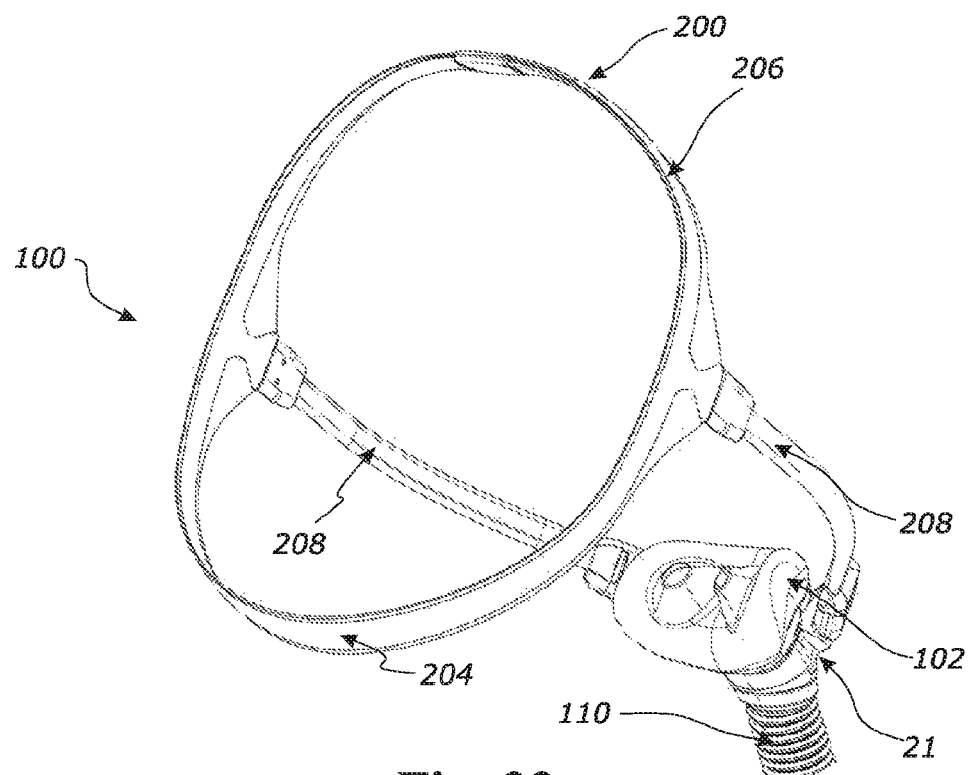

FIG. 18a shows a side cutaway view of a yoke assembly 20 comprising a directional adjustment unit 1800 and a filament 1830 of FIGS. 18a and 18b according to an embodiment of this disclosure. A hard stop, formed by the size of at least a portion of the transitional portion 182 being larger than a receiving structure of the yoke housing 211 in FIG. 18a, of the yoke assembly 20 restricts the strap from entering too far into the housing 1810. High bending resistance at this point minimizes risk of the associated yoke assembly 20 getting twisted relative to headgear in relaxed state where the transitional portion of the strap transitions, tapers or curves towards the smaller sized filament 1830 at the end so that it can be snugly inserted into the yoke housing. This provides high bending resistance which reduces the risk of the strap twisting and kinking when being stored or not in use.

FIG. 18b shows an enlarged cutaway side view of the arrangement of FIG. 18a illustrating the strap with the line track/yoke/frictional engagement member housing 1810 where the transitional portion 182 at a longitudinal position thereof provides a hard stop to limit the transitional portion 182 from being inserted too far inside the housing 1810 which could damage the directional adjustment unit 1800 and/or inhibit the directional adjustment unit 1800 from functioning correctly.

In an embodiment, the rectangular transverse cross sectional (i.e. perpendicular to the longitudinal axis of the filament) dimensions of the filament 1830 may be 0.85 mm (W) by 0.85 mm (H), meaning 0.85 mm wide and 0.85 mm height in cross section. In such a configuration, the rectangular transverse cross section forms an equilateral rectangle, i.e. a square.

In other embodiments, the dimensions may vary, so that each side of the filament 1830 has a size in the range of 0.7 mm to 3 mm. This means that the filament could have a cross section of a square of 0.85 mm×0.85 mm, a rectangle of 0.75 mm×2.5 mm, a square of 3.00 mm by 3.00 mm, a triangular cross section with one 3.00 mm side and two 1.5 mm sides, or any other combination of dimensions.

Experiments have shown that the size, for example at least one cross sectional dimension, of the filament 1830 being 30 to 200 microns smaller than that of the aperture of the frictional engagement member 1820, 1822 allows for a proper clearance for the two components to functionality work satisfactory in the disengaged and engaged configuration.

In some configurations, the ratio of the area of the frictional engagement member aperture 1876 transverse cross section (seen at the face of the frictional engagement member) to the filament 1830 transverse cross section can range from 1:1.0201 to 1:1.3061.

Table 2 below identifies a selection of example dimensions, including the example ratios, for an aperture and filament with rectangular transverse cross section. The ratio of A:F can therefore be in the range of 1:1 to 1:1.5.

TABLE 2

| Filament | | | Aperture | | | |
|---|---|---|---|---|---|---|
| Height (mm) | Width (mm) | Area (mm^2) | Height (mm) | Width (mm) | Area (mm^2) | Ratio A/F |
| 0.70 | 0.70 | 0.4900 | 0.73 | 0.73 | 0.5329 | 1.0876 |
| 0.70 | 0.70 | 0.4900 | 0.80 | 0.80 | 0.6400 | 1.3061 |
| 0.85 | 0.85 | 0.7225 | 0.88 | 0.88 | 0.7744 | 1.0718 |
| 0.85 | 0.85 | 0.7225 | 0.95 | 0.95 | 0.9025 | 1.2491 |
| 3.00 | 3.00 | 9.0000 | 3.03 | 3.03 | 9.1809 | 1.0201 |
| 3.00 | 3.00 | 9.0000 | 3.10 | 3.10 | 9.6100 | 1.0678 |

In an embodiment, a headgear 200 for a respiratory mask is provided. The headgear 200 comprises at least one strap 208 and at least one yoke assembly 20. Strap 208, as will be described further below, comprises a filament guide and at least one filament 1830 which extends within the filament guide and enters the yoke assembly 20. A sheath, such as an elastic sheath, may be provided around the strap 208, that is, around the filament 1830 and filament guide. The headgear 200 also comprises the directional adjustment unit 1800 according to any of the embodiments disclosed herein. The filament 1830 has at least one flat or substantially flat exterior surface extending along a longitudinal axis thereof, so that in the engaged configuration at least a flat or substantially flat portion of the substantially flat or flat exterior surface of the filament 1830 is brought into contact with the transverse cross sectional substantially linear or linear portion of the at least one engagement surface of the frictional engagement member 1820, 1822 of the directional adjustment unit 1800.

In some configurations, the sheath around the at least one strap 208 is flexible, elastic, and/or spring elastic, allowing it to be extended from an idle length when the yoke assembly 20 is pulled outwards by the hand of the user, while allowing it to attempt to return to its idle length when the yoke assembly 20 is released. The filament 1830 may extend through the sheath. The at least one filament 1830 of the headgear further comprises a core portion 181 having a first geometrical shape. The filament 1830 further comprises an end portion 183 having a second geometrical shape. The filament 1830 further comprises a transitional portion 182 provided longitudinally between the core portion 181 and the end portion 183. The transitional portion 182 has a shape transitioning from the first geometrical shape of the core portion 181 to the second geometrical shape of the end portion 183 over a longitudinal distance along the longitudinal axis of the filament 1830.

In some configurations, the yoke assembly 20 is arranged to connect the headgear to the respiratory mask.

In some configurations, the at least one strap 208 forms a cavity therein for accommodating the filament 1830. At least one part of the cavity of the strap may have a shape conforming to that of the filament 1830. For example, for a filament 1830 with a transverse rectangular cross section, at least part of the strap cavity may be transversely rectangular with slightly larger dimension to fit the rectangular filament 1830.

For a filament 1830 with a transverse triangular cross section, at least part of the strap cavity may be transversely triangular with slightly larger dimension to fit the triangular filament 1830.

The directional adjustment unit 1800 may be arranged within the yoke assembly 20, when assembled. The housing 1810 of the directional adjustment unit 1800 may comprise an external opening 1860 for slidably accommodate at least part of the filament 1830, for example a part of the transitional portion 182 and/or the end portion 183, in use. In some configurations, the external opening 1860 has a size, i.e. at least one cross sectional dimension, smaller than that of a portion of a transitional portion 182 of the filament 1830, in use, so as to prevent the transitional portion 182 to fully enter the directional adjustment unit 1800.

In some configurations, the yoke assembly 20 comprises a central portion and at least one section extending from the central portion, wherein the at least one section is configured to connect to the at least one strap 208 of the headgear.

FIGS. 19 to 25 illustrate an example of a respiratory interface system 100 or respiratory mask system 100 for the delivery of respiratory therapy to a patient according to an embodiment. The mask system 100 may comprise an interface, such as a mask 102. In the illustrated arrangement, the mask 102 comprises a seal, or seal module, and a frame, as described in further detail herein. The illustrated mask system 100 also includes a headgear 200 (which may also be referred to as a "headgear assembly" herein). The mask 102 and headgear 200 may comprise a connection system to attach the headgear 200 to the mask 102. Various forms of connection systems may be used to attach the headgear 200 to the mask 102. Similarly, the mask 102 may be coupled to at least one and possibly multiple different types of headgear.

Figure 25:
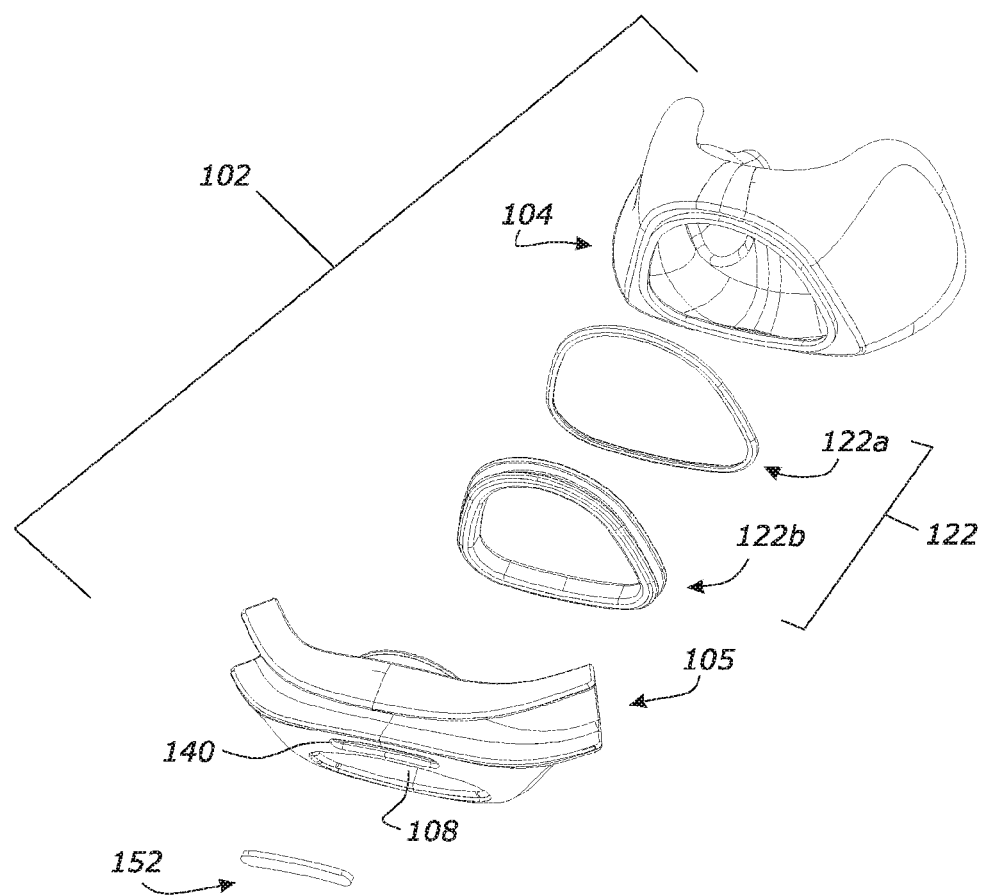
FIG. 25 is an exploded perspective view of a respiratory mask according to an embodiment.

Referring to FIG. 25, the mask 102 may comprise a seal 104 and a frame 106. The seal 104 can be configured for sealing around and/or underneath a patient's mouth and/or nose. In the illustrated arrangement, the seal 104 is a nasal seal configured to deliver the flow of breathing gases only to the user's nose. In particular, the illustrated seal 104 includes a pair of nasal pillows configured to create a seal with the user's nares and a secondary sealing portion that surrounds the nasal pillows and is configured to create a secondary seal with one or more of an underside of the user's nose, side portions of the user's nose and the user's upper lip.

However, features of the present disclosure can be implemented with other mask systems having other types of mask seals, such as nasal seals, full-face seals such as full-face over nose seals, and full face under nose seals, for example and without limitation.

The frame 106 is configured for supporting the seal 104 and attaching the seal 104 to the headgear 200. The frame 106 may also comprise a gas inlet 108, see FIG. 25, configured to attach to a gas conduit 110 for delivering a flow of breathing gas to the patient via the mask 102.

The seal 104 can include an attachment frame or clip 122, which in some arrangements can include a first portion 122a and a second portion 122b that capture a rim of the seal 104 between them. The clip 122 is configured to selectively connect to the frame 106, such as by a snap-fit, friction fit or other suitable arrangement. The frame 106 can include a vent 140, which is configured to exhaust gases from an interior of the seal 104. Optionally, the mask 102 can include a vent insert or diffuser 152 that covers the vent 140 to control the exhaust flow.

The headgear 200 of the respiratory mask system 100 is used to hold the mask 102 to the patient's face. The headgear 200 is typically attached to the mask 102 and wraps around the rear of the patient's head to hold the mask 102 in sealed contact with the patient's face.

In one form, the headgear 200 may comprise a yoke assembly 20 or collector, which is configured to attach to the mask 102, as described in greater detail herein.

The yoke assembly 20 may be configured to attach to straps of the headgear 200 such that the straps and yoke 20 cooperate to form a closed loop that surrounds the head of the user. In the illustrated embodiment, the headgear 200 comprises an assembly of straps, including a rear strap 204 configured to wrap behind a patient's head, an upper strap 206 configured to wrap over the top of a patient's head, and a pair of front straps 208, see FIG. 25, configured to extend along the patient's cheeks during use. In some configurations the upper strap 206 may not be necessary.

Figure 23:
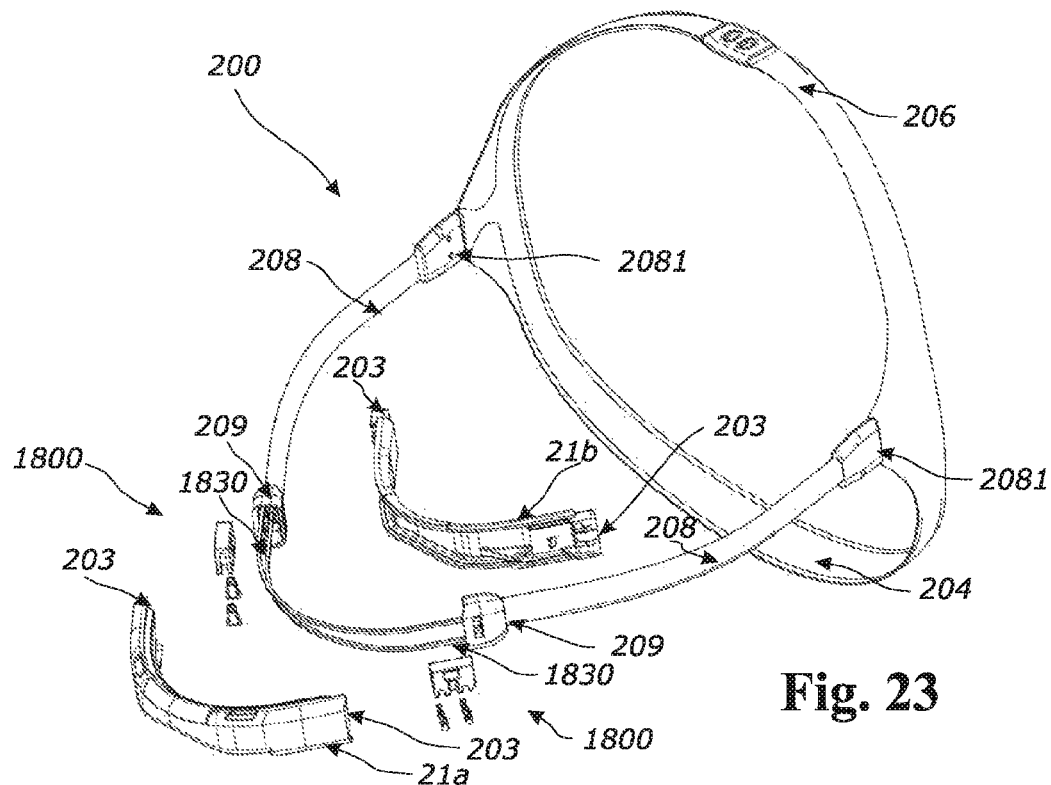
FIG. 23 is an exploded view of the seal assembly, frame assembly, and a front portion of the headgear.
Figure 24:
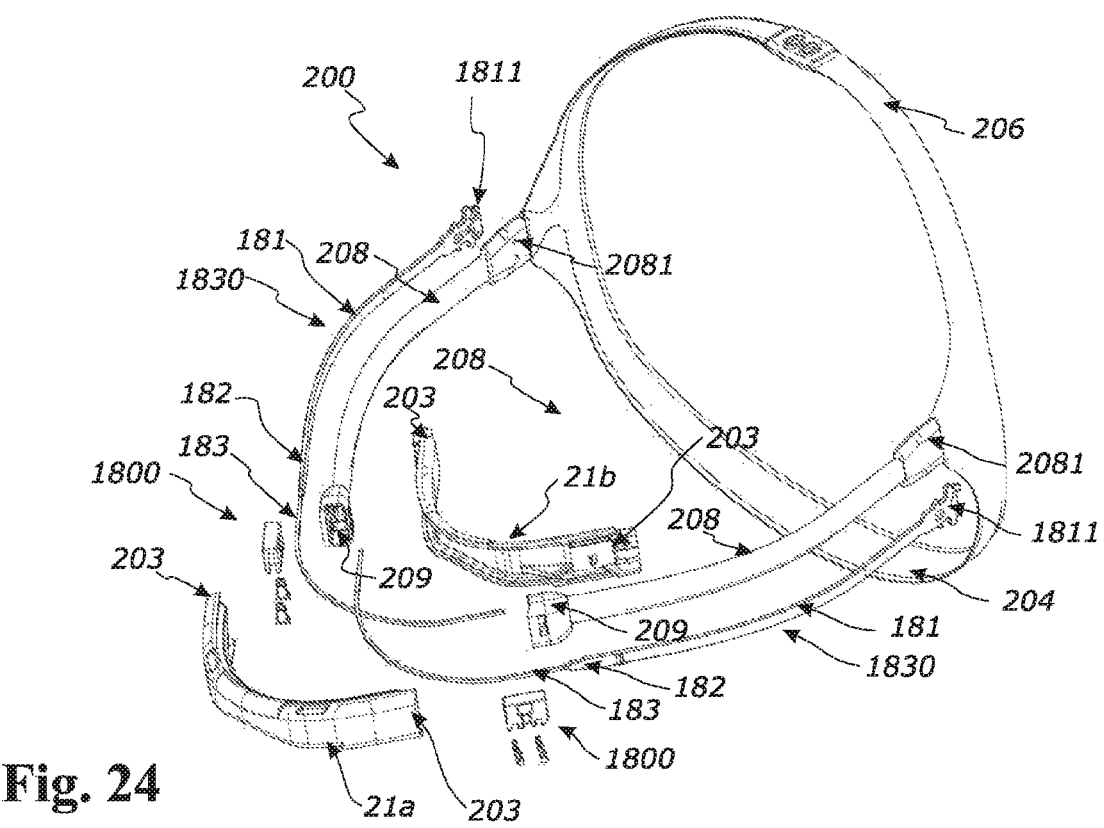
FIG. 24 is a further exploded view of one form of headgear corresponding to FIG. 23.

In some configurations, for example as shown in FIGS. 23 and 24, the at least one filament 1830 comprises the core portion 181, transitional portion 183, and end portion 183 as described above.

In some configurations, each front strap 208 is attached to the rear strap 204 of the headgear assembly 200, for example, to a free end 207 of the rear strap 204 or a connector coupled to the free end 207, by a rear connector 205. In another form, the rear strap 204 comprises side extensions that form front straps to extend along the patient's cheeks during use.

In one form, the headgear 200 can be adjustable (for example manually adjustable, automatically adjustable) and/or can incorporate one or more directional adjustment units 1800 as described above) that allow the headgear 200 to reduce in length with a relatively low amount of resistance and resist an increase in length of the headgear 200. In some configurations, a locking force of the directional adjustment units 1800 may be overcome to allow lengthening of the headgear 200 for donning of the interface assembly 100. In some forms, the yoke assembly 20 may form a collector for filaments used in an automatically adjustable headgear system. In this form, the yoke assembly 20 may incorporate one or more directional adjustment units 1800, each of which can comprise one or more lock elements, which can be referred to herein as frictional engagement members 1820, 1822. The frictional engagement members 1820, 1822 are configured to frictionally engage with the filament 1830 during elongation of the headgear 200, but allow relatively friction-free movement during retraction of the headgear 200.

The frictional engagement members 1820, 1822 and/or filaments 1830 may have at least one flat or substantially flat portion or region or exterior surface as described above.

The directional adjustment units 1800 may be incorporated into the ends of the yoke assembly or collector 20 and the body of the yoke assembly 20 or collector may be substantially hollow to receive the filaments within the body. The headgear 200 or any portion thereof can be configured in accordance with any of the embodiments disclosed in Applicant's U.S. Publication No. 2016/0082217, U.S. application Ser. No. 14/856,193, filed Sep. 16, 2015, and PCT Publication No. WO2016/043603, the entireties of which are incorporated by reference herein.

As perhaps best shown in FIGS. 23 and 24 the headgear 200 comprises two filaments 1830, one for each front strap 208. However, any number of filaments could be used.

With reference to FIGS. 23 and 24 each front strap 208 may comprise a free end to which may be attached a connector 209. Each connector 209 may engage with a complementary strap connector 203 located on the yoke assembly 20. Preferably, the yoke assembly 20 is substantially elongate and comprises a strap connector 203 located at or near each end of the front member 21a and rear member 21b of the yoke assembly 20.

Optionally, the front strap(s) may also be overmoulded onto a connector located at the yoke assembly. The connection between the front straps 208 and yoke assembly 20 may be any suitable form of connection, such as a snap-fit connection, a screw and thread type connection, an overmould connection, or a hooked connection. In one configuration, each strap connector 203 comprises a cap 210 (not shown in FIGS. 23 to 24) located at each end of the yoke assembly 20. Each cap 210 may comprise an opening, such as an aperture or recess, configured to receive the connector 209 of the front strap 208 in a snap-fit arrangement to attach the yoke assembly to the front straps 208 of the headgear assembly 200.

With reference to FIG. 24, the filament 1830 may be connected to the upper strap 206 and or rear strap 204, via a front strap connector 2081, thereby securing one end 1811 of the core portion 181 of the filament 1830 to the front strap connector 2081.

This means that as the front strap 208 is extended, for example as a result of pulling the yoke assembly to which the strap 208 is connected in use, the extending parts of the front strap 208 will move, for example slide, in relation to the filament 1830, as both the front strap 208 and the core portion end 1811 are connected together in or adjacent to front strap connector 2081. This in turn leads to the free end of the end portion 183 of the filament 1830 to move closer to the connector 209 of the strap 208 in which said filament is provided. This in turn leads to a relative motion between the end portion 183 of the filament 1830 and the direction adjustment unit 1800 through which the filament 1830 is arranged. As the yoke assembly 20, and indirectly also the directional adjustment unit 1800, are connected to connector 209, the filament 1830 will move relative the directional adjustment unit 1800. This relative motion activates the associated frictional engagement members 1820, 1822, by means of friction between the filament 1830 and the frictional engagement member cavities, in which the filament is provided, so as to move from their disengaged configuration towards their engaged configuration.

The opposite phenomenon occurs when the strap 208 is allowed to return from its extended state to its non-extended state, for example upon the user releasing the yoke assembly 20 with his/her hand. The spring elasticity in the strap 208 acts to retract the strap 208 from its extended state to its idle state. In this scenario, the distance between the free end of the end portion 183 of the filament 1830 moves further apart from the connector 209 of the strap 208 in which said filament 1830 is provided. This in turn leads to a relative motion between the end portion 183 of the filament 1830 and the direction adjustment unit 1800 through which the filament 1830 is arranged. This relative motion forces the frictional engagement members 1820, 1822, by means of friction between the filament 1830 and the frictional engagement member cavities, in which the filament is provided, to move from their engaged configuration towards their disengaged configuration.

It should appreciated that the direction adjustment unit 1800 having at least one frictional engagement member 1820, 1822 having an aperture forming an engagement surface of the frictional engagement member that has, in transverse cross section, a linear or substantially linear portion for engaging a corresponding flat or substantially flat portion of the filament 1830, may be provided in any headgear design, i.e. also designs other than those disclosed herein. In such designs the respective directional adjustment unit 1800 and filament 1830 may be oriented, arranged or connected in different manners in relation to the other components of the headgear, while still allowing for the relative motion therebetween, which triggers the movement between the disengaged state and engaged state.

As mentioned above, the yoke assembly 20 may also be configured to attach to the frame 106 of the mask 102. In one form, the frame 106 may comprise a recessed region or alignment feature configured to receive at least a portion of the yoke assembly 20 therein when the yoke assembly 20 and frame 106 are attached together. A cover sleeve, or front portion 22 can be configured to facilitate the removable connection of the yoke assembly 20 with the frame 106.

Turning to FIGS. 26a to 26h, a housing 1810 of the directional adjustment unit 1800 according to an embodiment is shown. In this embodiment, the housing 1810 is adapted to retain two frictional engagement members 1822, 1820, in a single housing. However, it should be appreciated that the housing 1810 could be adapted to retain any given number of frictional engagement members according to other embodiments. Hence, any given number of frictional engagement members could be arranged in series, i.e. one after the other, in a housing according to some embodiments. Likewise, the directional adjustment unit 1800 may comprise multiple housings in series, with each housing containing a single frictional engagement member 1820, 1822 For example, a directional adjustment unit 1800 may comprise a single housing comprising two frictional engagement members 1820, 1822 or a directional adjustment unit 1800 may comprise two housings, with each housing comprising a single frictional engagement member. The features of the filament guides in each housing substantially isolates the operation of the frictional engagement members such that the directional adjustment unit comprising a single housing comprising two frictional engagement members would provide a substantially similar performance to the directional adjustment unit comprising two housings each comprising a single frictional engagement member.

Figure 26A:
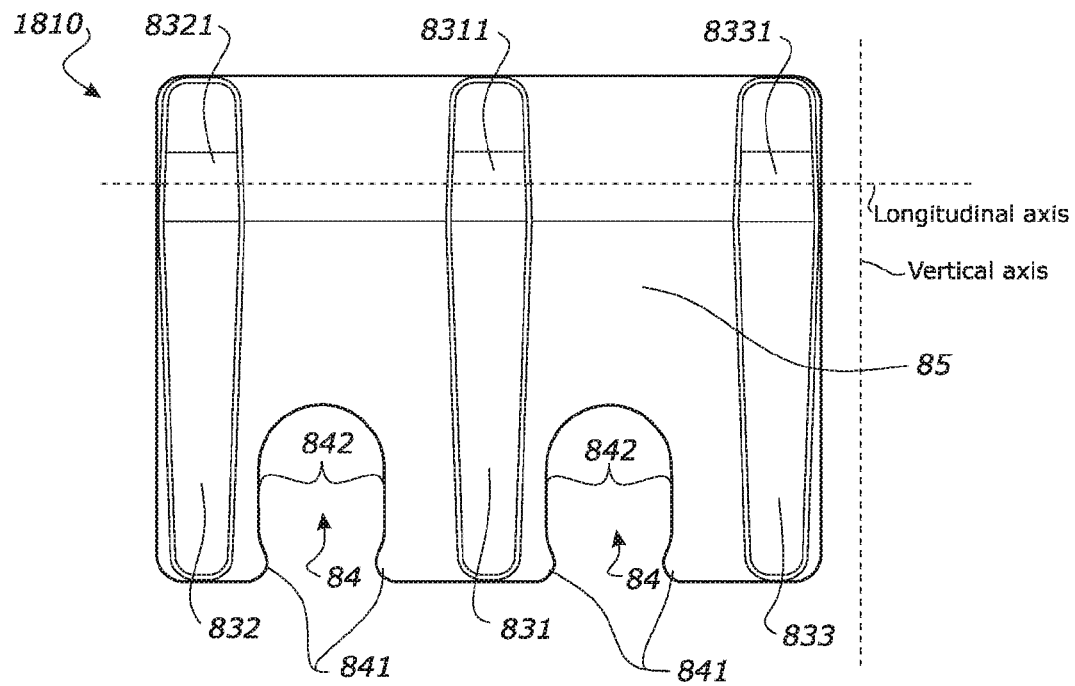
FIG. 26a is a cross sectional cutaway view of the housing of the directional adjustment unit.

FIG. 26a is a cross sectional cutaway view of the housing 1810 of the directional adjustment unit. The housing 1810 comprises a filament guide 831 having a first opening 8311 for slidably retaining a filament (not shown), in use. The filament guide 831 may form an intermediate wall or structure of the housing 1810, or at least an intermediate structure positioned between adjacent frictional engagement members 1820, 1822. A purpose of the filament guide 831 is to allow for the filament to be aligned in a correct, or desired vertical position between the two frictional engagement members 1820, 1822. In particular, the filament guide 831 restrains the filament 1830 in a direction perpendicular to the axis of the filament 1830, resisting movement towards or away from the pivot axis of the frictional engagement members 1820, 1822, and constraining the filament relative to the inlet and outlet apertures 8321, 8331 in the housing 1810. This helps to restrain the filament along a desired filament path through the housing 1810, minimising or at least controlling bending of the filament within the housing 1810 and relative to the or each frictional engagement member 1820, 1822, so as to at least partially isolate the operation of one frictional engagement member from the other, thereby allowing the two frictional engagement members to operate substantially independently. As such, the configuration of a first frictional engagement member 1820, 1822 in a series will have less impact on the subsequent frictional engagement member 1820, 1822 in the series, since the filament will enter each frictional engagement member 1820, 1822 in a substantially identical, or more closely identical, orientation. Constraint of the filament between adjacent frictional engagement members, also serves to minimise, but not necessarily wholly eliminate, bending of the filament 1830 as it enters and exits the housing 1810, and thus minimises, but not necessarily eliminates, undesirable inflection of the filament 1830 in the housing 1810, and relative to each frictional engagement member 1820. Such inflection of the filament 1830 can be seen for example in FIGS. 1a and 8. Undesirable inflection can be described as inflection of the filament 1830 that is contrary to the operation of the frictional engagement members. This undesirable inflection of the filament 1830 generally occurs when entering or exiting the housing 1810, or between frictional engagement members.

Hence, the filament guide 831 when intermediate the frictional engagement members 1820, 1822 assists in ensuring that pivoting of one frictional engagement member 1820, 1822 has a reduced effect on the pivoting of another frictional engagement member 1820, 1822 by aligning, or at least improving the alignment of, the filament along the longitudinal axis after the filament has exited one frictional engagement member 1820 and before it enters the next frictional engagement member 1820. Hence, the filament guide 831 may be said to act as to unbend or straighten the filament 1830 between the frictional engagement members 1820. Therefore, the filament guide at least partially isolates the operation of one frictional engagement member 1820 from another.

As described above, the housing 1810 further comprises at least one mounting slot 84 providing a retaining space for slidably retaining a base member 1824 of each frictional engagement member 1820, 1822. Slot 84 is configured to enable the frictional engagement member(s) 1820, 1822 to pivot relative to the housing 1810 as described above, and also to slide or translate towards or away from the base of the housing 1810, the extent of any such movement being limited by the frictional engagement member 1820 abutting an end of the slot 84. Each slot 84 thus defines a predetermined elongate path along which the frictional engagement member 1820, 1822 can move, in additional to any pivotal movement about the pivot axis. This translational movement of the frictional engagement member 1820, 1822 enables the position of the aperture 1876 to follow the path of the filament, such as, but not limited to, moving vertically to correspond with the vertical movement of a location of the filament, as it bends inside housing 1810, moving with the filament as each frictional engagement member 1820, 1822 moves from the disengaged to the engaged positions.

Each slot 84 may form part of a side wall 85 of the housing. Each frictional engagement member 1820, 1822 may be mounted on the housing 1810 using two laterally opposed slots 84 of the housing 1810. The two laterally opposed slots 84 may be formed in two laterally opposing side walls of the housing 1810.

However, it should be appreciated that in alternative embodiments, only a single slot 84 may be required to mount each frictional engagement member 1820, 1822 on the housing 1810. Such a single slot 84 could for example be formed in a solid base or lower region of the housing 1810. The frictional forces between the outer periphery of the base member 1824 and the slot surfaces 842 can be desirably kept to a minimum, or at least reduced, for example by designing the slot surfaces and/or the base members 1824 to be smooth, and/or by suitable material/material coating selection, and/or by suitable tolerances between the components. Hence, by tailoring the shape and surface of the dual slot or single slot 84, the frictional forces between the exterior of the base member 1824 and the slot surface may be kept at desired relatively low levels.

The retaining space formed by each slot 84 may be sized so as to allow the retained base member 1824 to pivot around its pivot axis within said retaining space. In other words, the retaining space is sufficiently large relative to the base member 1824 to allow the base member 1824 to be translationally displaced along the slot 84, in a direction away from the base of the housing 1810, such that the pivot axis can be translationally displaced along the slot 84.

In some embodiments, the slot 84 may have a lateral cross sectional shape that is similar to, but larger than that of the lateral cross sectional shape of the base member 1824, when viewed along the pivot axis of the base member 1824. The size of the slot 84, or of a dimension of the slot 84, can be configured to allow a predetermined or desired maximum amount of movement of the base member 1824 relative to the slot 84.

In embodiments where the lateral cross sectional shape of the base member 1824 is circular, the slot 84 may have a corresponding but larger circular shape, or at least part circular or arcuate ends, so as to allow the base member 1824 to be movably retained in the circular slot 84. In such embodiments, the pivot axis of the base member 1824 will be kept substantially fixed in relation to the housing 1810 when the frictional engagement member 1820, 1822 moves from the disengaged configuration to the engaged configuration. The aperture of each frictional engagement member 1820, 1822 would therefore move along an arc similar to that shown in FIGS. 11 and 12, as the pivot axis is kept substantially fixed in relation to the housing 1810.

The Applicant has realized that each of, and/or any combination of, the pivot angle of the frictional engagement members 1820, 1822 in relation to the housing 1810, the position of the filament entering and exiting the housing 1810, and the position of the filament 1830 between frictional engagement members 1820, 1822 are relevant to the amount of the frictional forces exerted between the frictional engagement members 1820, 1822 and the filament 1830 as the frictional engagement member 1820, 1822 moves from the disengaged to the engaged positions.

In an embodiment, the pivot axis of the frictional engagement member 1820, 1822 is fixed in relation to the housing 1810, and the filament 1830 is either partially, or not significantly constrained in a "vertical" direction when entering or exiting housing 1810, for example this configuration is shown in FIGS. 1, 7, 8, 10-12. In other words, the distance between the filament 1830 and the base of the housing 1810 is not constrained. In this embodiment the pivot angle of frictional engagement members 1820, 1822 relative to the housing 1810 will significantly influence the tortuous path that filament 1830 extends through the housing 1810 because there are limited constraints to the filament 1830 when entering or exiting housing 1810. The filament 1830 will tend to bend or inflect inside the housing because of the material properties of the filament 1830, and the forces exerted by the engagement of the filament 1830 with the frictional engagement member(s) 1820, 1822. Because of the lack of constraints on the filament 1830 other than the positioning of frictional engagement members 1820, 1822, the pivot angle can be said to be largely determinative of the bend or kink formed in filament 1830 as it passes through the housing 1810, and therefore be largely determinative of the frictional forces exerted between frictional engagement members 1820, 1822 and the filament 1830.

In a further embodiment, the pivot axis of the frictional engagement member 1820, 1822 is fixed in relation to the housing 1810, and a filament guide 831 of housing 1810 significantly constrains the filament 1830 at a position within housing 1810. In this embodiment the pivot angle of frictional engagement member 1820, 1822 relative to housing 1810 together with the filament guide 831 will determine the tortuous path formed through and therefore determine the bend or kink formed in filament 1830. Because of the rigidity of filament 1830, the pivot angle of frictional engagement member 1820, 1822 may be limited. In this situation, where the pivot axis is fixed, the bend or kink in filament 1830 will be limited by the ability of the filament 1830 to extend through the aperture 1876 of the or each frictional engagement member 1820, 1822 and through the aperture 8331 of filament guide 831. The ability for filament 1830 to extend through these apertures 1876, 8331 (and the tortuous path formed) will be limited by the rigidity of the filament 1830. Therefore, by including filament guide 831 in housing 1810 where the pivot axis of frictional engagement member 1820, 1822 is fixed, the pivot angle and bend or kink formed in filament 1830 may be limited, by the filament path taken by filament 1830 being constrained by the filament guide and therefore the amount of frictional force between filament 1830 and frictional engagement member 1820, 1822 may be undesirably limited.

The Applicant has realized that by movably mounting the frictional engagement member 1820, 1822 in the housing 1810 to allow relative movement therebetween, particularly in a direction orthogonal to the pivot axis of the frictional engagement member 1820, 1822, and in particular in a direction that allows the pivot axis to move generally vertically upwardly relative to the housing 1810, away from the base of the housing 1810, it is possible for filament 1830 to extend through the aperture 1876 of the or each frictional engagement member 1820, 1822 in a fully, or at least more, engaged position and through the aperture 8331 of filament guide 831 without being limited by, or by being less limited by, the rigidity of filament 1830.

By designing a slot 84 so that the base member 1824 in addition to being pivotally retained also is allowed to be displaced, i.e. translationally displaced for example in a vertical direction, relative to the housing 1810, it is possible for one or more of the frictional engagement members 1820, 1822 to engage the sharp curve of the filament 1830 since the frictional engagement members 1820, 1822 are allowed to pivot while being vertically displaced. This sharp bend, curve or kink of the filament 1830 is formed in part due to the addition of filament guide 831 in which aperture 8331 constrains filament 1830 and therefore causes a sharp bend, curve or kink to be formed as the filament exits aperture 1876 of one or more of engagement members 1820, 1822 and enters aperture 8331 of filament guide 831. By allowing the pivot axis of the frictional engagement members 1820, 1822 to be displaced, the pivot axis is no longer fixed in relation to the housing 1810. The housing 1810 and frictional engagement members 1820, 1822 are thus configured to enable the pivot axis of the frictional engagement members 1820, 1822 to be floating, translatable or movable relative to the housing 1810.

Also by allowing the frictional engagement members 1820, 1822 to be slidably vertically displaced in relation to the housing 1810, it can be possible to allow the vertical displacement of the aperture 1876 of each frictional engagement member for a given pivot angle to more closely follow a notional line through the central axis of the aperture 8331 of the filament guide 831, when in the disengaged position. This may mean that the frictional forces between the frictional engagement member 1820, 1822 and the filament 1830 may be linearly and gradually increased only when moving from the disengaged configuration to the engaged configuration.

The housing 1810 of FIGS. 9a to 9f and 26a to 26f has slots 84 designed to allow the base member 1824 of each frictional engagement member to pivot as well as being vertically displaced, relative to housing 1810. Hence, the slots 84 are designed to allow for the pivot axis of the base member 1824 to be displaced or movable in relation to the housing 1810.

In FIG. 26a a longitudinal axis of the housing 1810 is shown. The longitudinal axis is drawn symmetrically through the opening 8311 of the filament guide 831. A "vertical" axis being perpendicular to the longitudinal axis is also shown. As may be observed from FIGS. 26a to 26d, the slots 84 are clearly shown. The slots 84 form retaining spaces for the base members 1824 (see FIGS. 9a to 9f).

As may be observed from FIGS. 9a to 9f, the retaining spaces may in lateral cross section have a width, for example extending along the longitudinal axis, being larger than a cross sectional width of the base member 1824 to allow the base member 1824 (and its pivot axis) to move within the retaining space.

The retaining space may be sized so as to allow the retained base member 1824 to move, to a certain extent, in a direction perpendicular to the pivot axis within said retaining space.

Figure 26B:
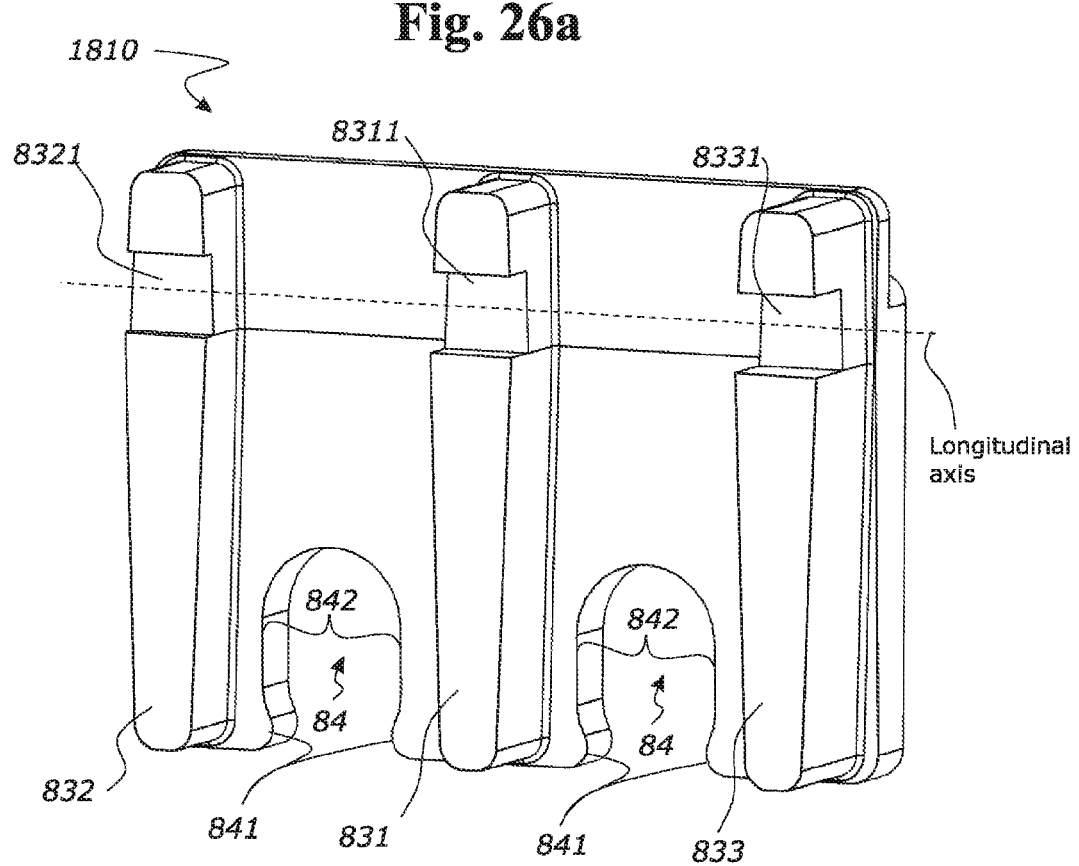
Figure 26C:
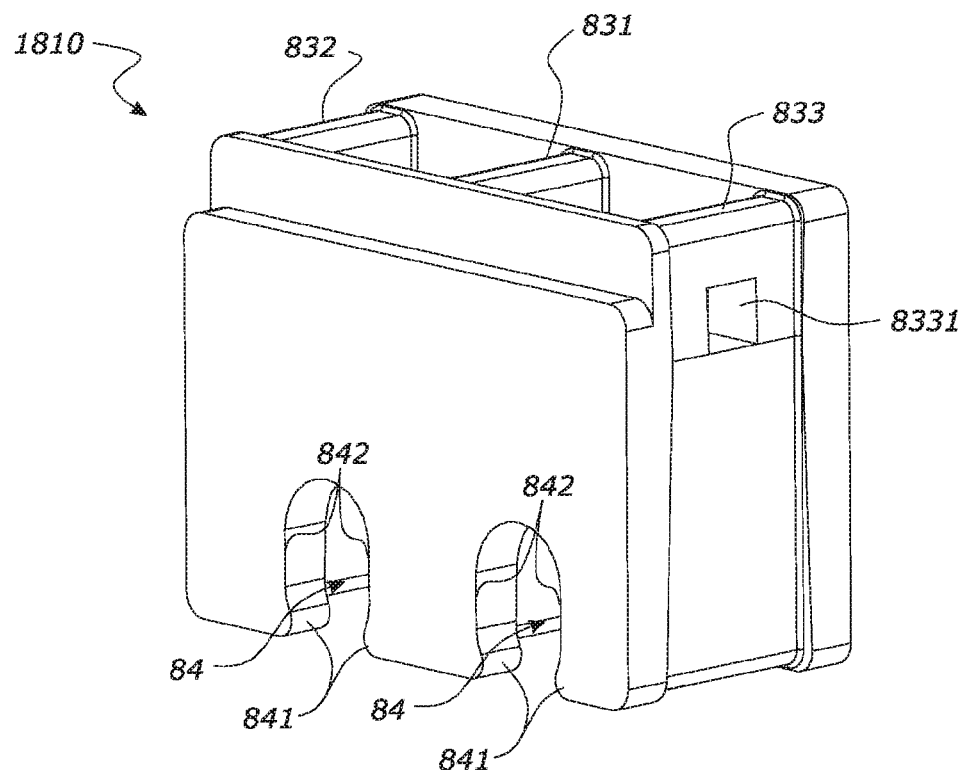

Turning to FIGS. 26a to 26c, the slot 84 forms an elongate, oblong or obround shape. The slot 84 extends along the vertical axis. As may be seen at least a portion of the slot 84 is formed by two opposing and parallel surfaces 842 of the sidewall 85 of the housing 1810. In FIGS. 26a to 26d the two opposing and parallel surfaces 842 are parallel with the vertical axis. The obround slot 84, when viewed along the pivot axis, has a vertical length greater than a horizontal width, and rounded ends. The lower rounded end is open, but comprises a narrower portion in the form of jaws 841, narrower than base member 1824, that retain the base member 1824 in the slot 84.

However, it should be appreciated that the two opposing parallel surfaces 842 may be oriented and aligned with any other axis having at least a component along the vertical axis, for example any axis orthogonal to the pivot axis, to allow the base member 1824 to be displaced away from the base of the housing 1810.

In the embodiment of FIGS. 26a to 26d, and FIGS. 9a to 9f, the slot 84 in lateral cross section has a length, for example extending along the vertical axis that is larger than its width to allow the base member 1824 to move in a direction orthogonal to the pivot axis. As such the length of the retaining space may extend substantially perpendicularly away from the base of the housing 1810, in a direction generally towards the filament 1830.

In some embodiments, the length of the slot 84 extends parallel or substantially parallel to at least a portion of the filament guide 831.

In some embodiments, the slot 84 has an end portion having an arcuate shape conforming at least in part with the at least partially arcuate shape of the base member 1824.

As may be observed in FIGS. 26a to 26d, and 26h the slot 84 may have at least one narrowing section 841 to prevent the base member 1824 from moving past said narrowing section, and thereby to remain within the slot 84 of the housing 1810. The frictional engagement members 1820, 1822 are mounted in the housing 1810 by forcing the base members 1824 into the slots 84 by resiliently deforming the jaws 841, which snap back once the base members 1824 are fully received in the slots 84.

The housing 1810 may further comprise one or more further filament guides for guiding the filament 1830. Each filament guide at least comprises a guide surface configured to contact the filament. In preferred embodiments at least one filament guide comprises an opening through which the filament extends. For example, the housing may further comprise a second filament guide 832 having a second opening 8321 for slidably guiding the filament 1830, in use. The filament guide 832 may form a first end wall of the housing 1810. With reference to FIGS. 9a to 9d, at least one frictional engagement member is arranged between the first filament guide 831 and second filament guide 832 of the housing.

The housing 1810 may further comprise a third filament guide 833 having a third opening 8331 for slidably guiding the filament 1830, in use. The third filament guide 833 may form a second end wall of the housing 1810, wherein the second end wall is opposite to that of the first end wall.

The applicant has found that in an embodiment where the housing 1810 comprises a first filament guide 831 having a first opening 8331 for slidably guiding the filament 1830, a second filament guide 832 having a second opening 8321 for slidably guiding the filament 1830, and a third filament guide 833 having a third opening 8331 for slidably guiding the filament 1830, that the ability for the pivot axis of the frictional engagement member 1820, 1822 to translationally move can be useful.

The applicant proposes providing a pair of filament guides for a single frictional engagement member 1820, 1822 and then an additional filament guide for each additional frictional engagement member 1820, 1822, with each frictional engagement member 1820, 1822 being located intermediate two filament guides. Therefore in a housing 1810 comprising a single frictional engagement member 1820, 1822 there will be provided two filament guides. In a housing 1810 comprising two frictional engagement members 1820, 1822 there will be provided three filament guides, and in a housing 1810 comprising three frictional engagement members 1820, 1822 there will be provided four filament guides.

In such an embodiment with two frictional engagement members, the filament 1830 is constrained, or slidably guided, at a plurality of positions. Filament 1830 is constrained at the entry and exit of housing 1810 by second filament guide 832 and third filament guide 833 respectively, as well as within the housing 1810 by first filament guide 831. These three filament guides constrain filament 1830 at a determined "vertical' position, or said another way, constrain filament 1830 such that it is substantially horizontal when viewed in FIG. 9*d* for example at multiple positions. As engagement member 1820, 1822 pivots in response to lateral movement of the filament 1830 it begins to engage filament 1830 with front and rear aperture edges 81 and 82 and form a tortuous path defined by the three filament guides 831, 832, 822 and the cavity provided by aperture 1876 of the or each frictional engagement member 1820, 1822. This contact between front and rear aperture edges 81 and 82 and filament 1830 leads to filament 1830 bending, or kinking between first filament guide 831 and one of second filament guide 832 or third filament guide 833. The rigidity of filament 1830 and the constraints at exit and entry of the housing 1810 means that the filament must bend or kink above the horizontal axis defined in the resting position. Because of this the pivot axis of engagement member 1820, 1822 translates vertically to enable the engagement member 1820, 1822 to pivot completely and engage the filament 1830 with sufficient friction force.

In some embodiments, where the directional adjustment unit contains more than two frictional engagement members 1820, 1822 mounted in the housing 1810, the third filament guide 833 may form a further intermediate wall of the housing 1820. A filament guide with an opening may be provided between each adjacent pair of frictional engagement members 1820, 1822.

Figure 26D:
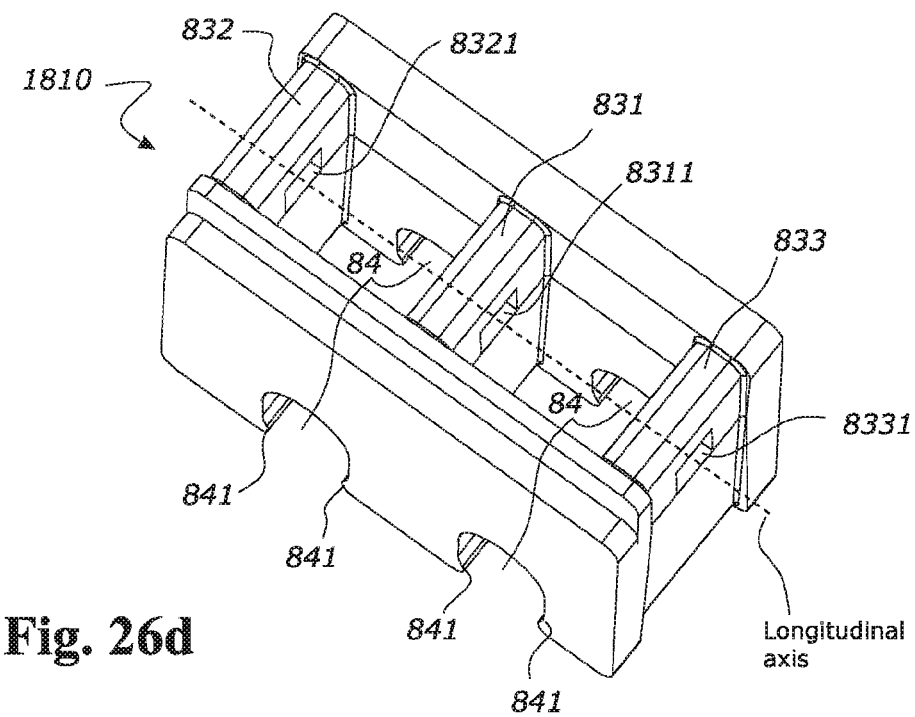
FIG. 26d is a perspective cross sectional view of the housing of FIG. 26a seen more from above than that of FIG. 26c.

With reference to FIGS. 26*b* to 26*d* the first opening 8311, second opening 8321, and/or third opening 8331 in the housing 1810 may have a filament engagement surface that is linear or substantially linear in cross-section, when the housing 1810 is viewed in the direction of the pivot axes of the frictional engagement members 1820, 1822. The respective engagement surface slidably engages the flat or substantially flat portion of the filament, in use.

With reference to FIG. 26*d*, the first opening 8311, second opening 8321, and/or third opening 8331, in transverse cross section, may be aligned with a longitudinal axis extending through the housing 1810. In other words, the longitudinal axis passes through the centre of each of the first opening 8311, second opening 8321, and/or third opening 8331.

Figure 26E:
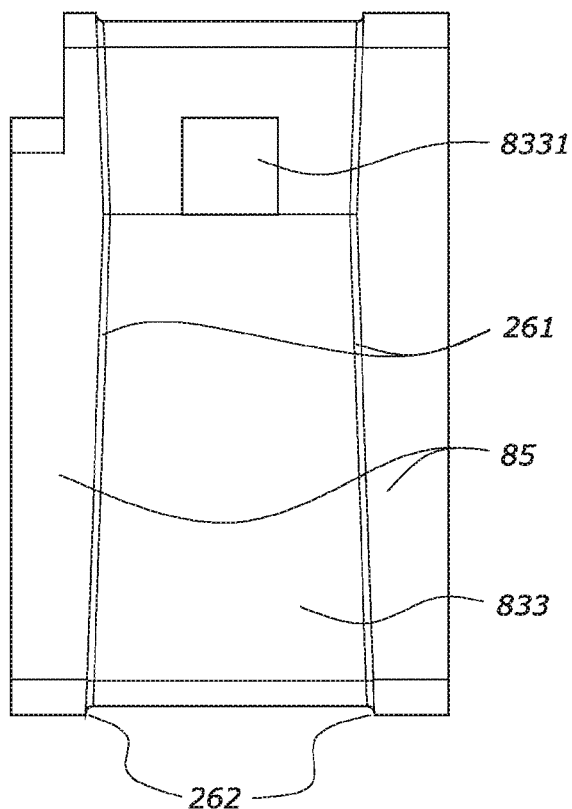
Figure 26F:
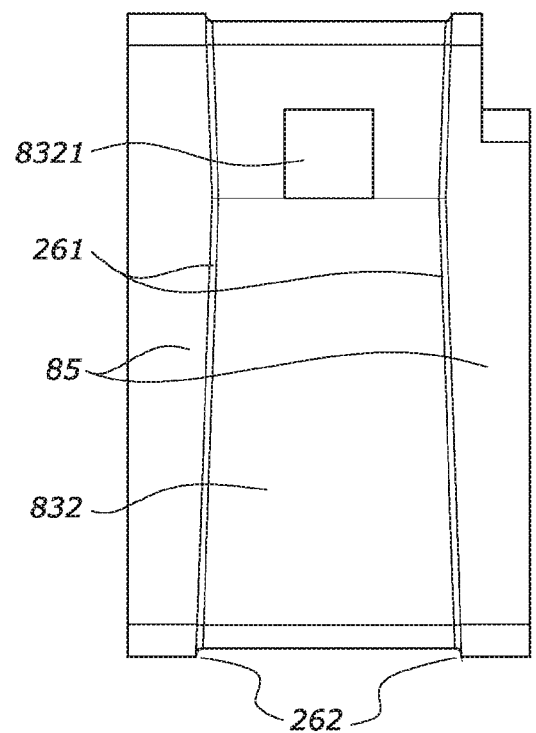

FIGS. 26*e* and 26*f* show respective front and rear views of the housing 1810 according to an embodiment. FIG. 26*e* shows a front view of the housing 1810 according to an embodiment, in which the third filament guide/end wall 833, third opening 8331, and side walls 85 are identified.

FIG. 26*f* shows a rear view of the housing 1810 according to an embodiment, in which the second filament guide/end wall 833, second opening 8321, and side walls 85 are identified.

As may be observed from FIGS. 26*e* and 26*f* the respective end walls may be provided with draft angles 261 that allow for improved tooling.

It may also be observed that steps 262 are provided between the respective side walls 85 and the end walls 833, 832. This may allow for improved multi core tool design.

Turning to FIG. 26*g*, a top view of the housing of FIG. 26*a* is shown with two retained frictional engagement members 1822, 1820. The frictional engagement members are here shown in the disengaged configuration. In this embodiment the housing 1810 forms an open cavity between the respective first, second and third filament guides 831, 832, 833 and the respective side walls 85, in which cavity each frictional engagement member 1822, 1820 is allowed to move.

FIG. 26*h* is a bottom view of the arrangement of FIG. 26*g*, where the base members 1824 of the respective frictional engagement members 1822, 1820, can be clearly seen being retained in the respective slot 84 by means of the narrowing sections 841.

Figure 27:
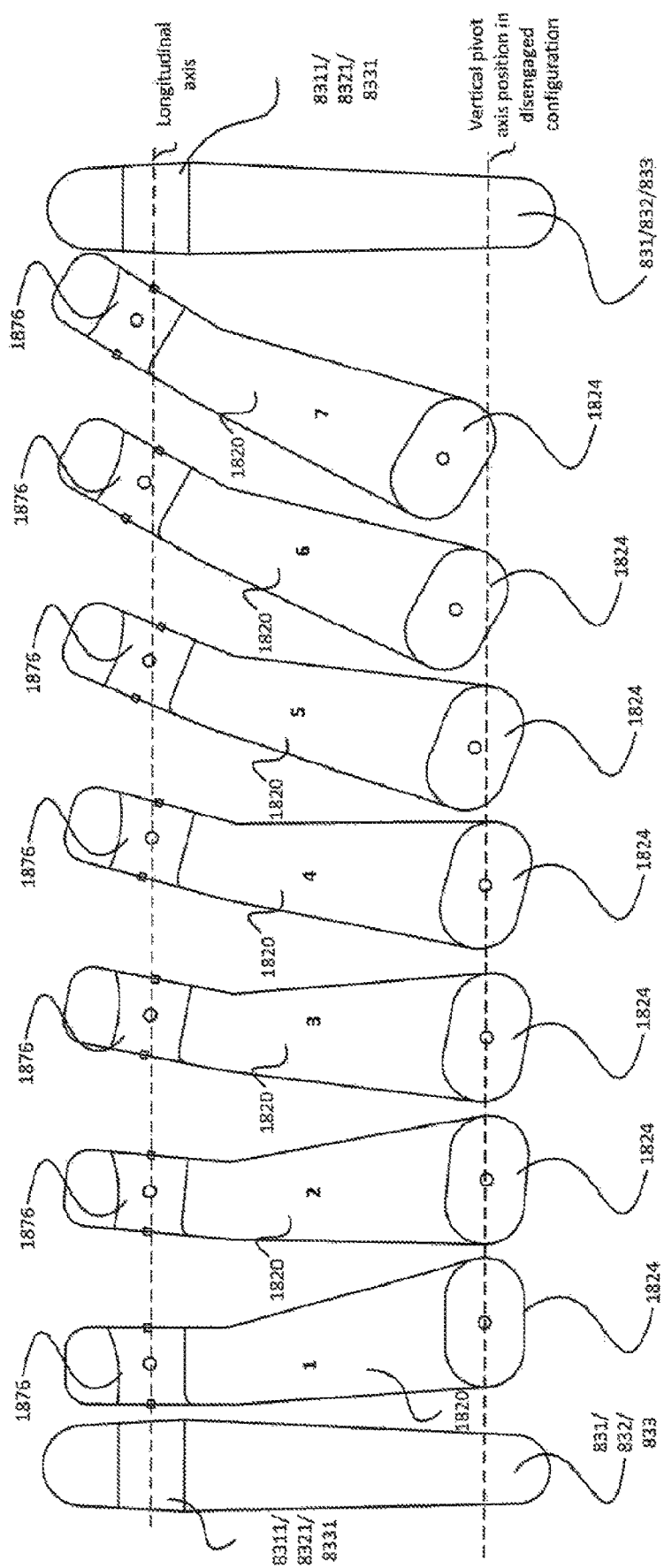
FIG. 27 is a cross sectional cutaway view showing the orientation, in terms of pivoting and vertical displacement, of a directional adjustment unit at a number or arbitrarily selected different stages of moving from the disengaged configuration to the engaged configuration; where any of the initial stages 1 to 3 and/or the terminal stages 5 to 7 can be omitted.

FIG. 27 is a cross sectional schematic view showing the orientation, in terms of pivoting and vertical translational displacement, of a frictional engagement member 1820 being retained in a housing 1810 having a slot 84 allowing the pivot axis of the frictional engagement member 1820 to move in relation to the housing 1810, when a filament (not shown) is moved, for example pulled in a direction towards the right, relative to the filament guides 821, 832, 833, and/or frictional engagement member 1820. It is this relative movement between the filament and the housing 1810 in which the frictional engagement member(s) 1820 is/are retained that changes the orientation of the frictional engagement member(s) 1820. Without an assembled filament the only force acting against the frictional engagement member is that of gravity.

More particularly, FIG. 27 illustrates an example of the relative movement of the frictional engagement member 1820 in relation to the longitudinal axis of the housing 1810 (symmetrically arranged along the openings 8311, 8321, 8331) and the original vertical position of the pivot axis (in the disengaged position as shown by the leftmost frictional engagement member 1820 of FIG. 27) taken at different pivot angles when moving from the disengaged configuration to the engaged configuration.

The vertical position of the pivot axis changes for any given pivot angle as the frictional engagement member 1820 moves from the disengaged configuration towards the engaged configuration. It may also be observed that in relative terms the aperture 1876 of the frictional engagement member 1820 remains more centred in relation to the openings 8311, 8321, 8331 of the housing 1810 than would be the case for the fixed pivot axis solution, as shown in FIGS. 11 and 12. In other words, the vertical displacement of the aperture 1876 in relation to the longitudinal axis of the housing 1810 is reduced in this embodiment. This is primarily because the filament 1830 is constrained by the aperture 8311 in the first filament guide 831. This constraint resists the tendency of the filament 1830 to inflect, in the housing 1810 between the housing inlet and outlet apertures, and more importantly minimises the curving of the filament 1830 shown in FIGS. 1*a* and 8 between a first engagement member 1820 and second engagement member 1822, at least to some degree. The constraint of the filament 1830 by the or each filament guide 831, 832, 833, causes each frictional engagement member 1820 to want to move translationally within the housing 1810 such that the aperture 1876 of each frictional engagement member 1820 follows the inflection of the filament 1830. The rigidity of the filament 1830 means that when the bend or kink is formed it lifts the frictional engagement member 1820, 1822 upwardly away from the base of the housing 1810, because it is constrained on the left and right sides and therefore has to bend upwardly. To allow this to occur, the pivot axis of each frictional engagement member 1820 is vertically displaceable relative to the housing 1810, along the predetermined elongate path defined by slots 84. Thus, each frictional engagement member 1820 can float or move relative to the housing 1810, to follow the path of the filament 1830, at least to some extent.

The general alignment of the aperture 1876 to the longitudinal axis of the housing depends on a number of factors, for example the size and shape of the frictional engagement member aperture 1876 in relation to the filament 1830, the relative size, position, relative orientation, and alignment of the adjacent openings 8311, 8321, 8331 of the housing 1810, the longitudinal distance between the centre of the left face of the aperture 1876 to the closest filament guide 831, 832, 833, the longitudinal distance between the centre of the right face of the aperture 1876 to the closest filament guide 831, 832, 833, and/or the weight of the frictional engagement member 1820 in relation to the required pulling force of the filament 1830. Another factor relates to the material characteristics of the filament 1830 in terms of resistance to bending or relative resistance to bending in relation to that of the frictional engagement member 1820 or other material characteristics. Hence, a filament 1830 that is more or less bendable will affect the vertical displacement of the frictional engagement member 1820 as it is moved from the disengaged configuration to the engaged configuration.

To this extent FIG. 27 should only be seen as one example arrangement of how a frictional engagement member 1820 having a pivot axis being vertically displaceable relative to housing 1810 may generally move between the disengaged configuration and the engaged configuration. In FIG. 27, the openings 8311, 8321, 8331 at both sides of the frictional engagement member 1820 are arranged along the longitudinal axis such that the longitudinal axis runs along the centre of each opening. The centre of the aperture 1876 of the frictional engagement member 1820 is identified by a circle. Similarly the pivot axis of the frictional engagement member 1820 is identified by a circle. The centre of the right face, i.e. half way between the edges of the right face, of the aperture 1876 is identified by a square. Similarly, the centre of the left face, i.e. half way between the edges of the right face, of the aperture 1876 is also identified by a square. These positions have been highlighted in FIG. 27 so that the path of different parts of the frictional engagement members 1820 can be more easily seen.

In this embodiment, the aperture 8311 in first filament guide 831 is closely similar in size and shape in transverse cross section to the size and shape of the filament 1830 in transverse cross section, such that there is only minimal clearance between the filament 1830 and the aperture 8311. Likewise the inlet and outlet openings 8321, 8331 of the housing 1810 can be similarly closely similar to the filament 1830. This close tolerance between filament 1830, aperture 831 and openings 8321, 8331 assists in accurately guiding the filament 1830 along a desired path through the housing 1810. Control of the path of the filament 1830 through the housing 1810 assists in achieving accurate and desired control of the movement of the frictional engagement members 1820, and thus the frictional engagement between the frictional engagement members 1820 and the filament 1830. It also ensures that the filament 1830 entering and exiting housing 1810 does so on a more linear or horizontal trajectory when viewed as seen in FIG. 9d for example, and minimises any tendency to enter or exit the housing 1810 on a curved or bent trajectory.

In FIG. 27 seven different orientations of the frictional engagement member are shown. The number of orientations shown is arbitrary and included for illustrative purposes. The frictional engagement members 1820, 1822, may move to a greater or lesser degree than shown in FIG. 27.

Orientation No. 1 conforms with the disengaged configuration. In orientation No. 1 the centre of aperture 1876 of the left face of the frictional engagement member 1820 intersects the longitudinal axis. Orientation No. 7 conforms with the engaged configuration. In orientation No. 7 centre of aperture 1876 of the right face of the frictional engagement member 1820 intersects the longitudinal axis. Orientations No. 2 to 6 respectively conforms with intermediate stages between the disengaged configuration and the engaged configuration. Orientation No. 4 indicates the stage where the longitudinal distance between the centre of the left face and the closest housing opening to the left is equal to the longitudinal distance between the centre of the right face and the closest housing opening to the right. The centre of aperture 1876 is on or very close to the longitudinal axis. In this orientation the filament 1830 may bend relatively evenly on either side of the frictional engagement member 1820.

One may observe from FIG. 27 that the centre of aperture 1876 does not move along the same arc as that shown in FIG. 11 or 12. Instead, between orientations No. 1 and No. 4 the centre of aperture 1876 remains relatively close to the longitudinal axis (due to the allowed translational movement of the pivot axis along the predetermined elongate path), and then the vertical distance between the centre of aperture 1876 and the longitudinal axis steadily increases. So by allowing the frictional engagement member 1820 to move vertically within the slot 84 the centre of aperture 1876 may be kept relatively close to the longitudinal axis in the initial stages between the disengaged configuration and the engaged configuration.

It may be also observed that the pivot axis moves vertically slightly downwards from orientation No. 1 and finds its lowest vertical level in orientation No. 2, and then moves vertically upwards to intersect the original pivot axis level between orientations No. 3 and No. 4, and then a steady increase in vertical level may be seen until reaching its maximum in orientation No. 7.

The above described arrangement is configured to allow the aperture 1876 to move about a non-fixed pivot axis. In other words, the aperture 176 is configured to move relative to the housing 1810 according to more than one degree of freedom, in particular a pivotal movement about the pivot axis, and a translational movement whereby the pivot axis itself moves relative to the housing 1810. This enables the or each frictional engagement member 1820, 1822 to be able to follow the filament 1830 as the filament is moved through the housing 1810 whilst being constrained by the apertures in the housing 1810 through which the filament 1830 passes. Further, the arrangement still allows the orientation of each aperture 1876 to pivot relative to the housing 1810 as the filament 1830 is moved through the housing, to vary the frictional engagement between the or each frictional engagement member 1820, 1822 and the filament 1830. This enables the or each frictional engagement member 1820 to engage filament 1830 if filament 1830 bends or kinks such that the bend or kink raises a section of the filament 1830 above its horizontal position at which it is positioned in the disengaged configuration.

Figure 28:
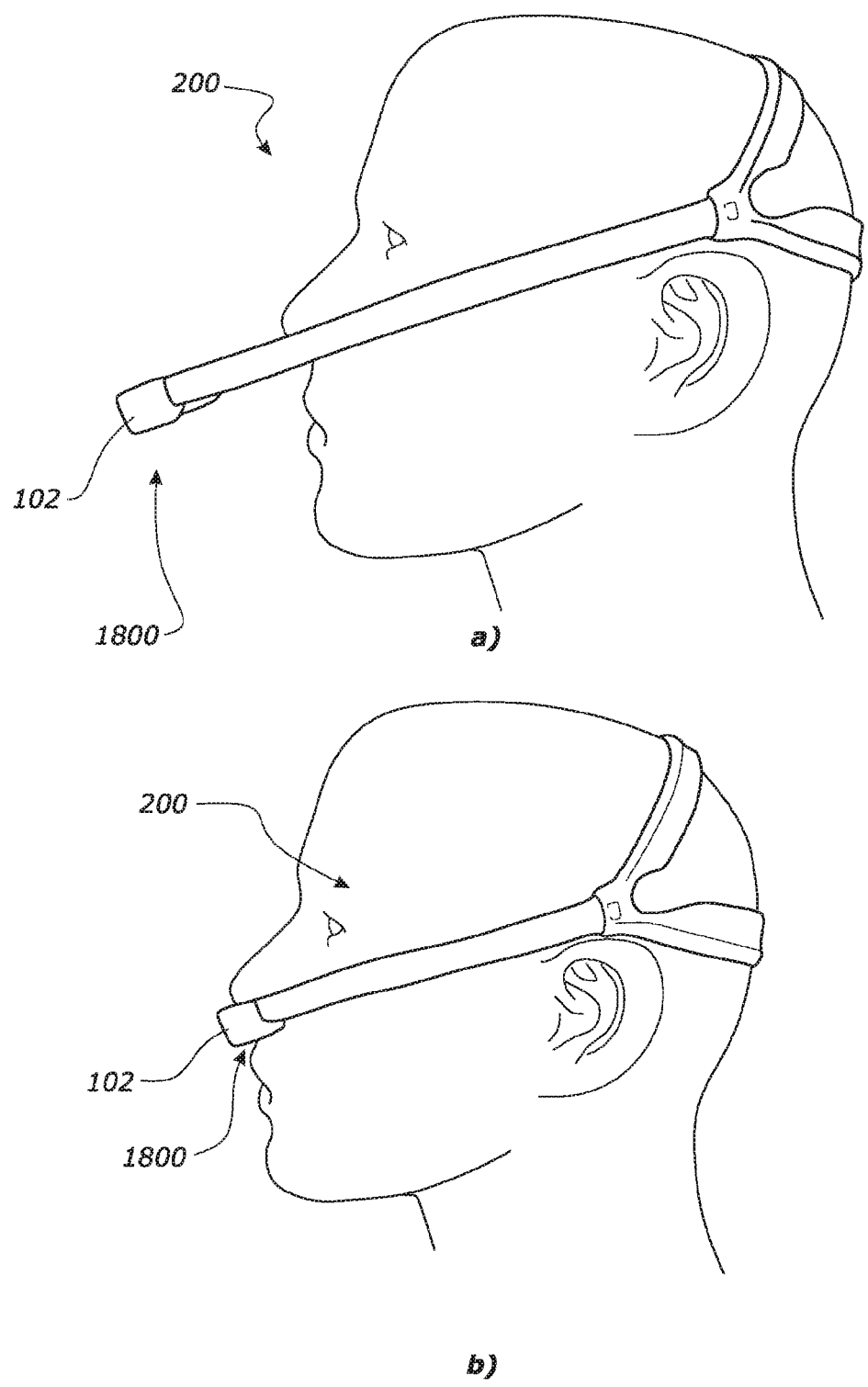
FIG. 28a is a side view of a headgear, a yoke of a patient interface (noting the seal/cushion of the patient interface is not shown), and directional adjustment unit in accordance with this disclosure, with the headgear extended, and the frictional engagement members of the directional adjustment unit activated, that is, resisting extension of the headgear.
FIG. 28b is a side view of a headgear including a yoke and directional adjustment unit in accordance with this disclosure, while the headgear is retracting, and the frictional engagement members of the directional adjustment unit inactivated, that is, not resisting retraction of the headgear.

Referring to FIG. 28, the headgear 200 can be seen in extended/extending and retracted/retracting conditions. Note that in FIG. 28, only the yoke 21 is shown. The cushion/seal of the patient interface 102 is omitted for clarity. In the extended condition, the headgear 200 is extended such that the patient interface 102 is spaced away from the face of the user. This is undesirable in use because for the breathing gases to be effectively delivered to the user, the patient interface 102 should be in contact with the face of the user. Whilst FIG. 28a shows an extreme degree of extension, it is undesirable for the patient interface 102 to be able to move away from the user's face. As the headgear 200 is extended, and when extended as shown in FIG. 28a, the directional adjustment unit 1810 is in an activated condition in which the frictional engagement members 1820, 1822 have moved within the housing 1810 to a second condition in which the frictional engagement members 1820, 1822 frictionally engage the filament 1830 and resist extension of the headgear. In other words, movement of the patient interface 102 away from the face of the user is resisted when the directional adjustment unit 1810 is in the activated condition. The position of the frictional engagement members 1820, 1822 when the directional adjustment unit 1810 is engaged can also be seen with reference to FIG. 30, when the headgear is subject to a tensile extension force in the direction of the arrow A. In this position the frictional engagement members 1820, 1822 are inclined relative to the housing 1810 and/or filament 1830, for example relative to a notional vertical axis of the housing 1810.

Figure 31:
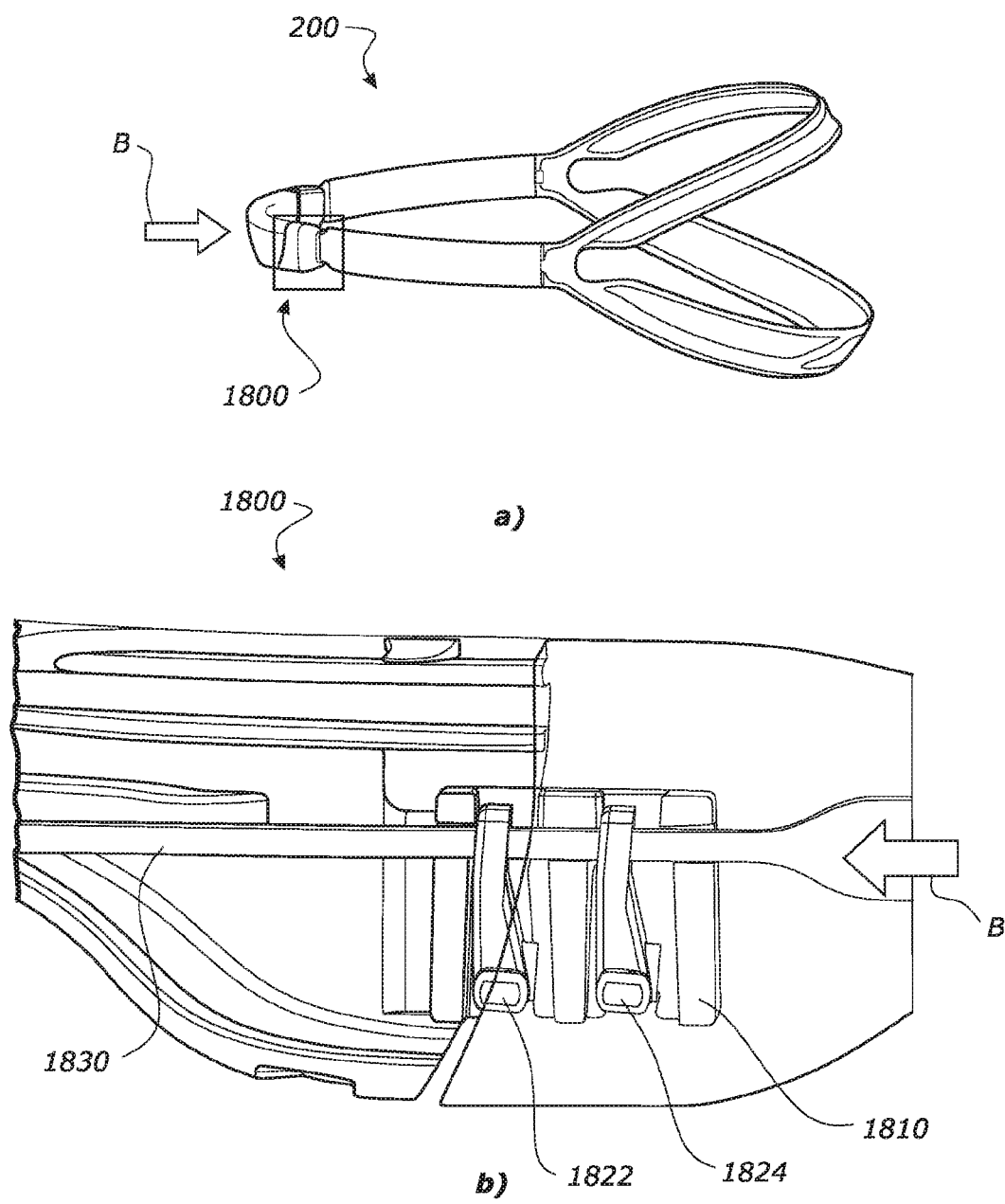
FIG. 31a is a perspective view of the headgear of FIG. 28.
FIG. 31b is an enlarged sectional view of the features inside the rectangle of FIG. 31a, and showing the frictional engagement members of the directional adjustment unit inactivated as per FIG. 28b.

As the headgear 200 is retracted towards the position shown in FIG. 28*b* where the patient interface 102 is in contact with the face of the user, the directional adjustment unit deactivates in that the frictional engagement members 1820, 1822 move to a position within housing 1810 in which the friction force imparted on the filament 1830 is reduced, and the filament 1830 can move relatively freely through the directional adjustment units. The position of the frictional engagement members 1820, 1822 when the directional adjustment unit 1810 is disengaged can also be seen with reference to FIG. 31, when the headgear is subject to a retraction force in the direction of the arrow B. In this position the frictional engagement members 1820, 1822 are less inclined relative to the housing 1810 and/or filament.

With reference to FIGS. 29 to 41, another directional adjustment unit 1800 is disclosed, comprising further or modified features. These features include any one or more of the following, and can be seen with reference to FIG. 29 initially:

a) The frictional engagement members 1820, 1822 may be pre-activated, that is, arranged in the housing 1810 so that the frictional engagement members 1820, 1822 always frictionally engage the filament 1830 so as to prevent or at least reduce slippage of the filament 1830 through the housing 1810 whether or not the headgear 200 is under tension. Thus the frictional engagement members 1820, 1822 always frictionally engage the filament 1830, regardless of their position, or whether the headgear 200 is or is not under tension. However, the amount of frictional engagement still varies in dependence upon the position of the frictional engagement members 1820, 1822 relative to the housing 1810 and the filament 1830. One example on how to achieve this is to incline the frictional engagement members 1820, 1822 relative to a vertical axis of the housing 1810 and/or relative to the filament 1830, to prevent or at least reduce unwanted slippage of the filament 1830 through the housing 1810;
  b) The filament entry and exit openings 1876 may be larger in a vertical direction, to allow for the filament 1830 buckling during pre-activation;
  c) One or more internal contact surfaces inside the housing 1810 may be modified to reduce surface tension between the frictional engagement members 1810, 1822 and the contact surface(s). Surface tension can be present when the contact surfaces are moist, or subject to contaminants on the surfaces. This can help avoid or reduce the frictional engagement members 1820, 1822 sticking in a given position in the housing 1830;
  d) Modification of the housing 1810 to facilitate correct location of the frictional engagement members 1820, 1822 in the housing 1810, during assembly.

Any one or more of these figures can be combined with any of the features of the directional adjustment unit 1800 of FIGS. 1 to 28.

Figure 32:
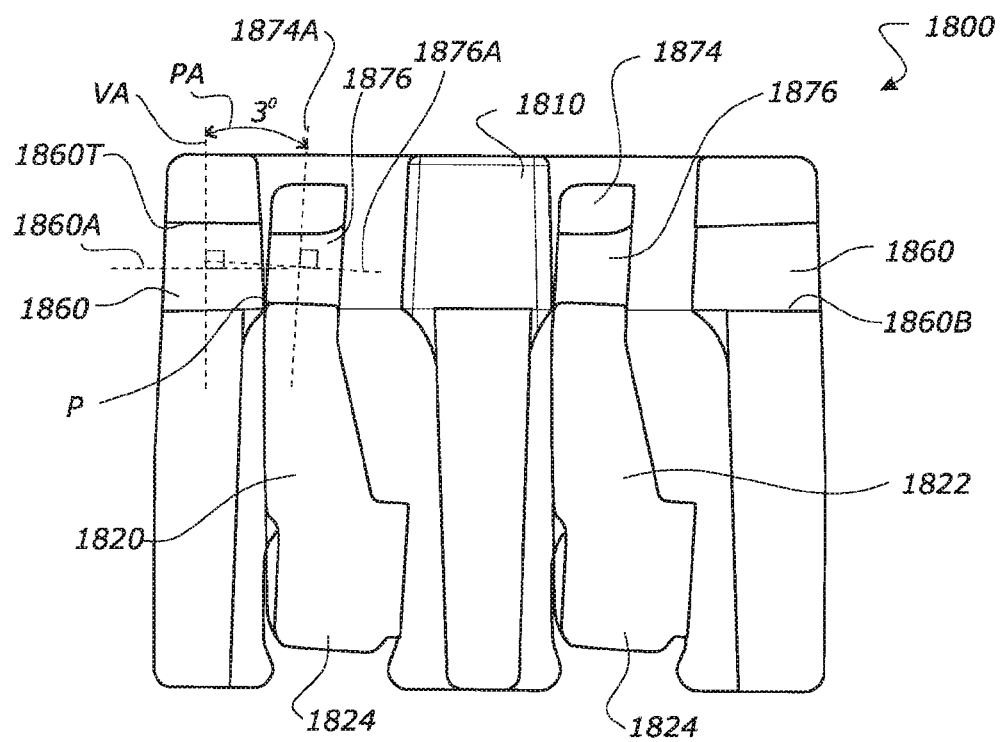
FIG. 32 is a sectional side view of the housing and frictional engagement members of FIG. 29, showing the frictional engagement members in a pre-activated, or inactivated condition, as per FIG. 28b.

Referring to FIG. 32, the feature of pre-activation of the frictional engagement members 1820, 1822 can be seen. This pre-activation ensures that prior to the headgear 200 being extended, the frictional engagement members 1820, 1822 frictionally engage the filament 1830 to a predetermined extent before moving to the second condition.

This is achieved by configuring the frictional engagement members 1820, 1822 and the housing 1810 such that a central axis of the opening 1876 is not parallel with a central axis of the housing entry opening 1860. In other words the frictional engagement members 1820, 1822 and the housing 1810 are configured such that the filament path into the housing 1810 through the opening 1860 and through the opening 1876, is non-straight or tortuous.

The frictional engagement members 1820, 1822 each comprise upper arm portion 1874, the axis 1874A of which is inclined relative to the vertical axis VA of the housing 1810, when the frictional engagement members 1820, 1822 are in a pre-activated condition. As can be seen in FIG. 32, the central axis 1876A of the opening 1876 is non-parallel with the central axis 1860A of housing entry opening 1860. Thus, before tensile forces are applied to the filament 1830 during or while resisting extension of the headgear 200, the upper arm portion 1874 is inclined relative to the vertical axis VA of the housing 1810, that is, relative to an axis perpendicular to the filament longitudinal axis. It will be appreciated that the filament longitudinal axis will move and/or bend as the filament 1830 extends through the housing 1810. We refer here to a notional filament axis being a line joining the central axis 1860A of housing entry opening with the corresponding central axis of housing exit opening 1860. The central axis 1876A of the frictional engagement member 1820 will be at an angle of inclination relative to the central axis 1860A of housing entry opening 1860. In this example, the central axis 1876A of the frictional engagement member 1820 will be at an angle of inclination relative to the base of the housing 1810. This angle of inclination, or pre-activation angle PA, ensures that the filament pathway through aperture 1876 is not perfectly aligned with the filament longitudinal axis, thus causing the aperture 1876 to frictionally engage with the filament 1830, to an extent. A pre-activation angle PA of between 0-4° has been determined to be acceptable. A pre-activation angle PA of around 3° may be preferred. The pre-activation angle PA could be measured relative to the longitudinal axis of the filament 1830. It can also be seen that this pre-activation angle is such that the longitudinal axis of the filament 1830, and the central axis CA of the filament aperture 1876, are inclined, or non-parallel.

Figure 33:
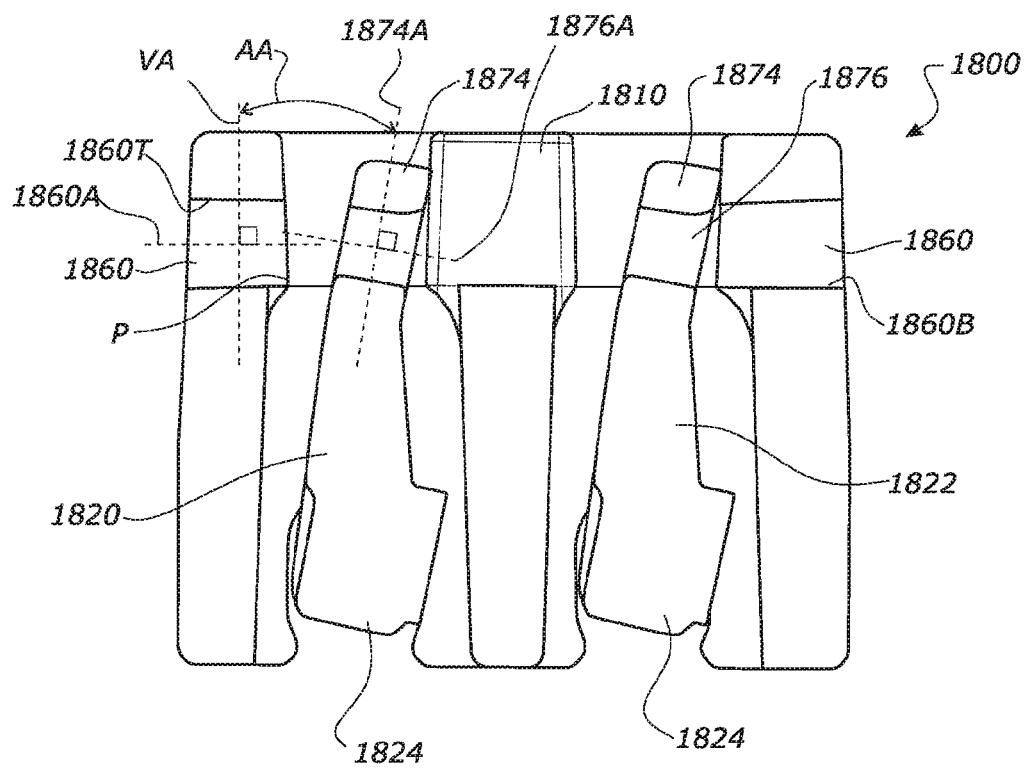

With reference to FIG. 33, the angle of the upper arm portion 1874, that is, the portion of the arm that includes the filament aperture 1876, increases from the pre-activation angle PA, to an activation angle AA, as tensile forces are applied to the headgear 200. Such tensile forces may be applied before any headgear extension occurs, such as while the frictional engagement members 1820, 1822 are revisiting headgear extension, and/or during headgear extension. The activation angle AA may increase the pre-activation angle by between 1 and 30°. In an example, the activation angle AA may be up to 25°. In the example of FIG. 33, the activation angle AA is around 9°, that is, the frictional engagement members 1820, 1822 have pivoted around 6° from the pre-activation angle PA.

Figure 34:
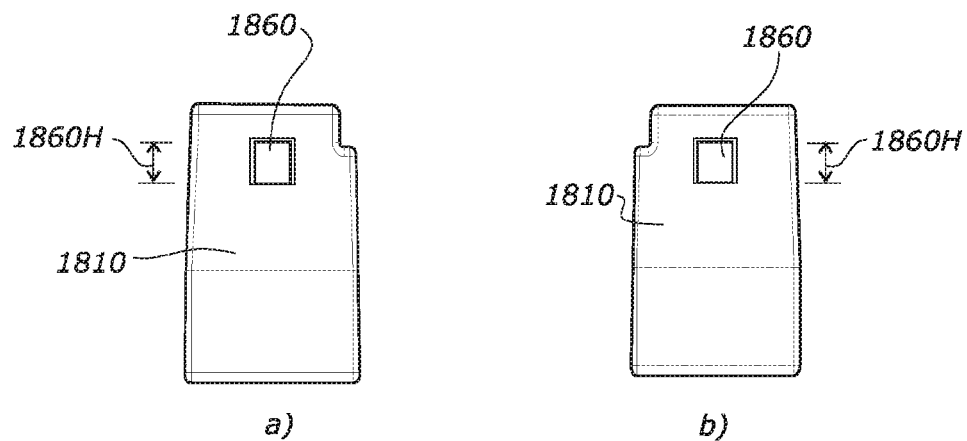
FIGS. 34a and 34b are end views of the housing of FIGS. 28 to 33, viewed along the longitudinal axis of the filament.

Providing the frictional engagement members 1820, 1822 with a pre-activation angle PA can have the effect that the filament 1830 buckles within the housing 1810, and as the filament 1830 enters and exits the housing 1810 through the entry and exit apertures 1860. With reference to FIGS. 29 and FIG. 34, the vertical dimension 1860H of the filament entry and exit apertures 1860 in the housing 1810 are increased to accommodate the buckling of the filament 1830 in a generally vertical direction.

The vertical dimension 1860H of the entry and exit apertures 1860 in the housing 1810 is preferably between 10 and 50% greater than the vertical dimension of the filament 1830. The required vertical dimension of the entry and exit apertures 1860 is proportional to the pre-activation angle PA: a greater pre-activation angle PA requires apertures 1860 with a larger vertical dimension.

In one example a square filament 1830 may be provided, for example having a 1 mm×1 mm square cross section. In this example, the entry and exit apertures 1860 have a vertical dimension of around 1.25 mm, or around 25% more than the vertical dimension of the filament. In this example, the entry and exit apertures 1860 have a transverse dimension of around 1.1 mm.

Figure 35:
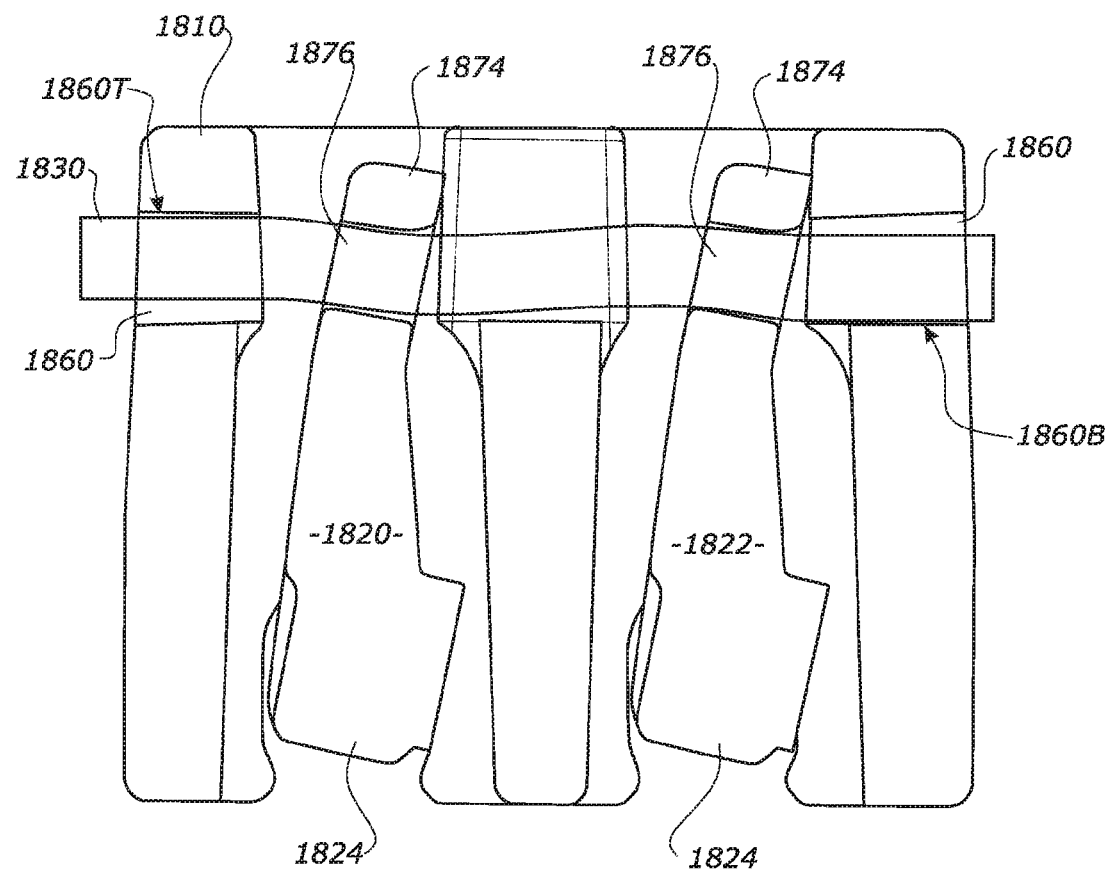
FIG. 35 is a CT scan of the directional adjustment unit of FIGS. 28 to 34, with the frictional engagement members in an activated condition.

With reference to FIGS. 29 and 35:
a) entry aperture 1860—top surface 1860T is engaged with the filament 1830.
b) exit aperture 1860—bottom surface 1860B is engaged with the filament 1830.

FIG. 35 is a line rendering of a CT scan of the directional adjustment unit 1820 with the frictional engagement members 1820, 1822 in an activated condition, and showing the filament 1830 being buckled by the activation angle AA of the frictional engagement members 1820, 1822.

Figure 36:
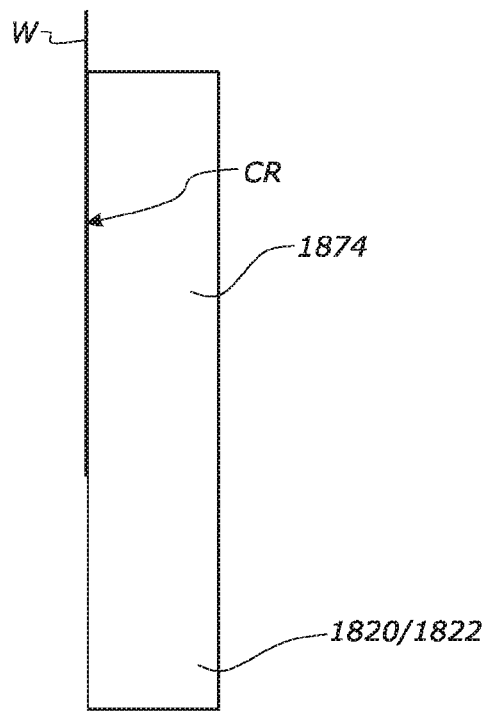

Referring to FIG. 36, this figure schematically illustrates a notional contact region CR between an internal wall W of the housing 1810 against which the upper arm portion 1874 of the frictional engagement members 1820, 1822 abuts, when the frictional engagement members 1820, 1822 are in the deactivation condition. The abutment between the frictional engagement members 1820, 1822 and the wall W serves to limit the extent of movement of the frictional engagement members 1820, 1822 within the housing 1810.

As shown in FIG. 36, the internal wall W of the housing 1810 is substantially planar, leading to a relatively large contact region CR against which a planar face of the upper arm portion 1874 rests. This relatively large contact region CR can lead to surface tension acting between the frictional engagement members 1820, 1822 and the adjacent internal wall W of the housing 1810, for example, when the directional adjustment unit 1800 becomes moist during use, or after cleaning, or when otherwise subject to contaminants. This surface tension can undesirably impede movement of the frictional engagement members 1820, 1822 between the deactivated/pre-activated and activated conditions such that the frictional engagement members 1820, 1822 can stick in the deactivated/preactivated condition.

The internal wall W and/or the upper arm portion 1874 of the frictional engagement members 1820, 1822 can be modified to provide a smaller area of contact between the internal wall W and the upper arm portion 1874.

Examples of how this reduced contact area can be achieved include any one or more of:
a) arranging the internal wall W such that a portion of the internal wall W protrudes further into the housing 1810 than the remainder of the internal wall W;
b) providing the internal wall W and/or the frictional engagement members 1820, 1822 with one or more discrete surface formations that define a smaller contact region CR, and thus help to reduce sticking of the frictional engagement members 1820, 1822.

The one or more discrete surface formations could comprise:
a) one or more protruding portions, protruding from the internal wall W and/or the frictional engagement members 1820, 1822;
b) providing one or more recesses in the internal wall W and/or the frictional engagement members 1820, 1822.

In the examples described it is the upper part of the frictional engagement members 1820, 1822 that contacts the internal wall W of the housing 1810, that is, the upper arm portions 1874. However, it is envisaged that any other part or parts of the frictional engagement members 1820, 1822 could be configured to contact the internal wall W of the housing 1810.

Likewise the internal wall W of the housing 1810 could be any internal surface of the housing 1810 against which the frictional engagement members 1820, 1822 abut, when in the first configuration.

Figure 37:
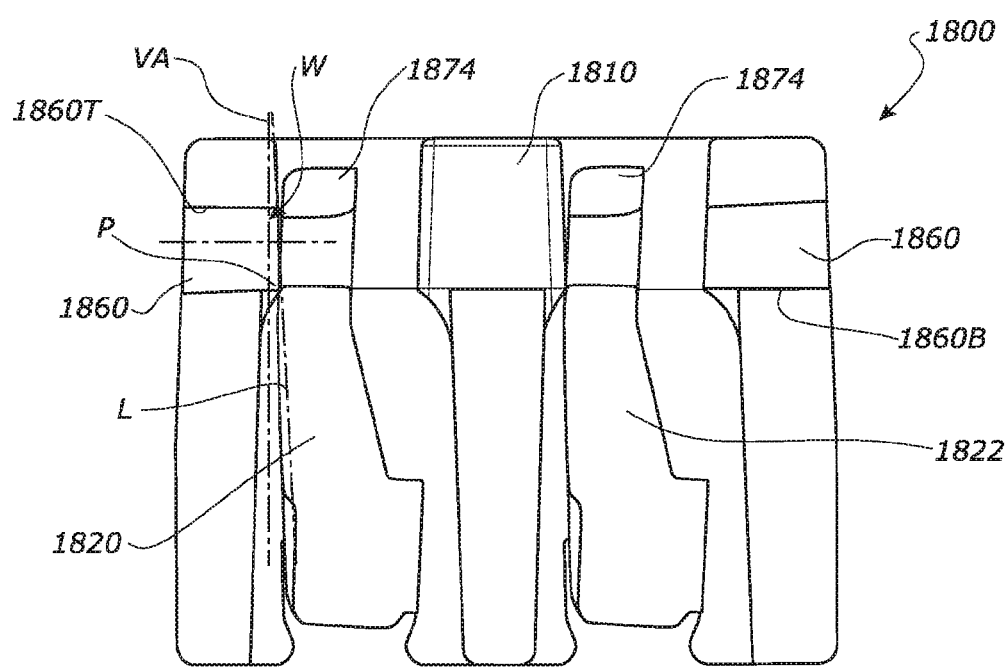
FIG. 37 is a sectional side view of the directional adjustment unit of FIGS. 28 to 35, showing further features of the unit.

Referring to FIG. 37, in this example, one or both of the internal walls W comprises a protruding portion P that protrudes from the plane of the internal wall W, into the housing 1810 in the direction of the frictional engagement members 1820, 1822. The protruding portion P provides a contact surface of relatively small surface area against which the frictional engagement members 1820, 1822 abut, when in the deactivated/pre-activated condition. This relatively small protruding portion P reduces any surface tension, as compared to the example of FIG. 36.

In the FIG. 37 example, the protruding portion P is provided by inclining the internal wall W relative to the vertical axis VA of the housing 1810, so that a lower part of the internal wall W protrudes into the housing 1810. In particular the lower margin of the internal wall W protrudes into the housing. The inclination of internal wall W is shown by line L.

In this example, a further effect of the inclination of the internal wall W is that this forces the frictional engagement members 1820, 1822 into the pre-activation position described above. The directional adjustment unit 1800 thus comprises a housing 1810, a pair of frictional engagement members 1820, 1822 through which a filament 1830 passes, where the housing 1820 comprises at least one internal surface against which one of the frictional engagement members 1820, 1822, rests, where the internal surface is inclined so that the frictional engagement member1820, 1822, when in a rest condition, is inclined relative to the filament and/or the housing 1810 base, so as to frictionally engage the filament 1830, before the frictional engagement member 1820, 1822 moves away from the rest condition, for example when tensile forces are applied to the filament 1830.

In another example, the internal wall W could be inclined such that an upper part of the internal surface protrudes into the housing 1810.

In another example, only one internal wall W of the housing 1810 comprises the protruding portion P. This may be sufficient to reduce any surface tension. However, it is envisaged that both the internal walls W of housing 1810 may be provided with protruding portions P.

Figure 38:
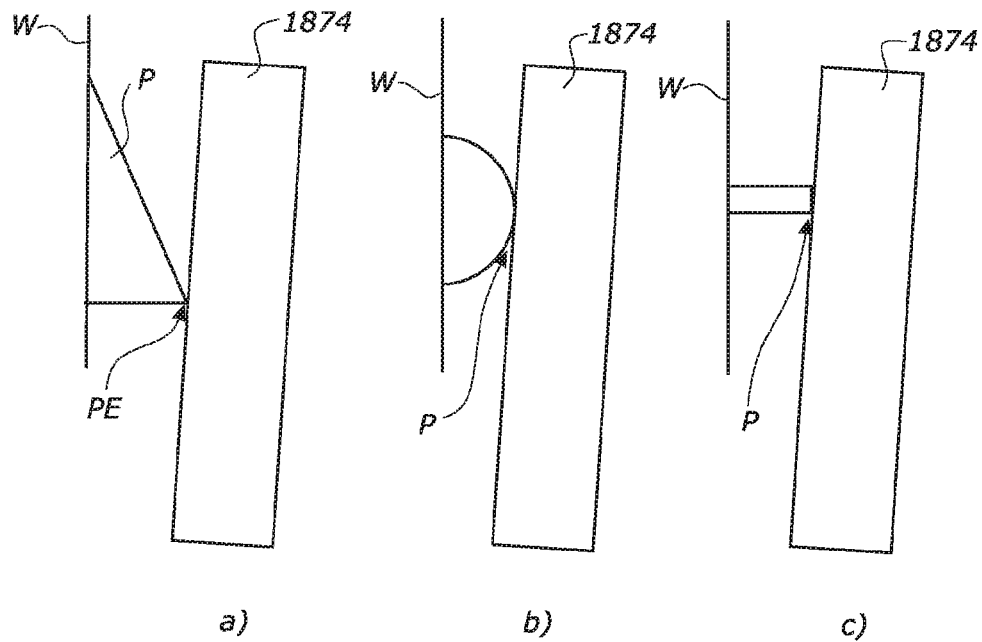
FIGS. 38a to 38c are views corresponding to FIG. 36, showing variants of the contact surface of the housing.

Referring to FIG. 38, further examples of protruding portions P are disclosed. In these examples, the protruding portion P comprises a discrete protruding formation, which protrudes from the planar internal wall W. That way wall W may be substantially parallel with the housing vertical axis VA, or inclined.

In the example of FIG. 38a, the protruding portion P is provided by a triangular protrusion that provides a discrete contact edge PE against which the frictional engagement members 1820, 1822 rest when in the disengaged condition. Such a discrete contact edge PE has a relatively small contact area.

In the example of FIG. 38b, the protruding portion P is provided by a protrusion comprising a dome having a curved outer surface. The protruding portion P in this example is hemi-spherical. The frictional engagement members 1820, 1822 contact the protruding portion P at a tangent in this example, and again the contact region CR is relatively small.

In the example of FIG. 38c, the protruding portion P is provided by a rib which extends along at least part of the internal wall W. The rib may extend along the full width of the internal wall W, along the full width of the frictional engagement members 1820, 1822, or along only part of the width of the internal wall W or the frictional engagement members 1820, 1822.

The rib may be substantially straight, or arcuate, or a combination.

A plurality of protruding portions P may be provided on the or each internal wall W. The protruding portions may be equispaced.

The formation on the internal wall W may comprise one or more adjacent recessed portions. The recessed portion(s) also serve to reduce the surface area of the internal wall W that contacts the upper arm portions 1874 of the frictional engagement members 1820, 1822. The recessed portion(s) could comprise a slot, or a dimple for example. The recessed portion(s) could comprise a larger/wider groove or channel.

Alternatively, or additionally, the frictional engagement members 1820, 1822 may be provided with one or more protruding portions P, or one or more recessed portions. In particular upper arm portion 1874 may be so provided.

It is also envisaged that both the frictional engagement members 1820, 1822 and the internal wall W can be provided with one or more protruding portions P and/or one or more recessed portions.

The protruding portion could be provided by the entire internal wall W being convex or concave. If the internal wall W is convex, only a central, apex portion of the internal wall W contacts the frictional engagement members 1820, 1822. If the internal wall W is concave, only a peripheral portion of the internal wall W contacts the frictional engagement members 1820, 1822.

Figure 39:
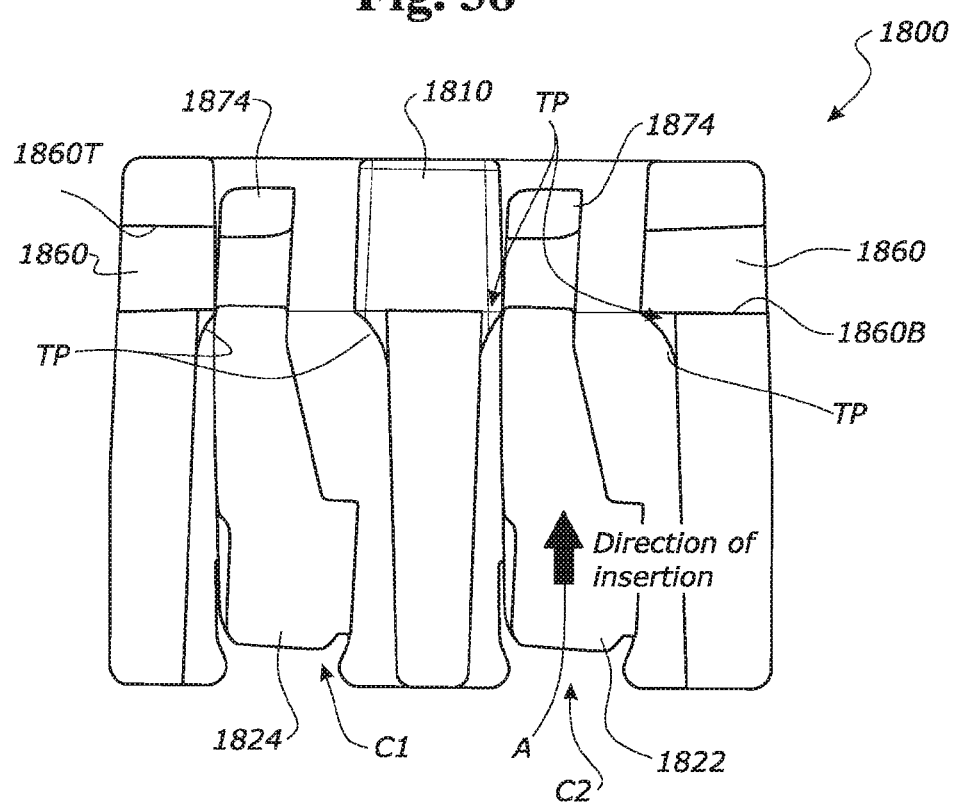
FIG. 39 is a sectional side view of the directional adjustment unit of FIGS. 28 to 38, showing further features of the unit.

As described above, the frictional engagement members 1820, 1822 are inserted into the housing 1810 through the base of the housing 1810 during assembly. With reference to FIG. 39, the insertion direction is shown by arrow A. To assist in this part of the assembly process, an upper part of the two housing cavities C1, C2 into which the frictional engagement members 1820, 1822 are inserted may comprise an inclined transition portion TP. In this example, each transition portion TP is arcuate. Each transition portion TP could be straight, and/or planar. As the upper arm portion 1874 of the frictional engagement members 1820, 1822 moves upwardly into respective housing cavities C1, C2, the inclined transition portions TP assist in guiding the upper arm portions 1874 into the narrower upper portion of the housing 1810 so that the apertures 1876 of the frictional engagement members 1820, 1822 are fully inserted into the cavities C1, C2 and aligned with the entry and exit apertures 8321, 8331 of the housing 1810. The inclined transition portions TP act to direct the upper arm portions 1874 away from the walls of the cavities C1, C2 and towards the centre of the cavities C1, C2, as the frictional engagement members 1820, 1822 are inserted into the housing 1810.

Figure 40:
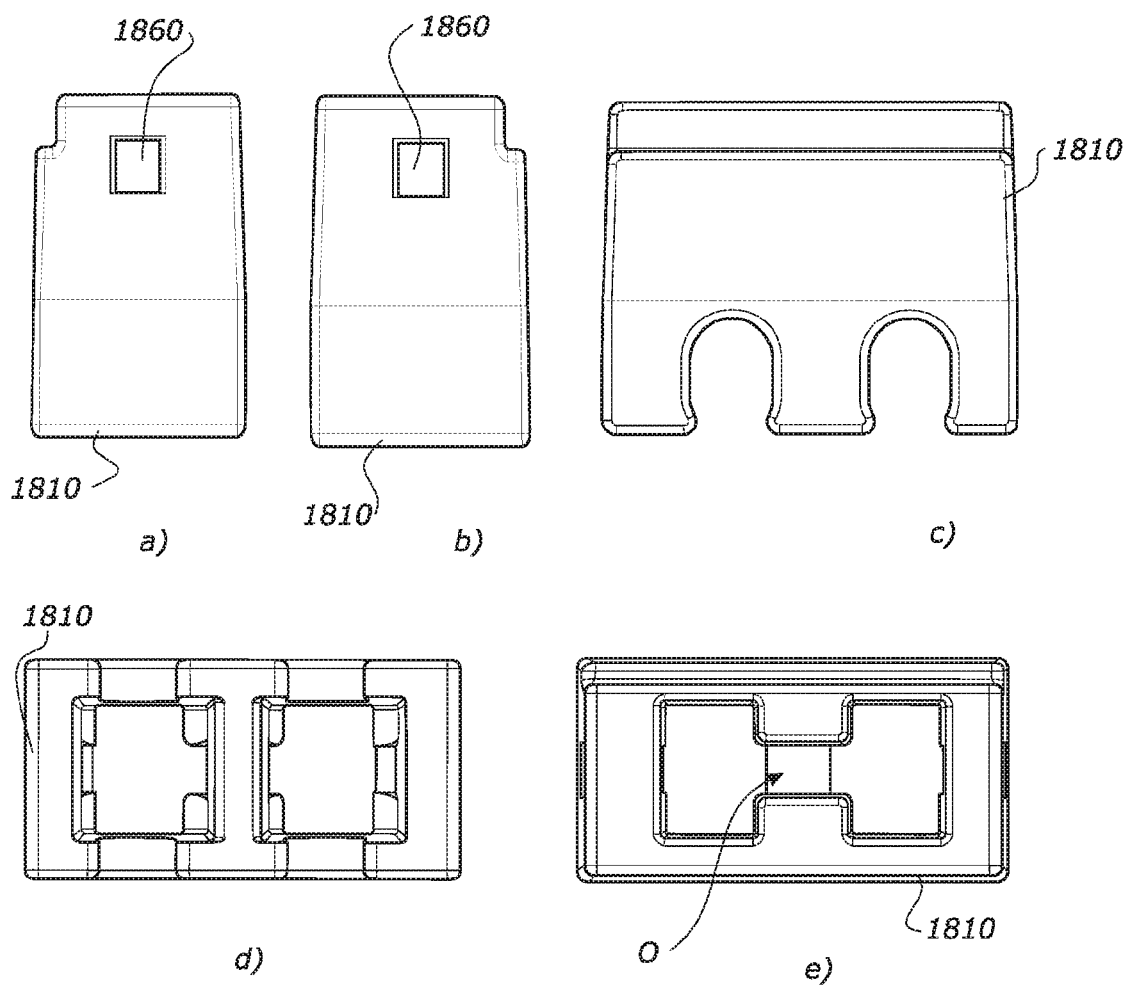
FIGS. 40a to 40e respectively show a first end, second end, side, base and plan views of the directional adjustment unit housing.
Figure 41:
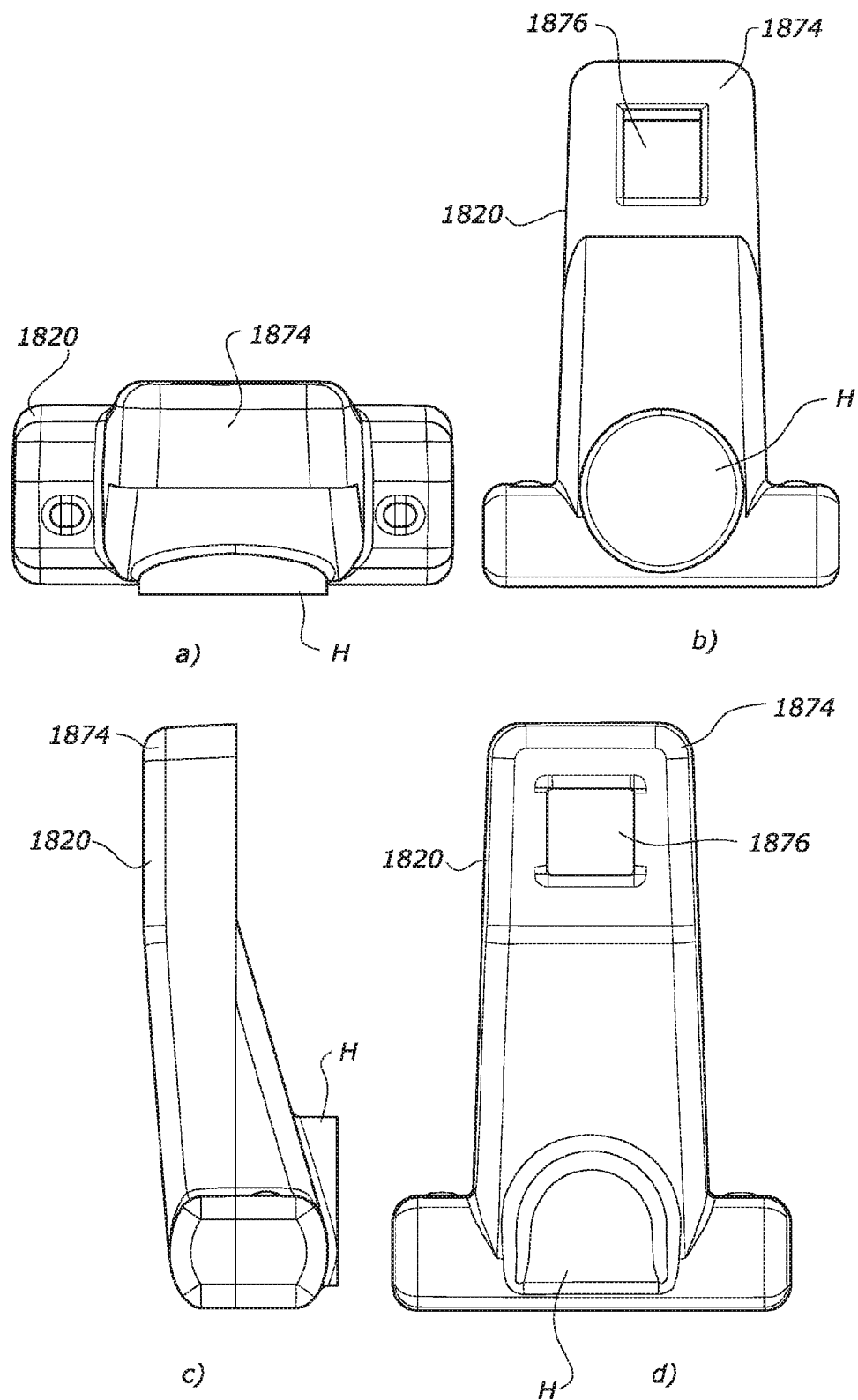
FIGS. 41a to 41d respectively show plan, front, side and rear views of the frictional adjustment member of the directional adjustment unit of FIGS. 28 to 40.

FIG. 40 shows views of housing 1810 in accordance with the features of FIGS. 28 to 39. FIG. 40e also shows an opening O in the top surface of the housing 1810 that links the two cavities that house the frictional engagement members 1820, 1822. This allows ease of access for tooling, during manufacture.

It will be appreciated that the directional adjustment unit 1810 of FIGS. 28 to 41 may be provided with any one, or any combination, of the above described features. For example the directional adjustment unit 1810 may be configured such that the frictional engagement members 1820, 1822 have a pre-activation angle, but do not have any features to reduce surface tension.

It will be appreciated that in general the above embodiments have been described with reference to multiple frictional engagement members 1820, 1822. It is also envisaged that some or all of the above described advantages may still be provided with a directional adjustment unit comprising only one frictional engagement member 1820, 1822. Likewise any number of frictional engagement members 1820, 1822 above two, can also be provided.

If a plurality of frictional engagement members 1820, 1822 are provided, movement of each frictional engagement member 1820, 1822 may be independent of movement of the other frictional engagement member 1820, 1822. For example in the orientation of the figures in this specification, the left hand frictional engagement member 1820 may move independently of the right hand frictional engagement member 1822. The independence of movement may be independent pivotal movement and/or independent translational movement relative to the housing 1810. The pivot axis of one frictional engagement member 1820, 1822 can move independently of the pivot axis of the other.

Further, any number of filament guides can be provided. It may be sufficient to have a filament guide only at the inlet and outlet of the housing 1810. It may be sufficient to have a filament guide between each pair of frictional engagement members 1820, 1822, or between or adjacent only one or some of the frictional engagement members 1820, 1822.

In an example where the yoke itself can provide the housing 1810 for the at least one frictional engagement member 1820, 1822, any or all features of the housing 1810 can be provided on the yoke, such as, for example, the slots 84, the filament guides, and any or all of the base, sides and top of the housing, and any intermediate walls.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

Any discussion of the prior art throughout the specification should in no way be considered as an admission that such prior art is widely known or forms part of common general knowledge in the field.

The invention claimed is:

1. A directional adjustment unit for a headgear for a respiratory mask, comprising:
    a movable frictional engagement member, the movable frictional engagement member having an aperture forming a cavity extending through the movable frictional engagement member, wherein the aperture is arranged to receive a filament of a strap of the headgear therethrough such that the filament follows a filament path through the directional adjustment unit, wherein the movable frictional engagement member in a first configuration provides a disengaged configuration with respect to the filament, and in a second configuration provides an engaged configuration with respect to the filament;
    the directional adjustment unit further comprising at least one filament guide configured to guide the filament as it passes through the directional adjustment unit, the at least one filament guide being configured to engage the filament to restrain the filament against bending of the filament in the directional adjustment unit at a location in which the at least one filament guide engages the filament;
    wherein the movable frictional engagement member is mounted on the directional adjustment unit such that the movable frictional engagement member can move relative to the directional adjustment unit along a predetermined elongate path which extends in a direction orthogonal to the filament path, when the movable frictional engagement member moves from the disengaged configuration to the engaged configuration; and
    wherein the movable frictional engagement member is configured to move rotationally from the disengaged configuration to the engaged configuration.

2. The directional adjustment unit of claim 1, wherein the at least one filament guide comprises a plurality of filament guides.

3. The directional adjustment unit of claim 2, wherein the movable frictional engagement member is located between a pair of the plurality of filament guides.

4. The directional adjustment unit of claim 2, wherein each of the plurality of filament guides is in a fixed position relative to a housing of the directional adjustment unit and comprises an opening through which the filament passes, wherein a center of the opening of each of the plurality of filament guides are aligned along a single axis.

5. The directional adjustment unit of claim 1, wherein the movable frictional engagement member comprises a first movable frictional engagement member, further comprising at least a second movable frictional engagement member such that the directional adjustment unit comprises at least two movable frictional engagement members.

6. The directional adjustment unit of claim 5, wherein the at least one filament guide is fixed relative to a housing of the directional adjustment unit and provided at a position intermediate the at least two movable frictional engagement members.

7. The directional adjustment unit of claim 5, wherein each of the at least two movable frictional engagement members is movable around a respective pivot axis and wherein the first configuration comprises a first pivoted configuration, and the second configuration comprises a second pivoted configuration.

8. The directional adjustment unit of claim 7, wherein each pivot axis is movable with respect to the directional adjustment unit along the predetermined elongate path in the direction orthogonal to the filament path.

9. The directional adjustment unit of claim 8, wherein each pivot axis is movable independently of each other.

10. The directional adjustment unit of claim 8, wherein the directional adjustment unit comprises a base, wherein each pivot axis is movable toward and away from the base of the directional adjustment unit, wherein the base is located opposite the pivot axis of each of the at least two movable frictional engagement members relative to the filament, and wherein the direction orthogonal to the filament path extends through the base.

11. The directional adjustment unit of claim 1, wherein the directional adjustment unit comprises a mounting slot, the mounting slot comprising a retaining space for movably retaining a follower to movably retain the movable frictional engagement member on or in the directional adjustment unit.

12. The directional adjustment unit of claim 11, wherein the movable frictional engagement member has a base member, the aperture being spaced from the base member, wherein the base member comprises the follower.

13. The directional adjustment unit of claim 12, wherein the movable frictional engagement member comprises a first movable frictional engagement member, further comprising at least a second movable frictional engagement member such that the directional adjustment unit comprises at least two movable frictional engagement members, wherein the directional adjustment unit comprises at least two mounting slots, each mounting slot having a retaining space for movably retaining a respective part of the base member of one of the at least two movable frictional engagement members.

14. The directional adjustment unit of claim 12, wherein the mounting slot has at least one narrower section to resist the base member from moving past the at least one narrower section.

15. The directional adjustment unit of claim 11, wherein the mounting slot is sized so as to allow translational movement of the follower within the mounting slot along a predetermined path, whilst being retained.

16. The directional adjustment unit of claim 11, wherein the mounting slot is elongate when the directional adjustment unit is viewed from a side perspective.

17. The directional adjustment unit of claim 16, wherein the mounting slot extends in a substantially vertical direction, when the directional adjustment unit is viewed from a side perspective.

18. The directional adjustment unit of claim 11, wherein the mounting slot is sized so as to allow the follower to pivot around its pivot axis within the mounting slot.

19. The directional adjustment unit of claim 1, wherein the movable frictional engagement member is mounted in the directional adjustment unit for both:
   a. pivotal movement relative to the directional adjustment unit about a pivot axis; and
   b. translational movement relative to the directional adjustment unit in a direction orthogonal to the pivot axis, along the predetermined elongate path extending away from the pivot axis, when the directional adjustment unit is viewed along the pivot axis.

20. The directional adjustment unit of claim 19, wherein the predetermined elongate path is defined by an elongate mounting slot in one of the movable frictional engagement member and a housing of the directional adjustment unit, and a follower on the other of the movable frictional engagement member and the housing of the directional adjustment unit, the follower being received in the elongate mounting slot.

21. The directional adjustment unit of claim 20, wherein when the movable frictional engagement member is in the disengaged configuration with respect to the filament, the filament can move through the directional adjustment unit with a first resistance to that movement between the filament and the movable frictional engagement member, and wherein when the movable frictional engagement member is in the engaged configuration with respect to the filament, the filament can move through the directional adjustment unit with a second resistance to that movement between the filament and the movable frictional engagement member, the second resistance being greater than the first resistance.

22. The directional adjustment unit of claim 1, wherein the at least one filament guide is in a fixed position relative to a housing of the directional adjustment unit.

23. The directional adjustment unit of claim 22, wherein an opening of the at least one filament guide, through which the filament passes, defines a longitudinal axis, wherein a center of the aperture of the movable frictional engagement member is positioned above the longitudinal axis in the engaged configuration.

24. The directional adjustment unit of claim 23, wherein an opening of the at least one filament guide is sized to have minimal clearance with the filament.

25. The directional adjustment unit of claim 1, wherein the movable frictional engagement member is movable around a pivot axis, and wherein the at least one filament guide engages the filament to limit movement of the filament in the direction orthogonal to the filament path and in a direction away from the pivot axis.

* * * * *